US007734380B2

(12) United States Patent
Ransom et al.

(10) Patent No.: US 7,734,380 B2
(45) Date of Patent: Jun. 8, 2010

(54) PUSH COMMUNICATIONS ARCHITECTURE FOR INTELLIGENT ELECTRONIC DEVICES

(75) Inventors: Douglas S. Ransom, Victoria (CA); Martin A. Hancock, Victoria (CA); Ronald G. Hart, North Saanich (CA); J. Bradford Forth, Victoria (CA); Michael E. Teachman, Victoria (CA); Andrew W. Blackett, Victoria (CA)

(73) Assignee: Power Measurement Ltd., Saanichton, British Columbia (CA)

( * ) Notice: Subject to any disclaimer, the term of this patent is extended or adjusted under 35 U.S.C. 154(b) by 1548 days.

(21) Appl. No.: 10/666,398

(22) Filed: Sep. 19, 2003

(65) Prior Publication Data

US 2004/0138835 A1 Jul. 15, 2004

Related U.S. Application Data

(63) Continuation of application No. 10/340,374, filed on Jan. 9, 2003, now Pat. No. 7,216,043, which is a continuation-in-part of application No. 09/896,570, filed on Jun. 29, 2001, now Pat. No. 6,944,555, and a continuation-in-part of application No. 09/814,436, filed on Mar. 22, 2001, now Pat. No. 6,751,562, and a continuation-in-part of application No. 09/723,564, filed on Nov. 28, 2000, now Pat. No. 6,961,641, and a continuation-in-part of application No. 10/068,431, filed on Feb. 6, 2002, now Pat. No. 6,694,270, which is a continuation of application No. 08/798,723, filed on Feb. 12, 1997, now abandoned.

(51) Int. Cl.
*G01R 21/00* (2006.01)
*G05D 17/00* (2006.01)
*H04K 1/00* (2006.01)

(52) U.S. Cl. .................... 700/286; 702/62; 380/258

(58) Field of Classification Search .............. 700/286, 700/291, 295–298; 702/57–62; 713/300–340; 375/219, 223; 709/217–219, 230, 250; 455/3.01, 455/3.06, 456.1; 342/450; 380/258
See application file for complete search history.

(56) References Cited

U.S. PATENT DOCUMENTS 4,589,075 A 5/1986 Buennagel (Continued)

OTHER PUBLICATIONS

Questra Applications Summary Data Sheet, pp. 1-2, Jul. 2, 2002.
Tridium™ Vykon™ Energy "JACE-401™" Product Data Sheet, pp. 1-2, Sep. 16, 2002.

(Continued)

*Primary Examiner*—M. N. Von Buhr
(74) *Attorney, Agent, or Firm*—Brinks Hofer Gilson & Lione

(57) ABSTRACT

A power management architecture for an electrical power distribution system, or portion thereof, is disclosed. The architecture includes multiple intelligent electronic devices ("IED's") distributed throughout the power distribution system to manage the flow and consumption of power from the system using real time communications. Power management application software and/or hardware components operate on the IED's and the back-end servers and inter-operate via the network to implement a power management application. The architecture provides a scalable and cost effective framework of hardware and software upon which such power management applications can operate to manage the distribution and consumption of electrical power by one or more utilities/suppliers and/or customers which provide and utilize the power distribution system. Autonomous communication on the network between IED's, back-end servers and other entities coupled with secure networks, themselves interconnected, via firewalls, by one or more unsecure networks, is facilitated by the use of a back-channel protocol. The back-channel protocol allows a device coupled with a secure network to solicit communications from a device on the unsecure network, thereby opening a back-channel through the firewall through which the unsecure network device may send unsolicited messages to the secure network device. Communications between multiple secure networks is accomplished using a unsecure device on an intermediary unsecure network to relay communications between the secure network devices using the protocol described above.

28 Claims, 24 Drawing Sheets

U.S. PATENT DOCUMENTS

| | | | |
|---|---|---|---|
| 4,641,248 A | 2/1987 | Suzuki et al. | |
| 4,804,957 A | 2/1989 | Selph et al. | |
| 5,181,026 A | 1/1993 | Granville | |
| 5,448,229 A | 9/1995 | Lee, Jr. | 340/870.02 |
| 5,448,643 A * | 9/1995 | Parker | 380/59 |
| 5,459,459 A | 10/1995 | Lee, Jr. | 340/870.02 |
| 5,477,216 A | 12/1995 | Lee, Jr. et al. | 340/870.02 |
| 5,495,239 A | 2/1996 | Ouellette | 340/870.02 |
| 5,517,423 A | 5/1996 | Pomatto | |
| 5,572,438 A | 11/1996 | Ehlers et al. | 364/492 |
| 5,576,700 A | 11/1996 | Davis et al. | |
| 5,680,324 A | 10/1997 | Schweitzer, III et al. | |
| 5,699,276 A | 12/1997 | Roos | 36/514 |
| 5,736,847 A | 4/1998 | Van Doorn et al. | |
| 5,754,657 A * | 5/1998 | Schipper et al. | 380/258 |
| 5,764,155 A | 6/1998 | Kertesz et al. | 340/825.08 |
| 5,768,148 A | 6/1998 | Murphy et al. | |
| 5,799,082 A * | 8/1998 | Murphy et al. | 713/179 |
| 5,862,391 A | 1/1999 | Salas et al. | 395/750.01 |
| 5,897,607 A | 4/1999 | Jenney et al. | 702/62 |
| 5,956,220 A | 9/1999 | Novosel et al. | |
| 5,987,136 A * | 11/1999 | Schipper et al. | 713/176 |
| 6,005,759 A | 12/1999 | Hart et al. | 361/66 |
| 6,035,285 A | 3/2000 | Schlect et al. | 705/30 |
| 6,088,659 A | 7/2000 | Kelley et al. | 702/62 |
| 6,105,093 A | 8/2000 | Rosner et al. | |
| 6,115,393 A | 9/2000 | Engel et al. | 370/469 |
| 6,118,269 A | 9/2000 | Davis | 324/110 |
| 6,157,721 A | 12/2000 | Shear et al. | |
| 6,167,389 A | 12/2000 | Davis et al. | 324/110 |
| 6,169,979 B1 | 1/2001 | Johnson | 705/412 |
| 6,178,362 B1 | 1/2001 | Woolard et al. | |
| 6,259,972 B1 | 7/2001 | Sumic et al. | |
| 6,272,552 B1 | 8/2001 | Melvin et al. | |
| 6,285,917 B1 | 9/2001 | Sekiguchi et al. | |
| 6,298,376 B1 | 10/2001 | Rosner et al. | |
| 6,301,527 B1 | 10/2001 | Butland et al. | 700/286 |
| 6,313,752 B1 | 11/2001 | Corrigan et al. | |
| 6,321,272 B1 | 11/2001 | Swales | |
| 6,327,541 B1 | 12/2001 | Pitchford et al. | 702/62 |
| 6,346,890 B1 * | 2/2002 | Bellin | 340/825.52 |
| 6,492,897 B1 * | 12/2002 | Mowery, Jr. | 455/522 |
| 6,535,797 B1 | 3/2003 | Bowles et al. | |
| 6,535,983 B1 | 3/2003 | McCormack et al. | |
| 6,549,880 B1 | 4/2003 | Willoughby et al. | |
| 6,553,418 B1 | 4/2003 | Collins et al. | 709/224 |
| 6,587,884 B1 | 7/2003 | Papadopoulos et al. | |
| 6,618,709 B1 | 9/2003 | Sneeringer | |
| 6,640,308 B1 | 10/2003 | Keyghobad et al. | |
| 6,671,635 B1 | 12/2003 | Forth et al. | |
| 6,683,526 B2 * | 1/2004 | Bellin | 340/3.43 |
| 6,694,270 B2 | 2/2004 | Hart | |
| 6,704,873 B1 | 3/2004 | Underwood | 726/12 |
| 6,711,512 B2 * | 3/2004 | Noh | 702/65 |
| 6,714,977 B1 | 3/2004 | Fowler et al. | |
| 6,745,138 B2 | 6/2004 | Lightbody et al. | 702/61 |
| 6,762,675 B1 | 7/2004 | Cafiero et al. | |
| 6,781,517 B2 | 8/2004 | Moster et al. | |
| 6,792,337 B2 | 9/2004 | Blackett et al. | |
| 6,813,571 B2 | 11/2004 | Lightbody et al. | 702/62 |
| 6,907,546 B1 | 6/2005 | Haswell et al. | 714/38 |
| 6,916,219 B2 * | 7/2005 | Tokhtuev et al. | 441/29 |
| 6,954,814 B1 * | 10/2005 | Leach | 710/305 |
| 6,961,641 B1 | 11/2005 | Forth et al. | |
| 6,975,619 B1 * | 12/2005 | Byers et al. | 370/351 |
| 7,024,692 B1 | 4/2006 | Schanze et al. | 726/10 |
| 7,027,773 B1 * | 4/2006 | McMillin | 455/41.2 |
| 7,085,824 B2 | 8/2006 | Forth et al. | 709/221 |
| 7,117,015 B2 * | 10/2006 | Scheinert et al. | 455/561 |
| 7,181,517 B1 | 2/2007 | Iavergne et al. | |
| 7,185,131 B2 * | 2/2007 | Leach | 710/305 |
| 7,194,620 B1 * | 3/2007 | Hayes | 713/157 |
| 7,327,558 B2 | 2/2008 | Kennedy et al. | |
| 7,447,762 B2 | 11/2008 | Curray et al. | |
| 2001/0010032 A1 | 7/2001 | Ehlers et al. | 702/62 |
| 2001/0010490 A1 * | 8/2001 | Bellin | 340/7.46 |
| 2001/0039537 A1 | 11/2001 | Carpenter et al. | 705/400 |
| 2001/0051980 A1 * | 12/2001 | Raciborski et al. | 709/203 |
| 2002/0017977 A1 * | 2/2002 | Wall | 340/5.28 |
| 2002/0069076 A1 * | 6/2002 | Faris et al. | 705/1 |
| 2002/0077729 A1 * | 6/2002 | Anderson | 700/291 |
| 2002/0091784 A1 * | 7/2002 | Baker et al. | 709/208 |
| 2002/0099955 A1 * | 7/2002 | Peled et al. | 713/200 |
| 2002/0116550 A1 | 8/2002 | Hansen | 709/330 |
| 2002/0120685 A1 | 8/2002 | Srivastava et al. | 709/203 |
| 2002/0154777 A1 * | 10/2002 | Candelore | 380/258 |
| 2002/0161536 A1 | 10/2002 | Suh et al. | 702/62 |
| 2003/0092393 A1 * | 5/2003 | Tokhtuev et al. | 455/67.1 |
| 2003/0160692 A1 * | 8/2003 | Nonaka | 340/539.11 |
| 2003/0176952 A1 | 9/2003 | Collins et al. | 700/286 |
| 2003/0226050 A1 | 12/2003 | Yik et al. | |
| 2004/0024717 A1 | 2/2004 | Sneeringer | |
| 2004/0134690 A1 * | 7/2004 | Norris, Jr. et al. | 178/19.1 |
| 2004/0172535 A1 * | 9/2004 | Jakobsson et al. | 713/168 |
| 2004/0203868 A1 * | 10/2004 | Eidson | 455/456.1 |
| 2005/0030118 A1 * | 2/2005 | Wang | 333/24 R |
| 2005/0132115 A1 * | 6/2005 | Leach | 710/305 |
| 2007/0130408 A1 * | 6/2007 | Leach | 710/305 |
| 2007/0285227 A1 * | 12/2007 | Timothy et al. | 340/539.13 |
| 2008/0113672 A1 * | 5/2008 | Karr et al. | 455/456.1 |

OTHER PUBLICATIONS

Tridium™ Vykon™ Energy "Vykon Energy Profiler" Product Data Sheet, pp. 1-4, Oct. 16, 2001.

Schneider Electric Square D "Web-Enabled Power Management Solutions" brochure, pp. 1-8, Jan. 2002.

Tridium™ Vykon™ Building "Vykon™ Alarm Service" Product Data Sheet, pp. 1-2, Jun. 20, 2002.

Tridium™ Vykon™ Building "JACE-512™" Product Data Sheet, pp. 1-2, May 15, 2002.

Tridium™ Vykon™ Building "JACE-511™" Product Data Sheet, pp. 1-2, May 28, 2002.

Vykon™ By Tridium "JACE-NP-1®" Product Data Sheet, pp. 1-2, May 28, 2002.

Vykon™ By Tridium "WorkPlace Pro™" Product Data Sheet, pp. 1-2, Jan. 12, 2001.

Vykon™ Building "Web Supervisor™" Product Data Sheet, pp. 1-2, Nov. 30, 2001.

A8800-1 AcquiSuite Data Acquisition System specification, pp. 1-2, Sep. 24, 2001.

LiveData® Real-Time Data Management For Energy and Utility Companies brochure, pp. 1-4, © copyright 2002, Rev. Jan. 2002.

Tridium™ Vykon™ Energy "With the Right Tools Energy Costs are Controllable . . ." brochure, pp. 1-8, Nov. 1, 2001.

EnergyView™ "Energy Aggregation & Information System (EAIS) for Monitoring and Analysis of Electric and Gas Demand", selected pages from an EnergyView website http://66.64.38.69/energyview, pp. 1-4, Oct. 13, 2001.

Power Monitoring home page, obtained from http://www.parijat.com/Power_Monitoring.htm, Oct. 9, 2002, one page.

Press Release Aug. 24, 2000 "Connect One Announces Industry's First Wireless Chip to Connect Mobile Devices to the Internet", pp. 1-2.

Press Release "Connect One and NAMS Create the World's First Dial-up Energy Mater that Sends and Receives E-Mail Without a Gateway", Sep. 5, 2000, pp. 1-2.

NAMS Metals by Nisko, NMM-AKB Specifications p. 1 of 1, Sep. 5, 2000.

Connect One "Automatic Meter Reading via the Internet", pp. 1-2. Jul. 11, 2001.

iModem™ "The Fastest Way to Internet-Enable any Device", pp. 1-3, Jul. 11, 2001.

ConnectOne™ Connecting your Device to the Internet™ iChip™ The Internet in your palm™, pp. 1-6, Jul. 11, 2001.

Engage Networks Launches Energy Management Venture, obtained at internet address http://www.engagenet.com/content/business_journal.shtml, Sep. 20, 2000. Appeared in Business Journal Feb. 11, 2000.

Engage Networks Inc. "D-Gen" Distributed Generation Management brochure, pp. 1-4, Link present as of Dec. 2, 1998 according to web archive at http://web.archive.org/web/19981205200934/www.engagement.com/products.htm.

Engage Networks Inc. "Internet Protocol Card for Revenue Meters" brochure, pp. 1-2. Link present as of Mar. 3, 2000 on http://web.archive.org/web/20010306005433/www.engagement.com/content/products.shtml. Original document archived at http://web.archived at http://web.archive.org/web/20030520161648/http://www.engagenet.com/datasheets/ipcard.pdf on May 10, 2003.

Engage Networks Inc. "AEM"(Active Energy Management) brochure, pp. 1-2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

David W. Giles, "Direct-Access Metering Via the Web", 1998 CEA Conference, Toronto, Canada, pp. 1-19, © 1998 Power Measurement Ltd. Conference Apr. 27-29, 1998. Presented Apr. 29, 1998.

GE Industrial Systems "EnterVista.com" brochure, Sep. 2000.

Press release, Santa Clara, CA Sep. 25, 2000 "Connecting One Reduces Time, Cost and Complexity to Connect Internet Appliances to Ethernet Lans", obtained at internet address http://www.conectone.com/html/prlsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicant believe this reference was published prior to Jan. 9, 2003.

Signature System™ Basics, obtained at internet address http://www.signaturesystem.com/sigbasics.html, Mar. 26, 2001. pp. 1-2.

Signature System™ InfoNodes, obtained at internet address http://www.signaturesystem.com/infonode.html, Mar. 26, 2001. pp. 1-2.

Questra A2B.Platform™ brochure, "Enabling converation through universal connectivity", pp. 1-4, located at http://www.questra.com/h1_products/Questra_A2Bplatform. Applicants believe this reference was published prior to Jan. 9, 2003.

Questra A2B.Sales™ brochure, "Conversation to help you win", pp. 1-2, located at http://www.questra.com/h1_products/Questra_A2Bsales. Applicants believe this reference was published prior to Jan. 9, 2003.

Power Point Presentation: Presented at "Metering Europe 2000," Sep. 5-7, 2000, source http://www.energyict.com/fh/media/Presentation_Metering2000Munchen5.zip, pp. 1-37.

Brochure, RTU+Server, source http://www.energyict.com/fh/media/tru_plus_server.pdf, pp. 1-3, Apr. 6, 2001. Document archived at http://web.archive.org/web/20020702060538/http://web.energyict.com/fh/media/rtu_plus_server.pdf Feb. 7, 2001. Link present on http://web.archive.org/web/20010207201520/www.energyict.com/fa/en_ab_frame.htm on or before Feb. 7, 2001.

Brochure, EiServer, The Energy Information server, source http://www.energyict.com/fh/media/EiServer.pdf, pp. 1-7, Jul. 14, 2000. Link present on or before Feb. 7, 2001.

Advertisement, EiServer and RTU+Server, source, Metering International—2001 Issue 1, p. 19, publish date a$^{st}$ Quarter 2001, p. 1.

Article, "Providing Tomorrow's Energy Management and Metering Tools Today," source, Metering International—2001 Issue 1, p. 18, publish date 1$^{st}$ Quarter 2001, p. 1.

"Email relating to the general technology of the application received from a competitor", from Erich W. Gunther [mailto:erich@electrotek.com] to Brad_Forth@pml.com sent May 9, 2001 3:36pm, pp. 1-2.

Electro Industries Press Release "Nexus 1250 High-Performance Power Monitor Gains Ethernet TCP/IP Capabilities," obtained at internet address http://www.electroindustries.com/feb5.html, Feb. 5, 2001 pp. 1-2.

Electro Industries "Nexus 1250 for Industry and Utilities," brochure, obtained at internet address http://www.electroindustries.com/pdf/nxsbrochure.pdf pp. 1-14 printed Jun. 1, 2001.

NetSilicon Solutions on Chip "NET+ARM™ Ethernet Processors" brochure, obtained at internet address http://www.netsilicon.com/EmbWeb/products/netarm.asp, pp. 1-2, Copyright© 2001 NetSilicon, Inc. Document archived http://web.archive.org/web/20010719171514/www.netsilicon.com/embweb/products/netarm.asp on Jul. 19, 2001 on Jul. 19, 2001.

EmWare® "Solutions Devices Link," brochure, obtained at internet address http://www.emware.com/solutions/devicelink/, pp. 1-3, printed Jun. 1, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/, p. 1, © 2000-2001 iReady corporation, printed Jun. 1, 2001. First publishes as early as Mar. 1, 2001. http://web.archive.org/web/20010515202409/http://www.iready.com/ link on right side to "technology/index.html" captured Mar. 15, 2001.

muNet News & Events Press Releases "muNet makes cable industry debut with its WebGate™ Internet Residential and Commercial Information Systems, and HomeHeartBeat", http://www.munet.com. pp. 1-2, Dec. 15, 1999.

muNet News & Events Press Releases "muNet's WebGate™ Systems Finds a Home on the Internet!" http://www.munet.com, pp. 1-2, Mar. 18, 1999.

webGate™ IRIS Technology, products brochure pp. 1-9. Applicants believe this reference was published prior to Jan. 9, 2003.

MuNet News & Events Press Release "muNet Demonstrates End-to-Enc IP-Based Energy Management System at DistribuTECH," Feb. 5, 2000, pp. 1-2.

Web Gate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

Web Gate™ ICIS™ "Internet Commerical Information System," p. 1 of 1 Published in Energy IT Nov./Dec. 2000 Technology Info Center. See http://www.platts.com/infotech/issues/0011/eittic0011.shtml for this reference—search for munet.com.

F. Momal, C. Pinto-Pereira, "Using World-Wide-Web for Control Systems" Abstract, AT Division CERN, 1211 Geneva 23, 6 pages. Published 1995.

P.M. Corcoran, J. Desbonnet and K. Lusted THPM 14.2 "CEBus Network Access via the World-Wide-Web" Abstract, © 1996 IEEE, pp. 236 & 237.

ATI Systems, "Technical Overview Ethernet SCAN II™ Module" specification, Oct. 1994, 2 pages.

J. Hofman, "*The Consumer Electronic Bus: An Integrated Multi-Media LAN for the Home*", International Journal of Digital and Analog Communication Systems, vol. 4, 77-86 (1991), © 1991 by John WIley & Sons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 "TECO & IBM—The "Smart House" Is Here" Press release, obtained at http://filebox.vt.edu/users/mikemike/smart-house/infotrac/article4.txt, Jul. 11, 2002, pp. 1&2.

Distributed.Net, http://n0cgi.distributed.net/faq/cache/178.html, printed Jun. 10, 2003. Link archived at http://web.archive.org/web/20000901052607/n0cgi.distributed.net/faq/cache/178.html on Sep. 1, 2000.

Questra, Security overview, obtained http://www.questra.com/products/sercurity.asp, printed Jun. 10, 2003. 2 pages. Applicants believe this reference was published prior to Jan. 9, 2003.

Questra Mastering Smart Security brochure, 2 pages Copyright 2002 Questra Corporation, obtained http://www.questra.com/collateral/collateral_files/SecurityOverview.pdf, printed Jun. 10, 2003. Applicants believe this reference was published prior to Jan. 9, 2003.

Questra Total Access brochure, 2 pages, Copyright 2003 Questra Corporation, obtained http://www.questra.com/collateral/collateral_files/TotalAccess.pdf, printed Jun. 10, 2003. Applicants believe this reference was published prior to Jan. 9, 2003.

Axeda DRM System Overview, 2 pages, obtained http://www.axeda.com/solutions/overview.html, printed Jun. 9, 2003. Applicants believe this reference was published prior to Jan. 9, 2003.

Axeda Access, 3 pages, obtained http://www.axeda.com/solutions/portals/portal_access.html, printed Jun. 9, 2003. Applicants believefe this reference was published prior to Jan. 9, 2003.

Axeda DRM Technology Overview, 1 page, obtained http://www.axeda.com/solutions/tech_challenges/firewallfriendly.html, printed Jun. 9, 2003. Applicants believe this reference was published prior to Jan. 9, 2003.

Axeda DRM Technology Overview, 1 page, obtained http://www.axeda.com/solutions/tech_challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.

Axeda Solutions for Industry, 1 page, obtained http://www.axeda.com/solutions/industries/industrial.html, printed Jun. 9, 2003. Archived at http://web.archive.org/web/20020221165907/http://axeda.com/industries/industrial.html on Feb. 21, 2002.

Axeda Agents, 2 pages, obtained http://www.axeda.com/solutions/device_servers/index.html, printed Jun. 9, 2003. Applicants believe this reference was published prior to Jan. 9, 2003.

Axeda Case Studies, "Axeda Prevents Power Failures at a Leading Microprocessor Plant in Israel", 2 pages, obtained http://www.axeda.com/industries/casestudies_microprocessor.html, printed Jun. 9, 2003. Applicants believe this reference was published prior to Jan. 9, 2003.

David Mueller and Sandy Smith, Electrotek Concepts, "Using Web-based Power Quality Monitoring for Problem Solving and Improving Customer Relations", proceedings of the 4th Annual Latin American Power 99 Conference, Jun. 29, 1999, pp. 263-271.

"Powerlogic® Advanced Power Reliability Solutions," Square D Schneider Electric, brochure, 2000, 3 pages double sided.

"Powerlogic® Circuit Monitor—Series 2000," Square D Schneider Electric, brochure, 3 pages double sided.

"Powerlogic® Power Meter," Square D Schneider Electric, brochure, 1998.

"Powerlogic® Metering and Monitoring Devices," Square D Schneider Electric, brochure, 2000, 2 pages double sided.

"Powerlogic® Power Monitoring and Control System," Square D Schneider Electric, brochure, 1998, 4 pages double sided.

"Powerlogic® Series 4000 Circuit Monitor," Square D Schneider Electric, brochure, 2000, 3 pages double sided.

"Digest," Square D Schneider Electric, product catalog, Mar. 2000, 10 pages.

"Powerlogic ® Series 4000 Circuit Monitor Now Available with Ethernet Communications Card," Square D Schneider Electric, News Release, Jul. 20, 2000, 2 pages.

"Powerlogic ® Series 4000 Circuit Monitor," Square D Schneider Electric, brochure, Apr. 2000, 6 pages.

"Powerlogic ® Ethernet Communication Card," Square D Schneider Electric, brochure, Aug. 2000, 2 pages.

"Powerlogic ® Circuit Monitor Series 4000," Square D Schneider Electric, Instruction Bulletin, Feb. 2000, 264 pages; and specifically, "Chapter 6—Communications Connections" (pp. 57-70).

"Powerlogic ® Ethernet Communication Card," Square D Schneider Electric, brochure, Nov. 2004, 2 pages.

"Powerlogic ® Circuit Monitor Series 4000, Instruction Bulletin No. 63230-300-200, Feb. 2000 Now Available with Ethernet Communications Card," Square D Schneider Electric, News Release, Jul. 20, 2000, 282 pages.

"Powerlogic ® Ethernet Communications Card," Schneider Electric, Instruction Bulletin No. 63230-304-200, Sep. 2000, 70 pages.

"Powerlogic ® Circuit Monitor Series 4000 Installation Manual," Schneider Electric, Instruction Bulletin No. 63230-300-209B1, Dec. 2005, 110 pages.

"Powerlogic ® Circuit Monitor Series 4000 Installation Manual," Schneider Electric, Instruction Bulletin No. 63230-300-212B1, Dec. 2005, 234 pages.

"Powerlogic ® Ethernet Communications Card," Schneider Electric, Instruction Bulletin No. 63230-314-202A4, Jan. 2006, 14 pages.

"Powerlogic ® Ethernet Communications Card," Schneider Electric, Instruction Bulletin No. 63230-304-204A4, Jan. 2006, 46 pages.

"PowerPlus Alpha® Meter," *ABB Network Partner*, brochure (May 1997) (6 pages).

QUAD4® Plus/MAXsys™ *Products User's Guide*, Chapter 1 Overview (2 pages).

"ALPHA Stars™, National Wireless Communications for Remote Metering," *ABB Information Systems*, Bulletin (24 pages).

"AIN Alpha, High Function Multi-Tariff Solid State Electricity Meter," *ABB Network Partner*, PB 42-280-lb, pp. 1-20.

"Alpha Solid State Polyphase Meter (Watts, VARs, VA)," *ABB Network Partner*, Product Bulletin, Sep. 15, 1995 (12 pages).

"POWERLOGIC® Series 4000 Circuit Monitor," Square D/Schneider Electric, Bulletin No. 3020HO0001, Apr. 2000 (6 pages).

"Web-Enabled Power Management Solutions," Square D/Schneider Electric, Product Brochure, Jan. 2002 (8 pages).

ABB Alpha Solid State Polyphase Meter, Product Bulletin 42-270-B, Sep. 15, 1995.

Dranetz Power Platform® PP1 & PP1E with TASKCard®-8000 Operator's Manual Revision A, Apr. 15, 1997.

Dranetz Power Platform® 4300 with TASKCard® 808 User's Guide, pps. ii-146, Jul. 1998.

Deposition of Erich W. Gunther, pp. 1-250, Nov. 14, 2008.

Dranetz Brochure, "Total Electrical System Management 8000-2", pp. 1-3.

Dranetz Power Platform® PP1 and PP1E TASKCard®-PQPLUS Operator's Manual Revision A, Apr. 15, 1997.

Dranetz Brochure, "Tomorrow's Technology Working for You Today", pp. 1-11, 1994.

BMI Brochure, "PowerProfiler™ 3030(A)", pp. 1-2, 1994.

BMI 3030/3060 Power Profiler User's Guide, pp. 1-8, 1990.

Dranetz OM-PC-PP1 PC PP1 Communication and Analysis Software Operator's Manual, pp. 1-6, Mar. 15, 1994.

Dranetz Brochure, "Power Platform® PP1-R", pp. 1-2.

Dran-Scan® 2000 Version 3.x, Power Quality Monitoring System Installation and Startup Guide, pp. ii-43, Nov. 1998.

Dranetz Power Platform® PP1-R User's Guide Revision A, Nov. 1998.

Dranetz Brochure, "Power Platform 4300 with TASKCard 808 Demand/Energy and Harmonic Analysis", p. 1, 1996.

Dranetz Power Platform® Model 4300 TASKCard® PQLite Operator's Manual Revision A, Jan. 15, 1997.

Dranetz Power Platform® 4300 TASKCard® PQLite User's Guide Revision B, May 1, 2002.

7100/7100S PQNode® User's Guide, pp. iii-33, 1998.

7100/7100S PQNode® User's Guide, pp. iii-33, 1998.

8010 PQNode User's Guide, Revision A, pp. iii-33, 1998.

8010 PQNode User's Guide, Revision A, pp. iii-33, 1998.

Power Measurement Ltd., 3720 ACM Advanced Power Instrumentation Package, pp. 1-12, Sep. 14, 1992.

Brochure, Model 3600A Power Line Disturbance Monitor, pp. 1-5.

Liebert Brochure, Model 3600A Portable Programmable Power Line Disturbance Monitor, pp. 1-2, 1985.

Franklin Electric Service Manual for Model 3600 Power Line Disturbance Monitor, pp. 1-28.

Brochure, "DataNodes™ EPQ Series, A Clear and Open Window to Enhanced Power Quality, Energy and More", pp. 1.

Melhorn et al., "Accessing Power Quality Information and Monitoring Results Using the World Wide Web or a Private Corporate Web", pp. 1-12.

Dranetz Series 5500 InfoNode® User's Guide Revision D, 1999.

Signature System™ Brochure, "Information. Knowledge. Power.", pp. 1-9, 1999.

Dranetz Series 5500 DualNode User's Guide Revision C, 2002.

Dranetz EPQ Datallode® Series User's Guide Revision D, 2000.

Dranetz Power Platform, PP1 SM-PP1 Service Manual, Feb. 1, 1995.

Dranetz Power Platform 4300 Service Manual, Revision B, May 1, 2002.
kV S-Base Meters, pp. 1-2, Sep. 1999.
GE kV Vector Electricity Meter, Product Description, Option Board Installation Procedures, Operating Instructions, Maintenance Instructions and Cite Analysis Guides, 1997.
Manual, "kV Vector Electricity Meter with the Site Genie Monitor".
Gunther et al., "Application of Advanced Characterization Alogrigthms, UCA and Internet Communications Technology At the Point of Power Quantity and Quality Measurement", *Presented at EPRI 1999 PQA Conference*, Charlotte, NC, pp. 1-16, 1999.
Gunther et al., "Application of Advanced Alogrigthms and Internet Communications Technology at the Point of Power Measurement," http:/www.pqmonitoring.com/papersheee99sm/, IEEE Summer Meeting 1999, Jul. 20, 1999, 23 pages.
Dranetz Series 5500 InfoNode User's Guide, Revision D, 2000.
Dranetz Power Evaluation Software User's Guide, Revision H, 2000.
Dranetz Brochure, "Series 626 Universal Disturbance Analyzer", pp. 1-16.
Dranetz 8800 PowerScope® User's Guide, 1992.
Manual, "TM-115000-G1 vol. 2-Service Manual Model 658 Power Quality Analzyer, Revision A," Mar. 1, 1995.
Dranetz 658 PQ Analyzer User's Guide, Revision A, Feb. 15, 1997.
Dranezt Brochure, "Power Platform 4300 Handheld Power Analysis", pp. 1-6, 1995.
"Electronic Energy Meter with Powerline Modem on DSP56F80x", Preliminary Information Application Brief, pp. 1-2, 2000.
Square D Bulletin, "Powerlogic® Series 4000 Circuit Monitor", pp. 1-6, Apr. 2000.
Square D Bulletin, "Powerlogic Ethernet Communication Card", pp. 1-2, Aug. 2000.
"Powerlogic® Advanced Power Reliability Solutions," Square D Schneider Electric, brochure, 2000, 6 pages.
"Powerlogic® Circuit Monitor - Series 2000," Class 3020, Square D Schneider Electric, brochure, 6 pages.
"Powerlogic® Power Meter," Class 3020, Square D Schneider Electric, brochure, 1998, 3 pages.
"Powerlogic® Metering and Monitoring Devices," Square D Schneider Electric, brochure, 2000, 3 pages.
"Powerlogic® Power Monitoring and Control System," Square D Schneider Electric, brochure, 1998, 8 pages.
"Powerlogic® Series 4000 Circuit Monitor," Square D Schneider Electric, brochure, 2000, 4 pages.
"Digest," Square D Schneider Electric, product catalog, Mar. 2000, 10 pages.
"Powerlogic ® Series 4000 Circuit Monitor Now Available with Ethernet Communications Card," Square D Schneider Electric, News Release, Jul. 20, 2000, 2 pages.
"Powerlogic ® Ethernet Communications Card," Square D Schneider Electric, Instruction Bulletin, Sep. 2000, 59 pages.
"Powerlogic ® Series 4000 Circuit Monitor," Square D Schneider Electric, brochure, Apr. 2000, 6 pages.
"Powerlogic ® Ethernet Communication Card," Square D Schneider Electric, brochure, Aug. 2000, 2 pages.
"Powerlogic ® Ethernet Communication Card," Square D Schneider Electric, brochure, Nov. 2004, 2 pages.
"Powerlogic ® Circuit Monitor Series 4000, Instruction Bulletin No. 63230-300-200, Feb. 2000 Now Available with Ethernet Communications Card," Square D Schneider Electric, News Release, Jul. 20, 2000, 282 pages.
"Powerlogic ® Ethernet Communications Card," Schneider Electric, Instruction Bulletin No. 63230-304-200, Sep. 2000, 70 pages.
"Powerlogic ® Circuit Monitor Series 4000 Installation Manual," Schneider Electric, Instruction Bulletin No. 63230-300-209B1, Dec. 2005, 110 pages.
"Powerlogic ® Circuit Monitor Series 4000 Installation Manual," Schneider Electric, Instruction Bulletin No. 63230-300-212B1, Dec. 2005, 234 pages.
"Powerlogic ® Ethernet Communications Card," Schneider Electric, Instruction Bulletin No. 63230-314-202A4, Jan. 2006, 14 pages.
"Powerlogic ® Ethernet Communications Card," Schneider Electric, Instruction Bulletin No. 63230-304-204A4, Jan. 2006, 46 pages.
"GE kV2 Multifunction Electricity Meter," GE Industrial Systems, GEH-7277, Product Description, Operating Instructions, Maintenance Instructions, Upgrading, Site Analysis Guides, Diagrams, Dec. 2000.
Report of Michael O. Warnecke dated May 27, 2009.
Report of Richard Bingham dated Jun. 18, 2009 (pp. 1-56 of 71 (56 pages), and Appendix A (9 pages) (65 pages total)).

* cited by examiner

PUSH COMMUNICATIONS ARCHITECTURE FOR INTELLIGENT ELECTRONIC DEVICES

RELATED APPLICATIONS

This application is a continuation under 37 C.F.R. § 1.53(b) of U.S. patent application Ser. No. 10/340,374 filed Jan. 9, 2003 now U.S. Pat. No. 7,216,043, issued May 8, 2007, the entire disclosure of which is hereby incorporated by reference, U.S. patent application Ser. No. 10/340,374 is a continuation-in-part under 37 C.F.R. § 1.53(b) of U.S. patent application Ser. No. 09/896,570 filed Jun. 29, 2001 now U.S. Pat. No. 6,944,555, issued Sep. 13, 2005, the entire disclosure of which is hereby incorporated by reference, a continuation-in-part under 37 C.F.R. § 1.53(b) of U.S. patent application Ser. No. 09/814,436 filed Mar. 22, 2001 now U.S. Pat. No. 6,751,562, issued Jun. 15, 2004, the entire disclosure of which is hereby incorporated by reference, a continuation-in-part under 37 C.F.R. § 1.53(b) of U.S. patent application Ser. No. 09/723,564 filed Nov. 28, 2000 now U.S. Pat. No. 6,961,641, issued Nov. 1, 2005, the entire disclosure of which is hereby incorporated by reference, and a continuation-in-part under 37 C.F.R. § 1.53(b) of U.S. patent application Ser. No. 10/068,431 filed Feb. 6, 2002, now U.S. Pat. No. 6,694,270, issued Feb. 17, 2004, the entire disclosure of which is hereby incorporated by reference, which is a continuation of U.S. patent application Ser. No. 08/798,723 filed Feb. 12, 1997, abandoned, the entire disclosure of which is hereby incorporated by reference.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of energy per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

Network communications, such as electronic mail transport protocols, are increasingly being utilized in this dynamic market, for example, to effect communications between customers and supplier or to implement monitoring or control networks. Although email offers a robust delivery of communications there is often no guarantee of the message being communicated and real time communications is not always available. Instant Messaging protocols ("IM protocols") can also be used to transport commands or data over a network from device to another. One limitation of the IM protocols is the requirement to have an active connection to communicate between the devices. If a device only periodically connects to the network then any commands sent while the device is offline will fail due to the device not being online or no presence detected. Periodic connectivity may be handled using a store-and-forward mechanism, however, not all IM messaging systems have such a mechanism. Another limitation of most IM systems is that they do not use open source or standard protocols to communicate. In order for these IM protocols to work correctly through firewalls, changes must be made in the configuration of these intervening firewalls. In some situations the responsible entity will be unable or unwilling to make changes to the firewalls configuration for security or policy reasons. For these reasons, instant messaging is frequently specifically blocked from crossing any intervening firewalls. While many instant messaging protocols are designed to find any outgoing holes in the firewalls, many companies spend a fair amount of time disabling as many of the instant messaging protocols as possible to prevent the possibility of leaking unauthorized information into unsecured networks. A further problem is that if both IM devices are connected with secure networks, each behind a firewall, then direct communication is not possible unless one or both firewalls are specially modified to allow tunneling from external devices to the internal, protected network. The IM system must provide external servers that will proxy the IM messages in this case or communication will not be possible.

The requirements of increased demand and higher reliability are burdening an already overtaxed distribution network and forcing utilities to invest in infrastructure improvements at a time when the deregulated competitive market is forcing them to cut costs and lower prices. With these investments comes a demand for robust and reliable communications methodologies that can operate in a heterogeneous mix of secure and unsecure networks. Accordingly, there is a need for a system of transporting data between networks that operates within the restrictions created by firewalls and other network security barriers.

SUMMARY

The present invention is defined by the following claims, and nothing in this section should be taken as a limitation on those claims. By way of introduction, the embodiments described below relate an electrical power management architecture for managing an electrical power distribution system. The architecture includes a secure network; a first power management device coupled with the secure network; an unsecure network; a second power management device coupled with the unsecure network; a firewall coupled between the secure network and the unsecure network and operative to facilitate communications between the secure network and the unsecure network, the firewall further operative to prevent unsolicited communications from the unsecure network to the secure network; the second power management device operative to send at least one unsolicited message to the first power management device, the at least one unsolicited message comprising at least one of a power management command and power management data; and wherein the first power management device is operative to generate a first unsolicited communication to the second power management device and the second power management device is further operative to generate a first solicited communication to the first power management device in response to the first unsolicited communication, the first solicited communication comprising the at least one unsolicited message.

The disclosed embodiments further relate to a method for managing an electrical power distribution system. The method includes: coupling a first power management device with a secure network; coupling a second power management device with an unsecure network, the unsecure network coupled with the secure network via a firewall, the firewall facilitating communications between the secure network and the unsecure network and preventing unsolicited communications from the unsecure network to the secure network, sending at least one unsolicited message to the first power management device from the second power management device, the at least one unsolicited message comprising at least one of a power management command and power management data. The sending further includes: generating a first unsolicited communication to the second power management device by the first power management device; and generating a first solicited communication to the first power management device by the second power management device in response to the first unsolicited communication, the first solicited communication comprising the at least one unsolicited message.

Further aspects and advantages of the invention are discussed below in conjunction with the disclosed embodiments.

BRIEF DESCRIPTION OF THE DRAWINGS

FIG. 3b shows a block diagram illustrating the internal components of the IED of FIG. 3a.

FIG. 3c shows a block diagram illustrating an exemplary protocol stack used in the IED of FIG. 3a.

FIG. 18b shows a flow chart illustrating the operation of the HTTP Polling architecture depicted in FIG. 18a.

FIG. 19b shows a flow chart illustrating the operation of the HTTP Rendezvous architecture depicted in FIG. 19a.

DETAILED DESCRIPTION OF THE PRESENTLY PREFERRED EMBODIMENTS

Figure 1:
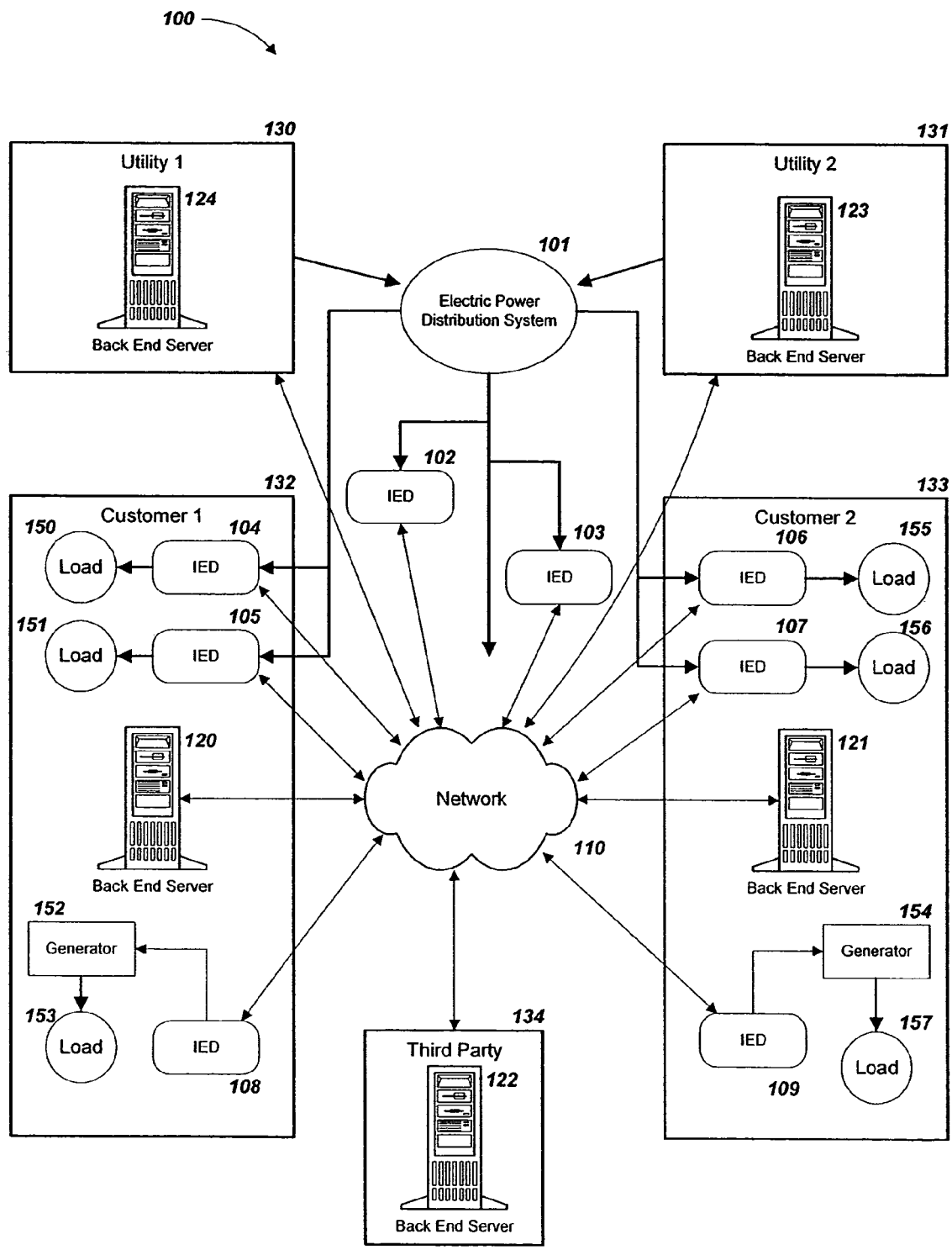
FIG. 1 shows a block diagram illustrating a first embodiment of a Power Management Architecture.

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes the ability to communicate with remote computing systems, either via a direct connection, e.g. modem or via a network. For more detailed information regarding IED's capable of network communication, please refer to U.S. Pat. No. 6,961,641, issued Nov. 1, 2005, entitled "INTRA-DEVICE COMMUNICATIONS ARCHITECTURE FOR MANAGING ELECTRICAL POWER DISTRIBUTION AND CONSUMPTION" and U.S. Pat. No. 6,751,562, issued Jun. 15, 2004, entitled "COMMUNICATIONS ARCHITECTURE FOR INTELLIGENT ELECTRONIC DEVICES", captioned above, In particular, the monitoring of electrical power, especially the measuring and calculating of electrical parameters, may provide valuable information for power utilities and their customers. Monitoring of electrical power is important to ensure that the electrical power is effectively and efficiently generated, distributed and utilized. More importantly, monitoring of the electrical power in real time, and responding to the monitored results in real time, can provide for tremendous cost savings in today's marketplace.

One method of monitoring the distribution and/or use of electrical power utilizes electronic mail ("email") as is known in the art. In such monitoring system that utilize email, monitoring devices generate email messages in response to events and transmit those email messages to preprogrammed destinations to alert the recipient of the event. Generally, a message transmitted by email goes through three phases: phase 1—the message has been delivered; phase 2—the message has not been delivered; and phase 3, the message is in transit. Unfortunately, the third phase inserts a measure of uncertainty into the monitoring system as the email message may be delayed while routing through the network or, worse yet, diverted and/or lost. With the dynamic market place today, where power consumption and their associated fortunes can be made or lost in seconds, a user must be able to respond immediately in real time and cannot rely on a system where the operation may be indeterminate. The disclosed embodiments provide a monitoring system which eliminates the uncertain message transfer state and provide reliable communications among the monitoring devices of the electrical power distribution system.

Various different arrangements are presently available for monitoring, measuring, and controlling power parameters. Typically, an IED, such as an individual power measuring device, is placed on a given branch or line proximate to one or more loads which are coupled with the branch or line in order to measure/monitor power system parameters. Herein, the phrase "coupled with" is defined to mean directly connected to or indirectly connected with through one or more intermediate components. Such intermediate components may include both hardware and software based components. In addition to monitoring power parameters of a certain load(s), such power monitoring devices have a variety of other applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's/power measuring devices individually dial-in to a central SCADA computer system via a modem. However, such dial-in systems are limited by the number of inbound telephone lines to the SCADA computer and the availability of phone service access to the IED/power measuring devices. With a limited number of inbound telephone lines, the number of IED's/power measuring devices that can simultaneously report their data is limited resulting in limited data throughput and delayed reporting. Further, while cellular based modems and cellular system access are widely available, providing a large number of power measuring devices with phone service is cumbersome and often cost prohibitive. The overall result is a system that is not easily scalable to handle a large number of IED's/power measuring devices or the increased bandwidth and throughput requirements of advanced power management applications. However, the ability to use a computer network infrastructure, such as the Internet, allows for the use of power parameter and data transmission and reporting on a large scale. The Internet provides a connectionless point to point communications medium that is capable of supporting substantially simultaneous communications among a large number of devices. For example this existing Internet infrastructure can be used to simultaneously push out billing, load profile, or power quality data to a large number of IED/power measurement and control devices located throughout a power distribution system that can be used by those devices to analyze or make intelligent decisions based on power consumption at their locations. The bandwidth and throughput capabilities of the Internet supports the additional requirements of advanced power management applications. For example, billing data, or other certified revenue data, must be transferred through a secure process which prevents unauthorized access to the data and ensures receipt of the data by the appropriate device or entity. Utilizing the Internet, communications can be encrypted such as by using encrypted email. Further, encryption authentication parameters such as time/date stamp or the IED serial number, can be employed. Within the Internet, there are many other types of communications protocols that may be employed to facilitate the above described inter-device communications such as email, Telnet, file transfer protocol ("FTP"), trivial file transfer protocol ("TFTP") or proprietary protocols, both unsecured and secure/encrypted.

As used herein, Intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical power distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is designed as an industrial control system. An exemplary PLC is the SLC 500 Series, manufactured by Allen-Bradley in Milwaukee, Wis.

A meter, is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses or monitors the pulse output of the meter. An exemplary electromechanical meter is the AB1 Meter manufactured by ABB in Raleigh, N.C. Such conversion devices are known in the art.

The disclosed embodiments relate to a communications architecture that can be used for monitoring, protection and control of devices and electrical power distribution in an electrical power distribution system, where IED's can interact with other IED's and other devices that may be coupled with IED's.

As will be described in more detail below, a power management architecture for an electrical power distribution system, or portion thereof, is disclosed. The architecture provides a scalable and cost effective framework of hardware and software upon which power management applications can operate to manage the distribution and consumption of electrical power by one or more utilities/suppliers and/or customers which provide and utilize the power distribution system.

Power management applications include automated meter reading applications, load shedding applications, deregulated supplier management applications, on-site power generation management applications, power quality management applications, protection/safety applications, and general distribution system management applications, such as equipment inventory and maintenance applications. A power management application typically includes one or more application components which utilize the power management architecture to interoperate and communicate thereby implementing the power management application.

The architecture includes Intelligent Electronic Devices ("IED's") distributed throughout the power distribution system to monitor and control the flow of electrical power. IED's may be positioned along the supplier's distribution path or within a customer's internal distribution system. IED's include revenue electric watt-hour meters, protection relays, programmable logic controllers, remote terminal units, fault recorders and other devices used to monitor and/or control electrical power distribution and consumption. As was noted, IED's also include legacy mechanical or electromechanical devices which have been retrofitted with appropriate hardware and/or software so as to be able to integrate with the power management architecture. Typically an IED is associated with a particular load or set of loads which are drawing electrical power from the power distribution system. As was described above, the IED may also be capable of receiving data from or controlling its associated load. Depending on the type of IED and the type of load it may be associated with, the IED implements a power management function such as measuring power consumption, controlling power distribution such as a relay function, monitoring power quality, measuring power parameters such as phasor components, voltage or current, controlling power generation facilities, or combinations thereof. For functions which produce data or other results, the IED can push the data onto the network to another IED or back end server, automatically or event driven, (discussed in more detail below) or the IED can wait for a polling communication which requests that the data be transmitted to the requester.

In addition, the IED is also capable of implementing an application component of a power management application utilizing the architecture. As was described above and further described below, the power management application includes power management application components which are implemented on different portions of the power management architecture and communicate with one another via the architecture network. The operation of the power management application components and their interactions/communications implement the overall power management application. One or more power management applications may be utilizing the architecture at any given time and therefore, the IED may implement one or more power management application components at any given time.

The architecture further includes a communications network. Preferably, the communication network is a publicly accessible data network such as the Internet or other network or combination of sub-networks that transmit data utilizing the transmission control protocol/internet protocol ("TCP/IP") protocol suite. Such networks include private intranet networks, virtual private networks, extranets or combinations thereof and combinations which include the Internet. Alternatively, other communications network architectures may also be used. Each IED preferably includes the software and/or hardware necessary to facilitate communications over the communications network by the hardware and/or software which implements the power management functions and power management application components. In alternative embodiments, quality of service protocols can be implemented to guarantee timely data delivery, especially in real time applications.

The hardware and/or software which facilitate network communications preferably includes a communications protocol stack which provides a standard interface to which the power management functions hardware/software and power management application components hardware/software interact. As will be discussed in more detail below, in one embodiment, the communications protocol stack is a layered architecture of software components. In the disclosed embodiments these layers or software components include an applications layer, a transport layer, a routing layer, a switching layer and an interface layer.

The applications layer includes the software which implements the power management functions and the power management applications components. Further, the applications layer also includes the communication software applications which support the available methods of network communications. Typically, the power management function software interacts with the power management hardware to monitor and or control the portion of the power distribution system and/or the load coupled with the IED. The application component typically interacts with the power management function software to control the power management function or process data monitored by the power management function. One or both of the power management function software and the power management application component software interacts with the communication software applications in order to communicate over the network with other devices.

The communications applications include electronic mail client applications such as applications which support SMTP, MIME or POP network communications protocols, security client applications such as encryption/decryption or authentication applications such as secure-HTTP or secure sockets layer ("SSL"), or other clients which support standard network communications protocols such as telnet, hypertext transport protocol ("HTTP"), file transfer protocol ("FTP"), network news transfer protocol ("NNTP"), instant messaging client applications, or combinations thereof. Other client application protocols include extensible markup language ("XML") client protocol and associated protocols such as Simple Object Access Protocol ("SOAP"). Further, the communications applications could also include client applications which support peer to peer communications. All of the communications applications preferably include the ability to communicate via the security client applications to secure the communications transmitted via the network from unauthorized access and to ensure that received communications are authentic, uncompromised and received by the intended recipient. Further, the communications applications include redundant operation capabilities through the use of one or more interface layer components (discussed in more detail below), error detection and correction and the ability to communicate through firewalls or similar private network protection devices.

The transport layer interfaces the applications layer to the routing layer and accepts communications from the applications layer that are to be transmitted over the network. The transport layer breaks up the communications layer into one or more packets, augments each packet with sequencing data and addressing data and hands each packet to the routing layer. Similarly, packets which are received from the network are reassembled by the transport layer and the re-constructed communications are then handed up to the applications layer and the appropriate communications applications client. The transport layer also ensures that all packets which make up a given transmission are sent or received by the intended destination. Missing or damaged packets are re-requested by the transport layer from the source of the communication. In one embodiment, the transport layer implements the Transmission control protocol ("TCP").

The routing layer interfaces the transport layer to the switching layer. The routing layer routes each packet received from the transport layer over the network. The routing layer augments each packet with the source and destination address information. In one embodiment, the routing layer implements the internet protocol ("IP"). It will be appreciated that the TCP/IP protocols implement a connectionless packet switching network which facilitates scalable substantially simultaneous communications among multiple devices.

The switching layer interfaces the routing layer to the interface layer. The switching layer and interface layer are typically integrated. The interface layer comprises the actual hardware interface to the network. The interface layer may include an Ethernet interface, a modem, such as wired modem using the serial line interface protocol ("SLIP") or point to point protocol ("PPP"), wired modem which may be an analog or digital modem such as a integrated services digital network ("ISDN") modem or digital subscriber line ("DSL") modem, or a cellular modem. Further, other wireless interfaces, such as Bluetooth, may also be used. In addition, AC power line data network interface may also be used. Cellular modems further provide the functionality to determine the geographic location of the IED using cellular RF triangulation. Such location information can be transmitted along with other power management data as one factor used in authenticating the transmitted data. In the disclosed embodiments, the interface layer allows for redundant communication capabilities. The interface layer couples the IED with a local area network, such as a LAN provided at the customer or utility site. Alternatively, the interface layer can couple the IED with a point of presence provided by a local network provider such as an internet service provider ("ISP").

Finally, the architecture includes back-end server computers or data collection devices. Back end servers may be provided by the consumer of electric power, the utility supplier of electric power or a third party. In one embodiment, these devices are IED's themselves. The back end servers are also coupled with the network in a same way as the IED's and may also include a communication protocol stack. The back end servers also implement power management applications components which interact and communicate with the power management application components on the IED's to accomplish the power management application. Preferably, the IED's are programmed with the network addresses of the appropriate back end servers or are capable of probing the network for back end servers to communicate with. Similarly, the back end server is programmed with the network addresses of one or more affiliate IED's or is capable of probing the network to find IED's that are connected. In either case of network probing by the IED or back-end server, software and/or hardware is provided to ensure that back-end servers communicate with authorized IED's and vice versa allowing multiple customers and multiple suppliers to utilize the architecture for various power management applications without interfering with each other.

The back end servers preferably are executing software application counterparts to the application clients and protocols operating on the IED's such as electronic mail, HTTP, FTP, telnet, NNTP or XML servers which are designed to receive and process communications from the IED's. Exemplary server communications applications include the Microsoft Exchange™ server, manufactured by Microsoft Corporation, located in Redmond, Wash. The back end server is therefore capable of communicating, substantially simultaneously, with multiple IED's at any given time. Further, the back end server implements a security application which decrypts and/or authenticates communications received from IED's and encrypts communications sent to IED's.

In one embodiment, software executing on the back end server receives communications from an IED and automatically extracts the data from the communication. The data is automatically fed to a power management application component, such as a billing management component.

In this way, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As used herein, an IED or PMD is a power management device capable of network communication. A back end server is a data collection or central command device coupled with the network which receives power management data from an IED and/or generates power management commands to and IED. An IED may contain a back-end server. The network is any communications network which supports the Transmission Control Protocol/internet Protocol ("TCP/IP") network protocol suite. In the disclosed embodiment IED's include devices such as PLC's, RTU's, meters, protection relays, fault recorders or modified electromechanical devices and further include any device which is coupled with an electrical power distribution network, or portion thereof, for the purpose of managing or controlling the distribution or consumption of electrical power.

FIG. 1 illustrates an overview of one exemplary embodiment of a Power Management Architecture ("architecture") 100, which contains one or more IED's 102, 103, 104, 105, 106, 107, 108, 109. The IED's 102-109 are connected to an electrical power distribution system 101, or portion thereof, to measure, monitor and control quality, distribution and consumption of electric power from the system 101, or portion thereof. The power distribution system is typically owned by either a utility/supplier or consumer of electric power however some components may be owned and/or leased from third parties. The IED's 102-109 are further interconnected with each other and back end servers 121, 122, 123, 124 via a network 110 to implement a Power Management Application ("application") 111 (not shown). In one embodiment, the network 110 is the Internet. Alternatively, the network 110 can be a private or public intranet, an extranet or combinations thereof, or any network utilizing the Transmission Control Protocol/Internet Protocol ("TCP/IP") network protocol suite to enable communications, including IP tunneling protocols such as those which allow virtual private networks coupling multiple intranets or extranets together via the Internet. The network 110 may also include portions or sub-networks which use wireless technology to enable communications, such as RF, cellular or Bluetooth technologies. The network 110 preferably supports application protocols such as telnet, FTP, POP3, SMTP, NNTP, Mime, HTTP, SMTP, SNNP, IMAP, proprietary protocols or other network application protocols as are known in the art as well as transport protocols SLIP, PPP, TCP/IP and other transport protocols known in the art.

The Power Management Application 111 utilizes the architecture 100. The power Management Application 111 comprises power management application components which implement the particular power management functions required by the application 111. The power management application components are located on the IED 102-109 or on the back end server 121-124, or combinations thereof, and can be a client component, a server component or a peer component. Application components communicate with one another over the architecture 100 to implement the power management application 111.

In one embodiment the architecture 100 comprises IED's 102-109 connected via a network 110 and back end servers 120, 121, 122, 123, 124 which further comprise software which utilizes protocol stacks to communicate. IED's 102-109 can be owned and operated by utilities/suppliers 130, 131, consumers 132 133 or third parties 134 or combinations thereof Back end servers 120 121 122 123 124 can be owned by utilities/suppliers 130, 131, consumers 132, 133, third parties 134 or combinations thereof For example, an IED 102-109 is operable to communicate directly over the network with the consumer back-end server 120, 121, another IED 102-19 or a utility back end server 123,124. In another example, a utility back end server 123, 124 is operable to connect and communicate directly with customer back end servers 120, 121. Further explanation and examples on the types of data and communication between IED's 102-109 are given in more detail below.

Furthermore, the architecture's 100 devices, such as the back end servers 120-124 or IED's 102-109, can contain an email server and associated communications hardware and software such as encryption and decryption software. Other transfer protocols, such as file transfer protocols ("FTP"), Simple Object Access Protocol ("SOAP"), HTTP, XML or other protocols know in the art may also be used in place of electronic mail. Hypertext Transfer Protocol ("HTTP") is an application protocol that allows transfer of files to devices connected to the network. FTP is a standard internet protocol that allows exchange of files between devices connected on a network. Extensible markup language ("XML") is a file format similar to HTML that allows transfer of data on networks. XML is a flexible, self describing, vendor-neutral way to create common information formats and share both the format and the data over the connection. In one embodiment the data collection server is operable by either the supplier/utility 123, 124 or the customer 132, 133 of the electrical power distribution system 101. SOAP allows a program running one kind of operating system to communicate with the same kind, or another kind of operating system, by using HTTP and XML as mechanisms for the information exchange.

Furthermore, the application 111 includes an authentication and encryption component which encrypts commands transmitted across the network 110, and decrypts power management data received over the network 110. Authentication is also performed for commands or data sent or received over the network 110. Authentication is the process of determining and verifying whether the IED 102-109 transmitting data or receiving commands is the IED 102-109 it declares itself to be and in one embodiment authentication includes parameters such as time/date stamps, digital certificates, physical locating algorithms such as cellular triangulation, serial or tracking ID's, which could include geographic location such as longitude and latitude. Authentication prevents fraudulent substitution of IED 102-109 devices or spoofing of IED 102-109 data generation in an attempt to defraud. Authentication also minimizes data collection and power distribution system 101 control errors by verifying that data is being generated and commands are being received by the appropriate devices. In one embodiment encryption is done utilizing Pretty Good Privacy (PGP). PGP uses a variation of public key system, where each user has a publicly known encryption key and a private key known only to that user. The public key system and infrastructure enables users of unsecured networks, such as the internet, to securely and privately exchange data through the use of public and private cryptographic key pairs.

In the disclosed embodiments, the architecture is connectionless which allows for substantially simultaneous communications between a substantial number of IED's within the architecture. This form of scalability eclipses the current architectures that utilize point to point connections, such as provided by telephony networks, between devices to enable communications which limit the number of simultaneous communications that may take place.

Figure 2A:
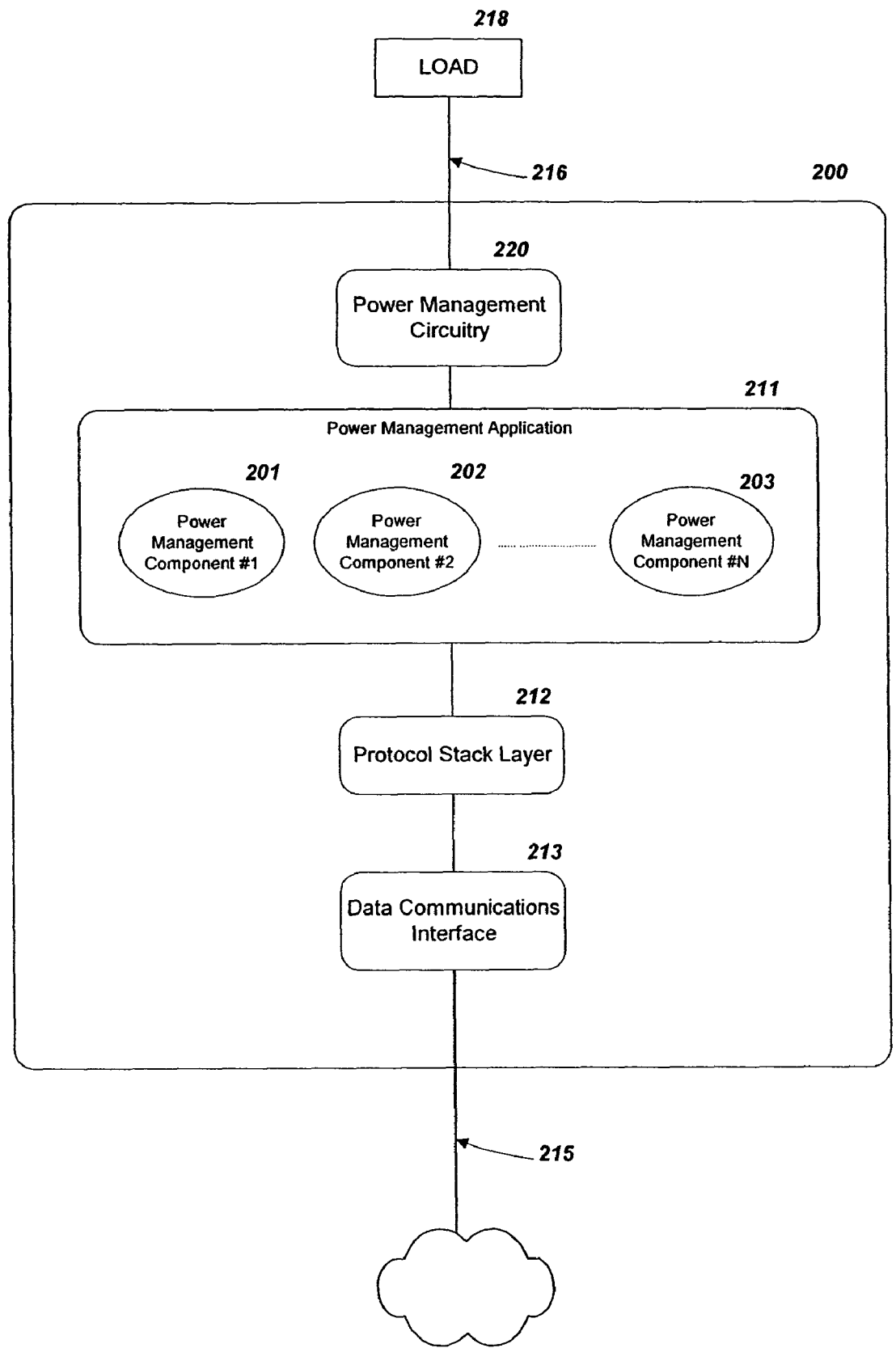
FIG. 2a shows a block diagram illustrating one embodiment of an IED, for use with the architecture of FIG. 1, containing several power management components.

FIG. 2a illustrates one embodiment where and IED 200 contains several power management components 201 202 203 and power management circuitry 220. The power management circuitry 220 is operable to implement the IED's functionality, such as metering/measuring power delivered to the load 218 from the electrical power distribution system 216, measuring and monitoring power quality, implementing a protection relay function, or other functionality of the IED 200. The IED 200 further includes a power management application components 211 coupled with the circuitry 220 and a protocol stack 212 and data communication interface 213. The protocol stack 212 and data communications interface 213 allow the IED 200 to communicate over the network 215. It will be appreciated that, as described below, the protocol stack 212 may include an interface layer which comprises the data communications interface 213. The power management application components 211 include software and/or hardware components which, alone, or in combination with other components, implement the power management application 111. The components 211 may include components which analyze and log the metered/measured data, power quality data or control operation of the IED 200, such as controlling a relay circuit. The components 211 further include software and/or hardware which processes and communicates data from the IED 200 to other remote devices over the network 215, such as back end servers 121-124 or other IED's 200 (102-109), as will be described below. For example, the IED 200 is connected to a load 218. The power management circuitry 220 includes data logging software applications, memory and a CPU, which are configured to store kWh data from the load 218 in a memory contained within the power management circuitry. The stored data is then read and processed by the components 201 202 in the power management application 211. The components communicate with operating system components which contain the protocol stack 212 and the processed data is passed over the network 215 to the appropriate party via the data communications interface 213. One or more of the components 211 may communicate with one or more application components located on one or other IED's 200 and/or one or more back end servers 121-124.

Figure 2B:
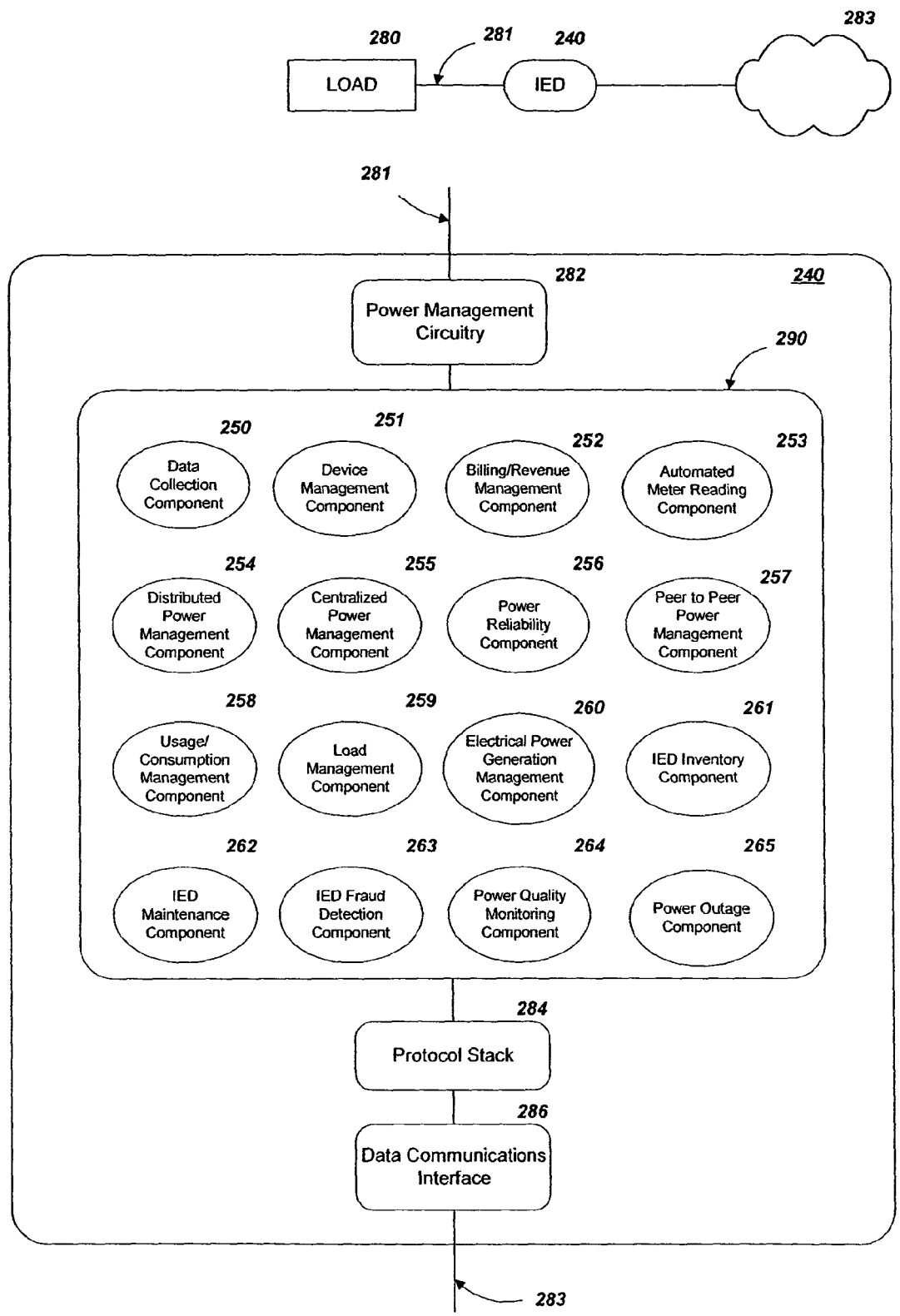
FIG. 2b shows a block diagram illustrating a second embodiment of an IED, for use with the architecture of FIG. 1, containing several power management components.

FIG. 2b illustrates an alternate embodiment where an IED 240 is provided which includes power management application components 290. A load 280 is connected to an IED 240 via the electrical power distribution system 281. The IED 240 is further connected to the network 283. The IED 240 contains power management circuitry which is operable to implement the IED's functionality, such as receiving power and generating data from the load 280. The IED further includes a protocol stack layer 284 and a data communication interface 286 which allows the back end server to communicate over the network 283. The power management application components 290 include one or more components such as data collection component 250, an automated meter reading component 253 and a billing/revenue management component 252, which may be revenue certified, a peer-to-peer power management component 257, a usage and consumption management component 258, a distributed power management component 254, a centralized power management component 255, a load management component 259, an electrical power generation management component 260, an IED inventory component 261, an IED maintenance component 262, an IED fraud detection component 263, a power quality monitoring component 264, a power outage component 265, a device management component 251, a power reliability component 256, or combinations thereof. Furthermore, components contained on one IED 240 may operate simultaneously with components on an IED 102-109, 200 or another IED 240 or back end server (not shown). More component details and examples are given below.

In one embodiment the application components comprise software components, such as an email server or an XML or HTTP server. These servers may include a Microsoft Exchange server or a BizTalk framework/XML compatible server. A Microsoft Exchange™ server is an email server computer program manufactured by Microsoft Corporation, located in Redmond, Wash., typically operating on a server computer which facilitates the reception and transmission of emails, and forwards emails to the email client programs, such as Microsoft Outlook™, of users that have accounts on the server. BizTalk is a computer industry initiative which promotes XML as the common data exchange for e-commerce and application integration over the internet. BizTalk provides frameworks and guidelines for how to publish standard data structures in XML and how to use XML messages to integrate software components or programs. Alternately, hardware components, such as a dedicated cellular phone, GPS encryption or decryption key or dongle are included in the components. In an alternate embodiment, a combination of both hardware and software components are utilized. Additionally, referring back to FIG. 1, one or more power management application components 290 can utilize the architecture 100 to implement their functionality. For example, a utility 130 has a back end server 124 which contains power management application and associated components, such as a usage and consumption monitoring component 258. The utility 130 supplies power to a consumer 132 via the power distribution network 110 and monitors the consumer's power consumption using the power management application components on the back end server 124 which communicates with the IED's 104, 105, 108 via the network 110 to retrieve measured consumption/usage data. The consumer 132 concurrently monitors usage of loads 150, using an IED 104, 105, 108 which is connected to the network 110, computing real time costs posted by the utility 130. In one embodiment, the consumer 132 monitors usage using back end server 120 which receives usage and consumption data from the IED's 104, 105, 108 via the network 110. The IED 104, 105, 108 implements power management application components such as load management components and billing management components. The back end server 120, 124 implements power management application components such as a data collection component, a billing/revenue management component, an automated meter reading component or a usage/consumption management component. The components on the IED 104, 105, 108 work in concert with the components on the back end server 120, 124 via the network 110 to implement the overall power management application. In a further embodiment, one or more power management application components are operating on IED 104, 105, 108 and/or back end servers 120, 124 at any given time. Each power management application can be utilized by one or more users, or different applications can be used by different users. Moreover, the application components can exist on the same or different IED's 104, 105, 108 or back end servers 120, 124.

In the disclosed embodiments, the data collection component 250 enables an IED to collect and collate data from either a single or multiple sources via the network 110. The data collected by the component is stored and can be retrieved by other components of the power management application components 290, or other components implemented on other IED's 102-109 located on the network 110. In one embodiment the Automated Meter Reading component 253 is utilized to allow either the consumers 132, 133 or providers 130, 131 to generate power management reports from the IED data. In one embodiment the electrical power generation management component 260 analyzes data received from IED's 102-109 to either minimize or maximize measured or computed values such as revenue, cost, consumption or usage by use of handling and manipulating power systems and load routing. IED inventory, maintenance and fraud detection component 261, 262, 263 receive or request communications from the IED's 102-109 allowing the power management application to inventory the installed base of IED's 102-109, including establishing or confirming their geographic installation location, or check the maintenance history of all connected IED's 102-109 These power management applications aid in confirming outage locations or authenticating communications to or from an IED 102-109 to prevent fraud and minimize errors. In one embodiment, the IED inventory component 261 utilizes cellular triangulation technologies, or caller ID based geographic locator technologies to determine and verify IED inventories. In one embodiment the fraud detection component 263 further detects device tampering. In one embodiment the power quality monitoring component 264 monitors and processes electric parameters, such as current, voltage and energy which include volts, amps, Watts, phase relationships between waveforms, kWh, kvAr, power factor, and frequency, etc. The power quality monitoring component 264 reports alarms, alerts, warnings and general power quality status, based on the monitored parameters, directly to the appropriate user, such as customers 132, 133 or utilities 130, 131.

Figure 3A:
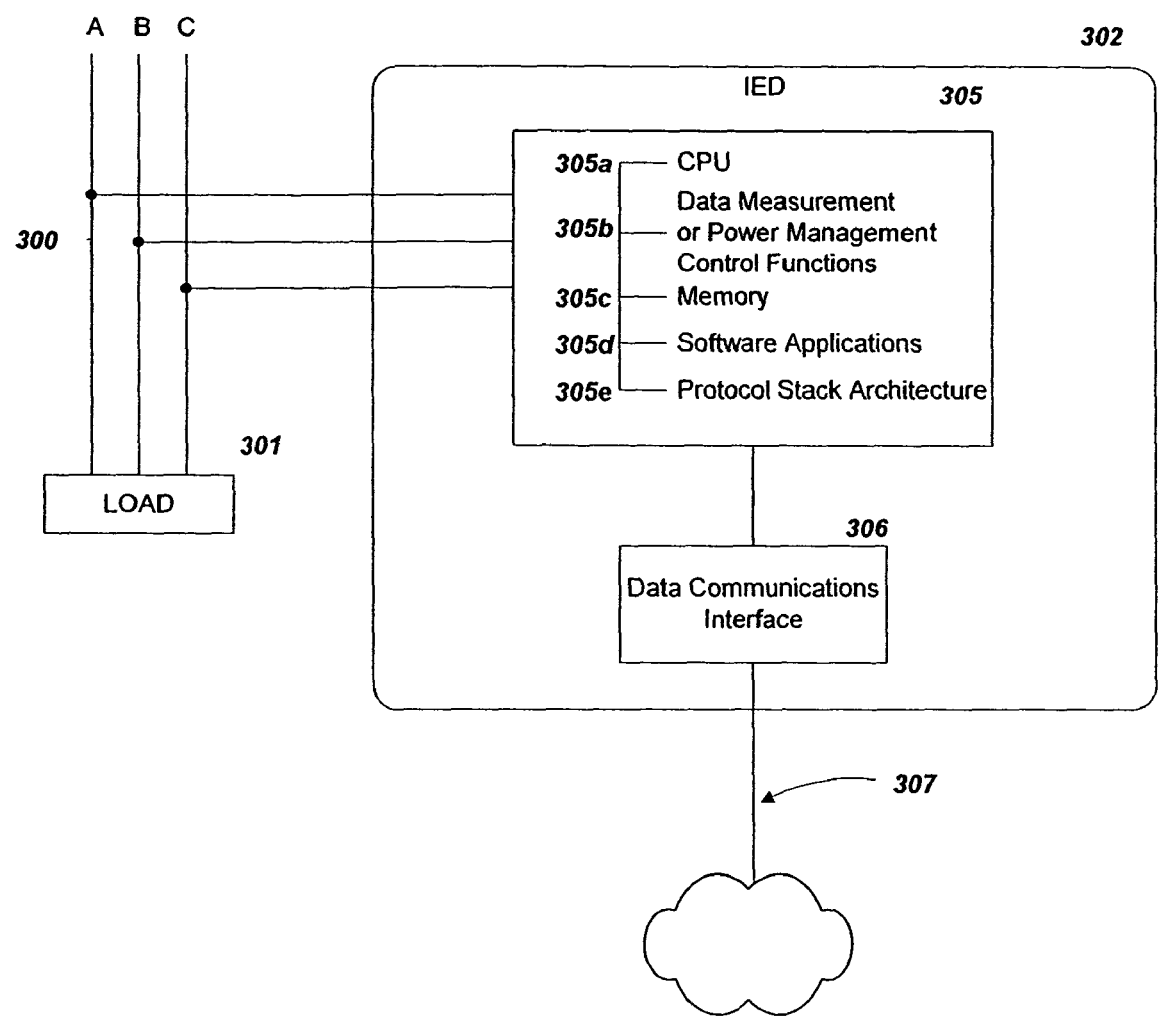
FIG. 3a shows a block diagram illustrating a third embodiment of an IED, for use with the architecture of FIG. 1, coupled with a power system.

FIG. 3a illustrates one embodiment of an IED 302 for use with the disclosed power management architecture 100. The IED 302 is preferably coupled with a load 301 via a power a distribution system 300, or portion thereof. The IED 302 includes device circuitry 305 and a data communications interface 306. The IED 302 is further coupled with a network 307. The device circuitry 305 includes the internal hardware and software of the device, such as the CPU 305a, memory 305c, firmware and software applications 305d, data measurement functions 305b and communications protocol stack 305e. The data communication interface 306 couples the device circuitry 305 of the IED 302 with the communications network 307. Alternate embodiments may have power management control functions 305b in place of data measurement circuitry. For example, a relay may include a control device and corresponding control functions that regulate electricity flow to a load based on preset parameters. Alternately a revenue meter may include data measurement circuitry that logs and processes data from a connected load. IED's may contain one or the other or combinations of circuitry. In an alternate embodiment the circuitry includes phasor monitoring circuits (not shown) which comprise phasor transducers that receive analog signals representative of parameters of electricity in a circuit over the power distribution system. Further detail and discussion regarding the phasor circuitry is discussed in U.S. patent application Ser. No. 08/798,723, captioned above.

Figure 3B:
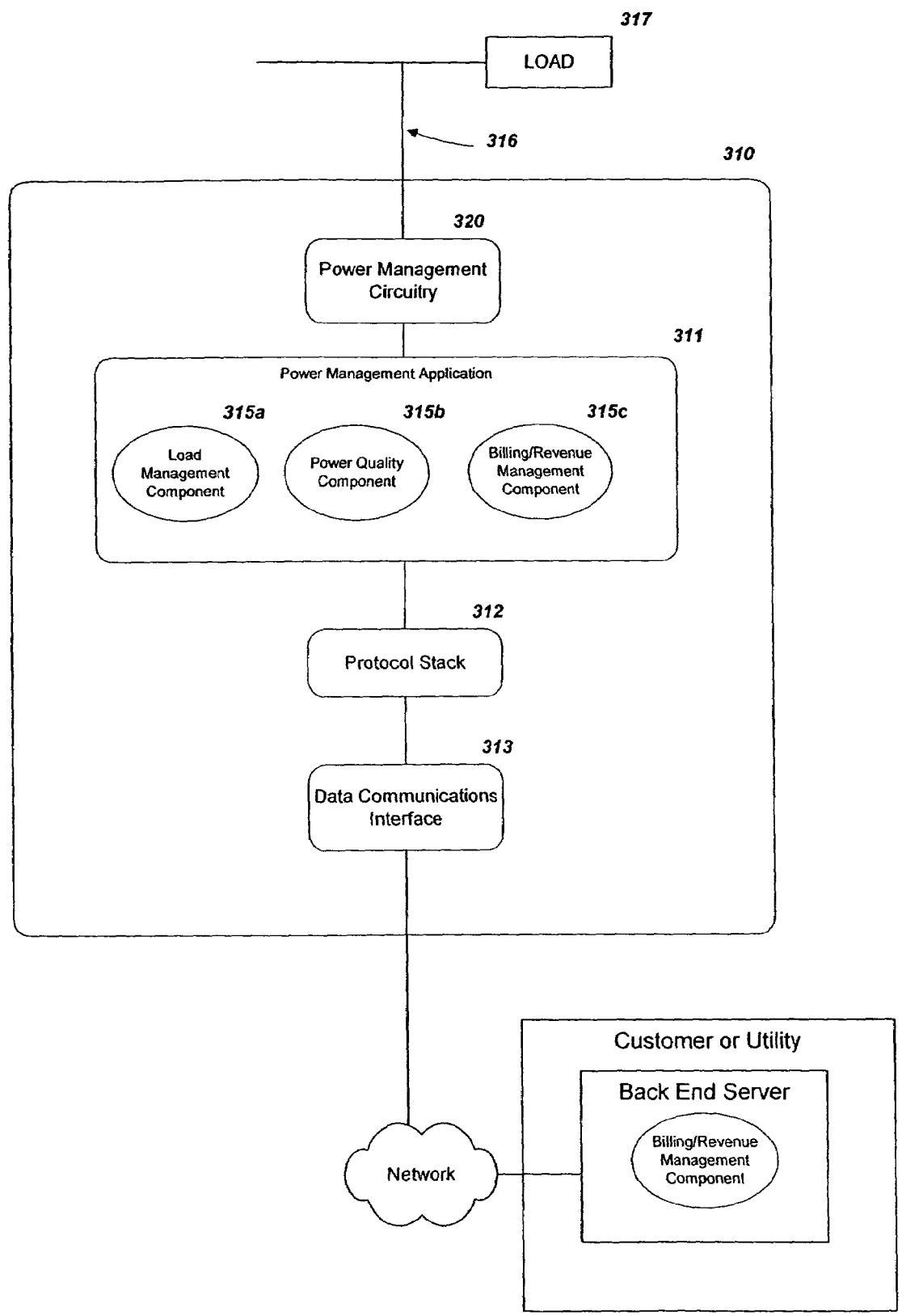

FIG. 3b illustrates a more detailed embodiment of the IED's 310 power management application components 311 and protocol stacks. The IED 310 includes power management application components 311, a communications protocol stack 312 and a data communications interface 313 (as was noted above, in alternate embodiments, the protocol stack 312 may include the data communications interface 313). The application components 311 includes a Load management component 315a, which measures the load's 301 consumption of electrical power from the portion of the power distribution system 316, a Power Quality component 315b, which measures power quality characteristics of the power on the portion of the power distribution system 316, and a billing/revenue management component 315c, which computes the quantity and associated value of the incoming power. The power management components are connected to the network via the data communications interface 312 using the communications protocol stack 312 (described in more detail below).

In one embodiment, a Billing/Revenue Management component on a back end server receives the billing and revenue computations over the network 307 from the billing/revenue management component 315c on the IED 310. These computations are translated into billing and revenue tracking data of the load 317 associated with the IED 310. The Billing/Revenue Management component on the back end server then reports the computations to the appropriate party operating that particular back end server or subscribing to a service provided by the operator of the back end server, either the consumer or provider of the electrical power. Additionally, the Billing/Revenue Management component 315c on the IED 310 or the Billing/Revenue Management component on the back end server computes usage and cost computations and tracking data of the associated load and reports the data to the appropriate party. In still another embodiment, IED 310 transmits billing and revenue data directly to the Billing/Revenue Management component over the network 307 and the Billing/Revenue Management component computes usage and cost computations and tracking data of the associated load and reports the data directly to the appropriate party. Furthermore, tariff data received from the utility by the Billing/Revenue Management component 315c may be factored into usage or cost computations.

Figure 3C:
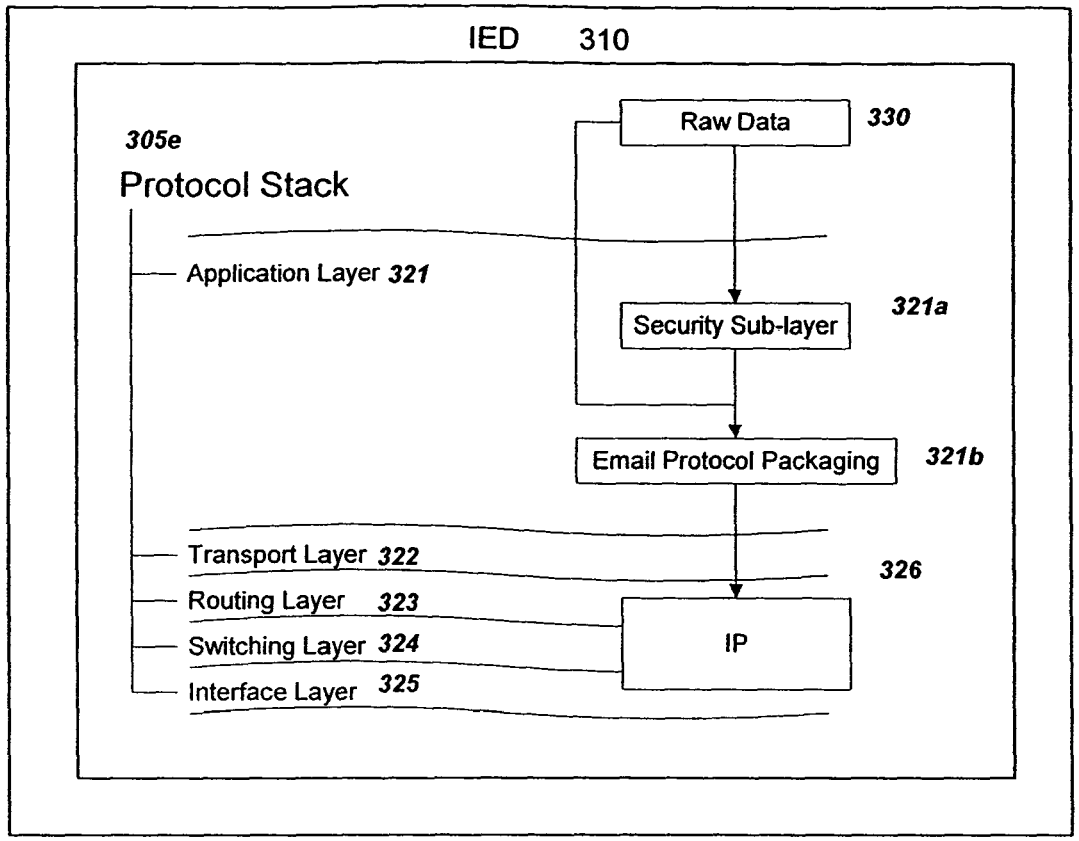

FIG. 3c illustrates one embodiment of the communications protocol stack 305e. In one embodiment the connection between devices coupled with the network 110 is established via the Transmission Control Protocol/Internet Protocol ("TCP/IP") protocol suite. To facilitate communications over a network or other communications medium, devices typically include a set of software components known as a protocol stack. The protocol stack handles all of the details related to communicating over a given network so that other application programs executing on the device need not be aware of these details. The protocol stack effectively interfaces one or more application programs executing on the device to the network to which the device is connected. Typically, the protocol stack is arranged as a layered architecture with one or more software components in each layer. In one embodiment, the protocol stack includes an application layer 321, a transport layer 322, a routing layer 323, a switching layer 324 and an interface layer 325. The application layer 321 includes all of the applications component software and/or power management component software. The application layer 321 is coupled with the transport layer 322. Applications or software components in the application layer communicate with the transport layer in order to communicate over the network. In one embodiment, the transport layer is implemented as the Transmission Control Protocol ("TCP"). The transport layer, using TCP, divides communications from the applications of the application layer 321 into one or more packets for transmission across the network. The transport layer adds information about the packet sequence to each packet plus source and destination information about what application component generated the communication and to what application component on the receiving end the communication should be delivered to once reassembled from the constituent packets. The routing layer is coupled with the transport layer and is responsible for routing each packet over the network to its intended destination. In one embodiment, the routing layer is implemented as the Internet Protocol ("IP") and utilizes internet protocol addresses to properly route each packet of a given communication. The switching and interface layers 324, 325 complete the protocol stack and facilitate use of the physical hardware which couples the device to the network. This hardware may include an Ethernet interface, a modem, or other form of physical network connecting including RF based connections such as Bluetooth interfaces. Generally, the disclosed embodiments are capable of communicating via any network which transmits information utilizing the TCP and IP, collectively TCP/IP, protocols as are known in the art. TCP/IP is essentially the basic communication language of the both the Internet and private intranets. TCP/IP utilizes the communications protocol stack and can be described as comprising a TCP layer which manages the decomposing and reassembling of messages from the application layer 321 into smaller more manageable packets, and the IP layer which handles the addressing of the packets. The IP layer comprises the routing layer 323, the switching layer 324 and the interface layer 325. The interface layer 325, as described above, makes the physical connection with the network utilizing connections such as Ethernet, dial-up-modems, Point-to-Point Protocol (PPP), Serial Line Interface Protocol (SLIP), cellular modems, T1 , Integrated Service Digital Network (ISDN), Digital Subscriber Line (DSL), Bluetooth, RF, fiber-optics or AC power line communications. In an alternate embodiment multiple interface layers 325 are present. For example, the interface layer 325 contains both an Ethernet and cellular modem thus enabling the IED to connect to the network with either interface. This redundancy is advantageous if one interface is inoperable due to a local Ethernet or cellular network outage. It is preferable that one or more of the application components in the application layer 321 implement TCP compatible protocols for the exchange of their communications over the network. Such TCP compatible protocols include the Instant Messaging protocol, file transfer protocol ("FTP"), or Hypertext Transport Protocol ("HTTP"). In addition, a Secure HTTP (S-HTTP) or Secure Socket Layers (SSL) may also be utilized between the application layer 321 and the transport layer 322 for secure transport of data when HTTP is utilized. S-HTTP is an extension to HTTP that allows the exchange of files with encryption and or digital certificates. SSL only allows authentication from the server where S-HTTP allows the client to send a certificate to authenticate to the user. The routing layer 323 and the switching layer 324 enable the data packet to arrive at the address intended.

In operation, the IED monitors the power distribution system for events such as wave shape deviation, sag, swell, kWh, kvA or other power usage, consumption, or power quality events and disturbances. In one embodiment, when the IED detects an event, it processes the event and generates an email message using an email client application component for transport over the network to a back end data collection server. Raw data 330, such as the error message generated from the IED or a billing signal, is passed into the application layer's 321 Security Sub-layer 321a where it is encrypted before email protocol packaging 321b takes place. Once the data 330 has been encrypted and packaged, the message is passed through the remaining IP layers where the message is configured for transmission and sent to the destination address. In one embodiment, the destination address is for a back end server implementing a data collection application component. This back end server may be operated by the consumer or supplier of electrical power or a third party as described above. In an alternate embodiment the Security Sub-layer 321a includes authentication or encryption, or alternately the Security Sub-layer 321a is bypassed. The application layer may include application components which implement protocols that are designed to pass through a firewall or other type of software that protects a private network coupled with a publicly accessible network. Multiple redundant data messages may be sent from the IP layer to ensure the complete data packet is received at the destination. In the above operation, the protocol stack, which includes an SMTP or MIME enabled email client, is a scalable, commercial product such as the Eudora™ email client manufactured by Qualcomm, Inc., located in San Diego, Calif. In an alternate embodiment data messages may also be sent to redundant destination email addresses to ensure delivery of the message. Quality of Service (QoS) may also be implemented, depending on the volume of bandwidth required for the data, ensuring reliable and timely delivery of the data. QoS is based on the concept that transmission rates, error rates, and other characteristics of a network can be measured, improved and, to some extent, guaranteed in advance. QoS is a concern for continuous transmission of high-bandwidth information. The power quality events, consumption, disturbances or other usage data may be stored in the IED and sent to the destination address upon request from an application component operating at the destination address, upon pre-determined time intervals and schedules, upon pre-defined events or in real time. In an alternate embodiment a IED may transport data or requests to or receive data or requests from other IED's directly, also know as peer-to-peer communications. Peer-to-peer is a communications model in which each party or device has the same capabilities and either party or device can initiate communication sessions.

In an alternate embodiment the Security Sub-layer 321a may include multiple encryption keys, each conferring different access rights to the device. This enables multiple users, such as a utility and customers, or multiple internal departments of a utility or customer, to send or receive data and commands to or from the IED. For example a customer's IED sends out two encrypted messages, one billing data and one power quality data, to the customer's office site. The billing data message is encrypted at a level where only the internal accounting department has access to decrypt it. The power quality data message is encrypted at a different level where the entire company can decrypt the message. Furthermore, in one embodiment, commands sent to or from the IED are coupled with the appropriate encryption key. For example, the IED's Security Sub-layer 321a may only permit billing reset commands to be received and processed if the command has been authenticated where the point of origin was the appropriate customer or utility. Further, encrypted email messages may also include various encrypted portions, each accessible and readable with a different encryption key. For example an IED sends out one message to both the utility and the customer containing billing data and power quality data. The data is encrypted with two different encryption keys so only the utility can decrypt the power quality data and only the customer can decrypt the billing data.

In operation the IED monitors the power distribution system 301 for billing events such as, kWh or kvA pulses. In one embodiment the IED may store billing events and transport the data to the power management application components operating on a back end server either upon request or upon pre-determined time intervals. Alternately the IED may transport billing event data in real time to the back end server. Data may be filtered through the either the Back End Server's or IED's power management components or any combination or variation thereof, before being entered into the Billing/Revenue Management component where billing, revenue, cost and usage tracking are computed into revised data. The Billing/Revenue Management components either stores the computations for future retrieval or pushes the revised data to the appropriate party, such as the consumer or provider of the electric power system. Data can be retrieved upon command or sent or requested upon a scheduled time.

In one embodiment the back end server's operate in a similar approach to the IED's. The back end server contains a transport protocol stack and power management application components. Alternatively, a back end server could be a function or component of the IED, i.e., implemented as an application component.

Figure 4A:
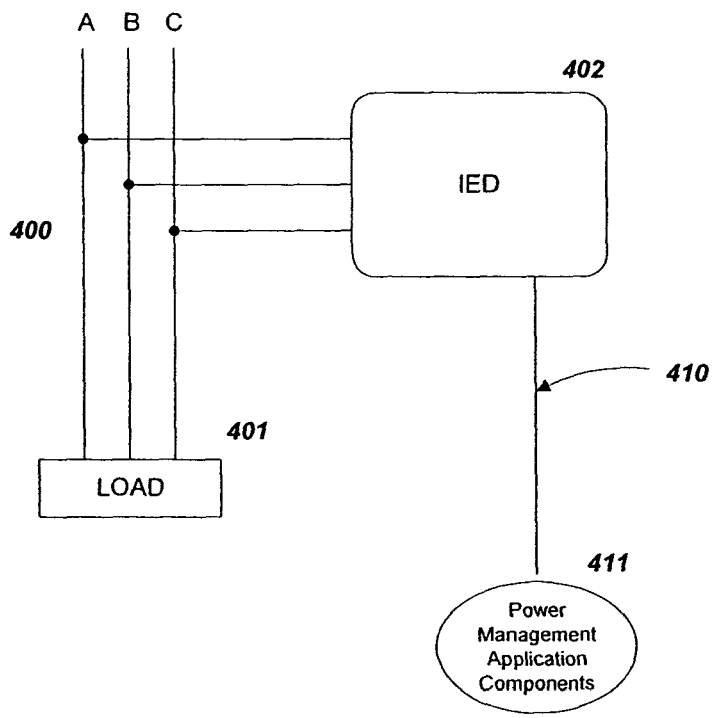
FIG. 4a shows a block diagram illustrating an IED, for use with the architecture of FIG. 1, coupled with power management application components.

The IED 402 may implement power management functions on the whole electrical power distribution system 400 or just a portion thereof. Referring to FIG. 4a the IED 402 monitors the electrical power via the system 400 to a load 401 and reports events and data to the power management application components 411 through the network 410. The power management application components 411 are preferably operating on a back end server. The events and data are collected and processed through the automated meter reading components, billing/revenue management components or a combination and variation thereof, and revised data or commands are sent back to the IED through the network 410, enabling control of the power flow and distribution of the loading on the power distribution system. The automated meter reading component allows for retrieval and collection of data for the customer, utility or third party. The component further allows for schedule driven, event driven or polling commands which are operable to push data onto the network.

Figure 4B:
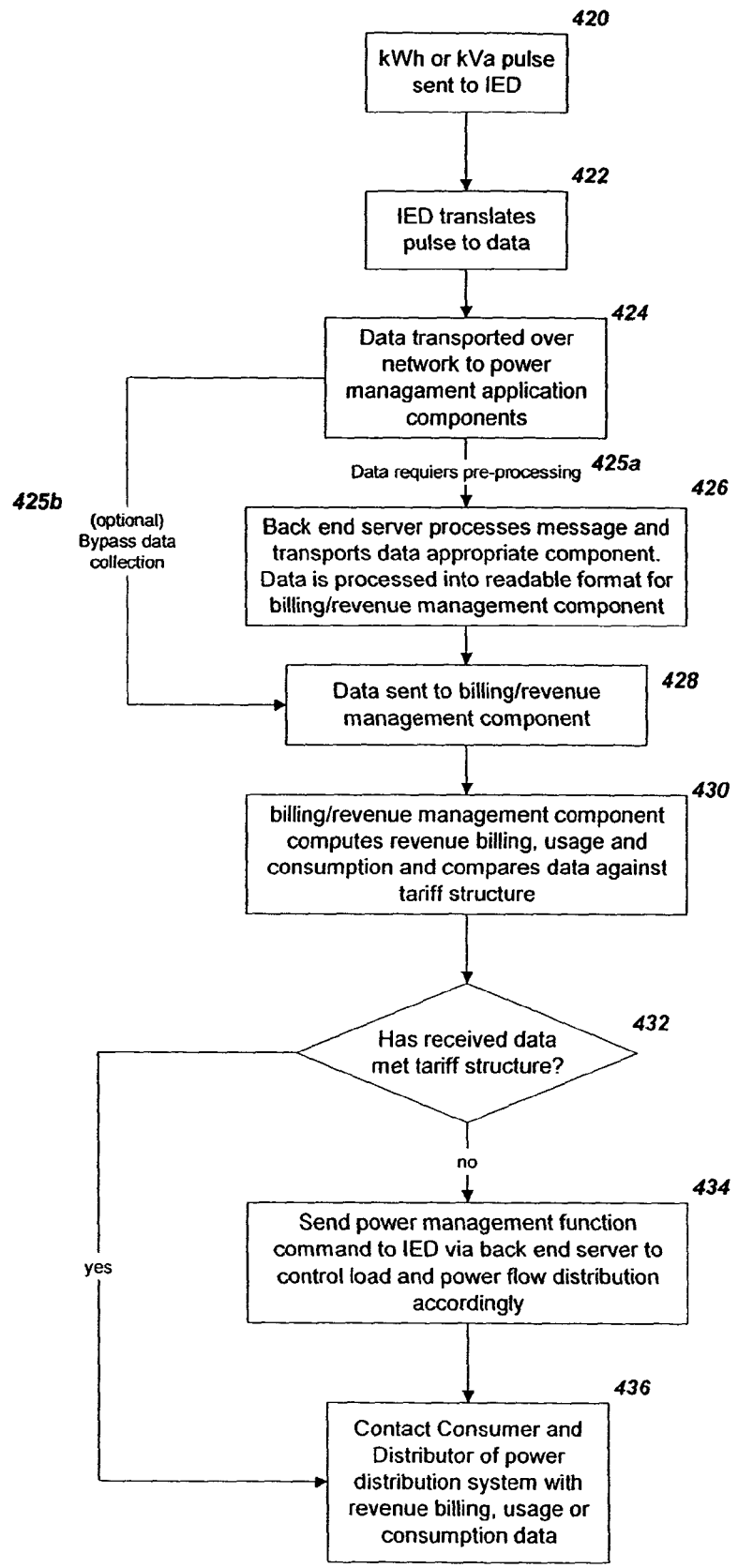
FIG. 4b shows a flow chart illustrating the use of an exemplary power management application component.

The power management functions implemented by the IED's enables the back end servers or IED's to control power flow and distribution over the electrical power distribution system. Specifically the power management application components process power measurement data and generate power measurement and reporting commands, transmitting them to the back end servers or IED's for execution. Referring now to FIG. 4b, in one exemplary operation, a load is monitored by a IED where kvA and kWh pulse data are sent in real time over the network 424 to the Application via email or another transport protocol. If pre-processing is required 425a the raw pulse data is transported into a data collection server or component where it is translated into a format readable by the billing/revenue management component 426. Alternately, the billing/revenue management component may be configured to receive and process data without pre-processing 425b. Once sent to the billing/revenue management component 428 the data is compared and analyzed for usage, consumption or billing revenue ranges against a pre-determined tariff structure 432 where any anomalies, excess or shortages are reported back to the IED in the form of a command to a power management function which controls the power flow and load distribution accordingly 434. The components further contact the required parties, such as the consumer or provider of the load, over the network, forwarding power quality, billing, usage or consumption reports or any power management functions that were required against the set tariff structure.

Figure 5A:
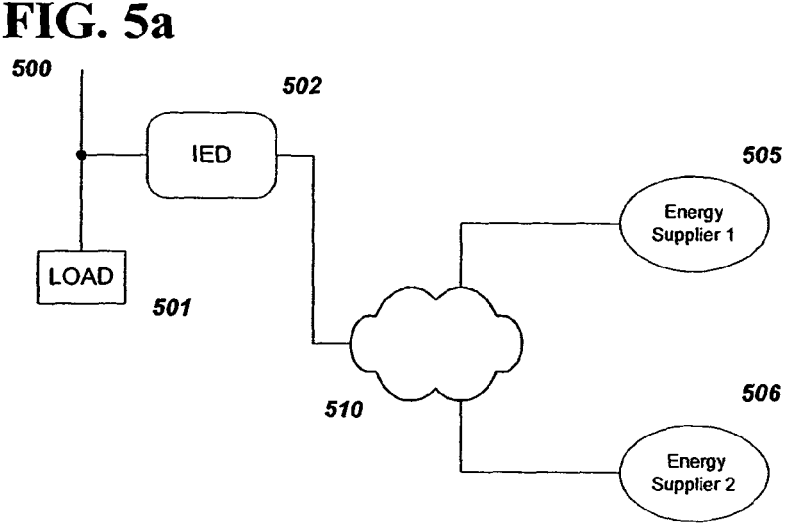
FIG. 5a shows a block diagram illustrating one embodiment of an electrical power distribution system having multiple energy suppliers.
Figure 5B:
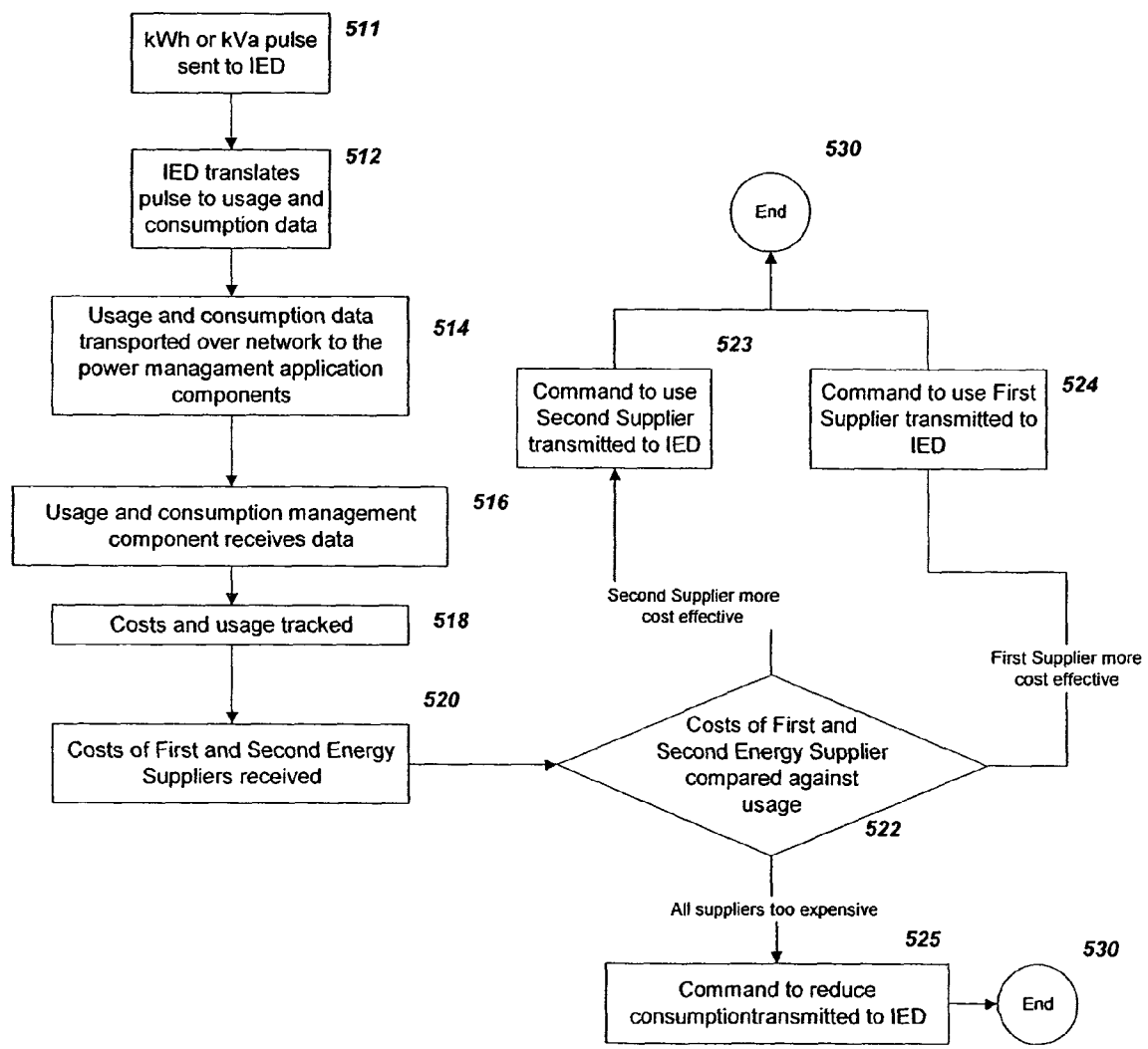
FIG. 5b shows a flow chart illustrating an exemplary method of managing multiple suppliers for use with the embodiment of FIG. 1.

FIG. 5a illustrates an exemplary embodiment for a usage and consumption management application of the power management architecture. The IED 502 implements a power management function of controlling the source of electrical power for the load 501 from either energy supplier 1 505 or energy supplier 2 506. The application is designed to take advantage a deregulated marketplace and operate the load 501 from the most cost efficient energy supplier at the given time period. Which supplier is most efficient may fluctuate frequently as a function of the energy market and supply and demand for electrical power. Referring to FIG. 5b, the IED 502 contains a usage and consumption management component which receives tariff and cost structures from multiple energy suppliers 505, 506. The component receives usage and consumption from the Load 501 and compares actual usage against multiple tariff structures choosing the most cost effective provider for a given load. Similarly the load management component 259, as shown in FIG. 2b, is utilized to connect and disconnect loads to and from the electrical distribution system during either low and high rate and demand periods, hence reducing the electrical power costs and demand. In one embodiment the load management component 250 is programmed to run in an automated fashion based on feedback from the system, however in an alternate embodiment the component is operated manually based on user input.

For example, an IED 502 is connected to a power line 500 and associated load 501. The IED 502 measures power usage by the load and transmits this consumption data 514 over a network 510 to a usage and consumption management application component operating on a back end server 511. The Usage and consumption management component receives and tracks cost and usage 516, 518 and compares rates for actual usage against multiple suppliers bids 522. Suppliers have the option to either push tariff structures to the application component or have tariff structures polled over the network. Once the most cost effective structure is determined by the usage and consumption management component, a command or function is sent to the IED 502 with the new tariff structure 523, 524. Alternately, the new tariff structure is applied across to the billing/revenue management component where billing is applied to the usage and revenue reports are forwarded onto the appropriate parties.

In another example the usage and consumption management component determines all suppliers tariff structures are too expensive to warrant usage or consumption thus a command to reduce consumption to a desired level is transmitted over the network to the IED 525. Furthermore, an alternate embodiment includes application of real-time usage and cost monitoring of loads being measured by an IED and multiple energy and distribution system suppliers.

In an alternate embodiment the usage and consumption component is pre-programmed to monitor and shed loads based on a exceeding a set tariff structure. For example an IED 502 monitors a load 501 connected to a power distribution system 500. Energy is supplied by an energy supplier 505. The IED contains a tariff structure that has a limit of $0.80/kWh during peak hours of 6 am to 6 pm and a limit of $0.60/kWh for non-peak hours of 6 pm to 6 am. The IED 502 monitors the power usage of the load 501 vs. the actual tariff structure of the energy supplier and shuts the load 501 off if the actual tariff exceeds the limits of $0.80/kWh during peak times or $0.60/kWh during non-peak times.

The centralized power management component 255 allows the centralization of work at one location, such as a centralized billing server, load management server or master IED, which collects and processes data from various devices spread over the network. In operation, remote IED's connected to the network transmit data to the centralized power management component where operations such as billing, load management, usage and consumption reporting are processed in one central location.

Figure 6:
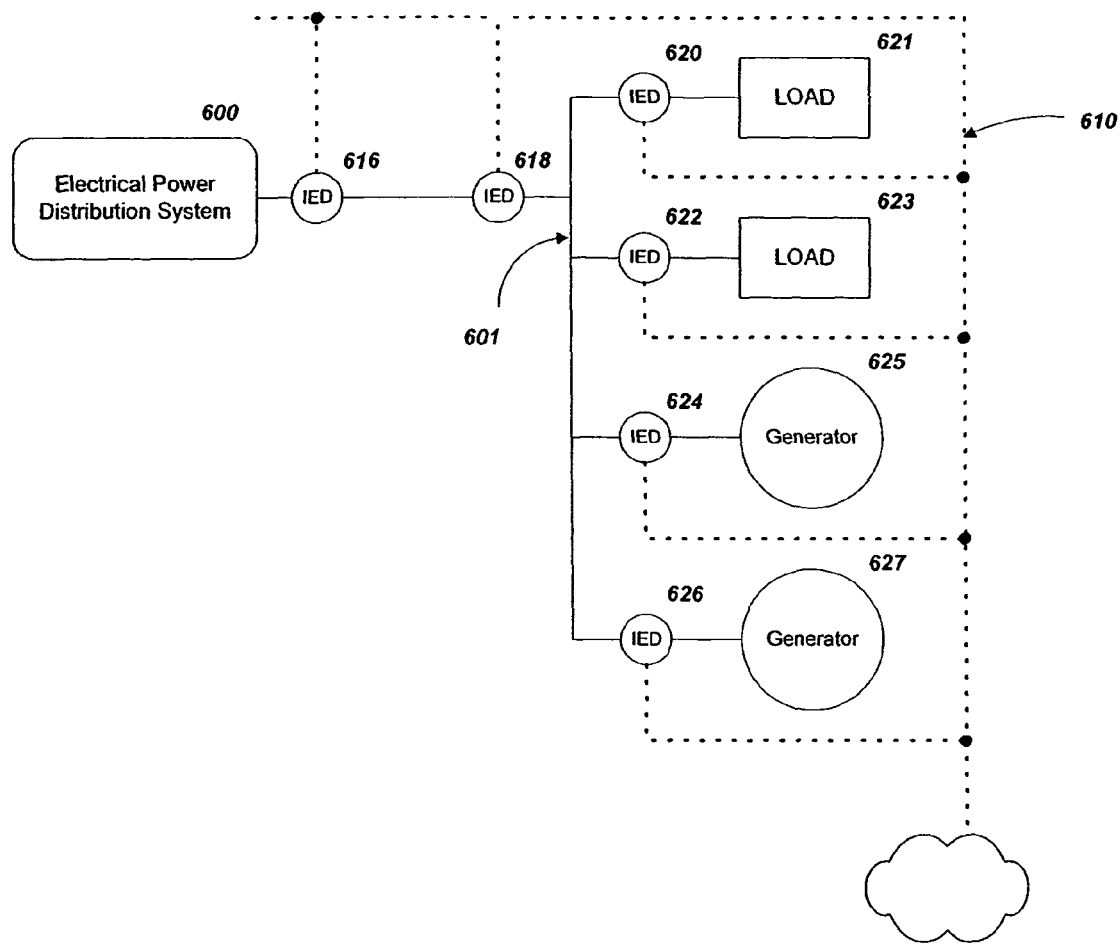
FIG. 6 shows a block diagram illustrating a second embodiment of an electrical power distribution system using a distributed power management component.

The distributed power management component 254 allows for the distribution of work or data processing to various devices on the network. In operation, an IED measures or detects an occurring or impending catastrophic power quality event and alerts other downstream IED's (on the power distribution network) of the event thereby giving the downstream IED's an opportunity to disconnect or alter loads before the event reaches the downstream system and causes damage. The component further includes a function that, upon detection of an occurring or impending event, alerts downstream IED's or back end servers to alert their connected loads to either protect themselves from the outage by shutting down, or instructing them to shut down applications that may cause critical failure or damage if interrupted, such as writing to a hard-drive. FIG. 6 illustrates one embodiment of the distributed power management component in action. An Electrical power distribution system 600 distributes energy over distribution lines 601 which are connected to multiple IED's 620, 622, 624, 626 which are present to continuously monitor the energy being fed onto their respective loads 621 623 and generators 625 627 on a given branch and furthermore all IED's 620, 622, 624, 626 are connected via a network 610 as described above. IED's 616 618 are also present on the distribution system 600 to continuously monitor energy being transferred onto the system as a whole. It will be appreciated that the loads and generators may reside on multiple or separate consumer sites. In operation, a catastrophic power quality event is detected on a load 623 by the attached IED 622. The IED 622 takes appropriate action, such as triggering a protection relay, on the load and further transmits communications of its actions to upstream IED's 616 618. This ensures local containment of the event by the IED 622 informing upstream IED's to not duplicate the action on the larger system. Obviously retaining upstream IED's as a backup is not discounted in this operation. Alternatively, the operation is utilized to coordinate downstream IED's over the network 610. For example an event may be detected at the distribution system 600 by an IED 616 monitoring the system 600 which triggers, for example, a protection relay. The IED 616 which triggered the protection relay communicates its actions to downstream IED's 618 620 622 624 626 over the network 610 allowing them to take appropriate intelligent action, such as disconnection the generators 625 627. It will be appreciated that IED applications may include a combination of the centralized and distributed power management components.

In one embodiment, a power reliability component 256 is provided in the IED to measure and compute the reliability of the power system. Power system reliability is discussed in commonly assigned U.S. patent application Ser. No. 09/724,309, entitled "APPARATUS AND METHOD FOR MEASURING AND REPORTING THE RELIABILITY OF A POWER DISTRIBUTION SYSTEM", filed Nov. 28, 2000, now U.S. Pat. No. 6,671,654, herein incorporated by reference. In one embodiment, the component 256 computes and measures reliability as a number of "nines" measure. The component includes a function which compiles the reliability of the power from other components located on back end servers or IED's, giving a total reliability. This function also enables a user to determine which part of the distribution system has the most unreliable power. Knowing this enables the user to focus on the unreliable area, hopefully improving local power reliability and thus increasing overall reliability.

Figure 7:
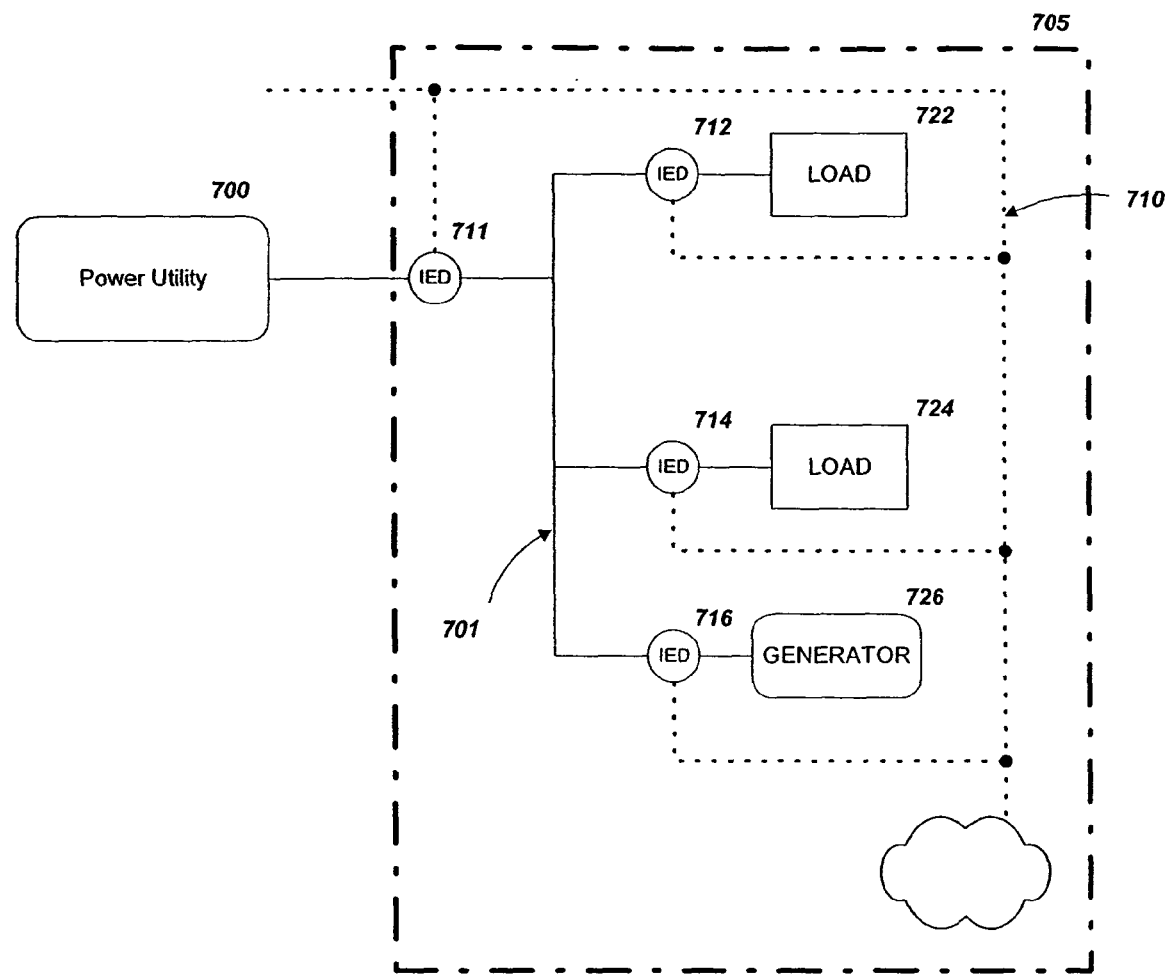
FIG. 7 shows a block diagram illustrating a third embodiment of an electrical power distribution system using a power reliability component.

For example, referring now to FIG. 7, an IED 711 is connected to a network 710 and measures the reliability of the power distribution system 701 which supplies power to loads 724 726 within a customer site 705. The customer also provides a generator 726 which supplies power to the loads 722 724 at various times. The customer measures the power reliability of the system for the load 722 724 using the associated IED 712 714 and considers it unreliable. One IED's 714 power reliability component polls the other IED's 711 712 716 and determines the unreliable power source is coming from the generator 726. From this the customer can decide to shut off the power supply from the generator 726 in order to improve the power reliability of the system.

In another embodiment, a power outage component 265 is provided in the IED which informs the appropriate parties of a power outage using email or other transport protocols. In one embodiment, an IED is connected to a power system when a power failure occurs. The IED's power outage component 265 contains hardware, such as a battery backup and modem, which enables the IED to transmit a power failure warning to the appropriate parties, such as the utility or customer, such as by email over a network as described above. Further, a cellular modem may be utilized to call out to indicate the location of an outage. Physical locating algorithms such as cellular triangulation or telephone caller ID can be used to track or verify outage locations.

Figure 8:
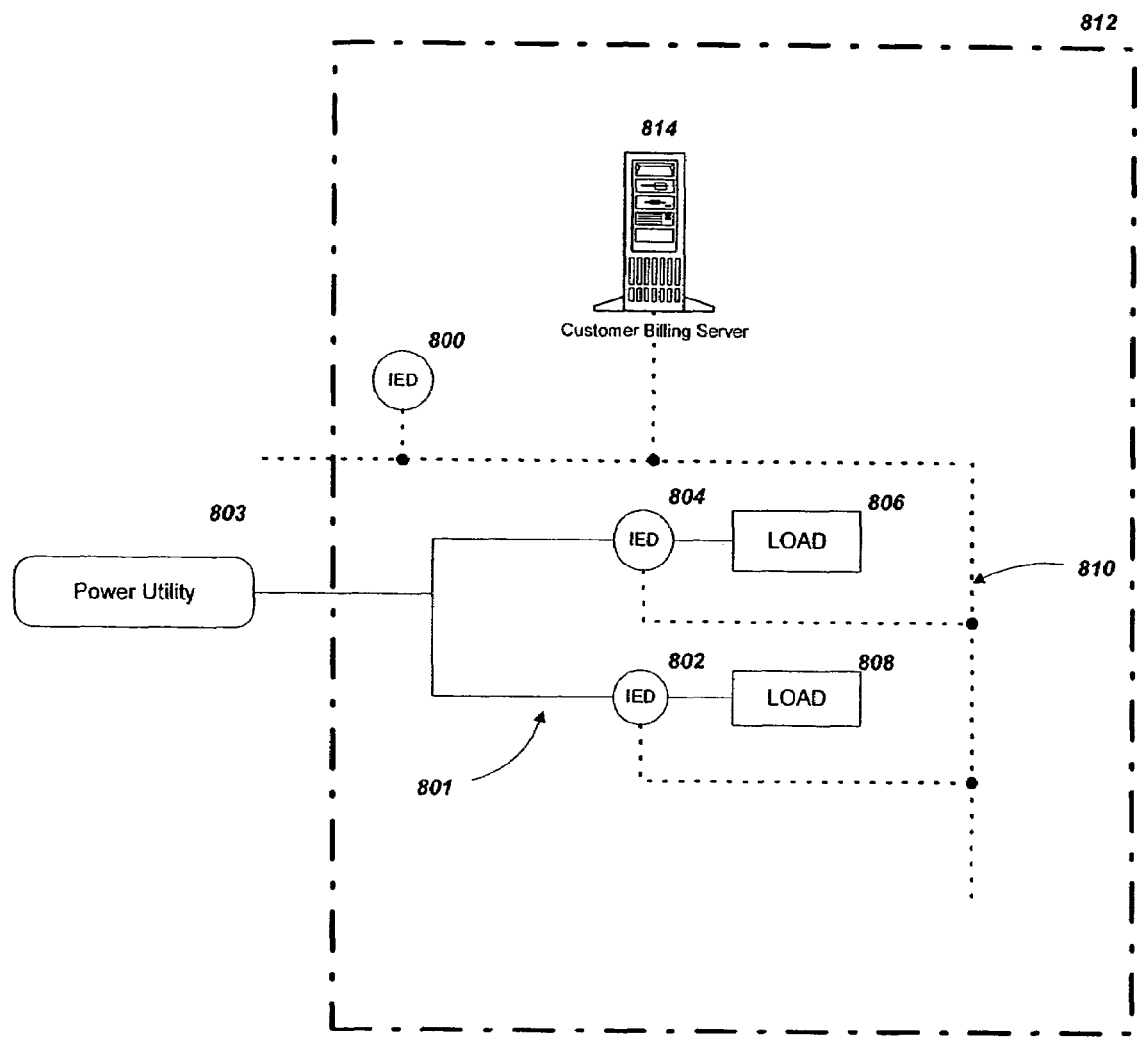
FIG. 8 shows a block diagram illustrating a fourth embodiment of an electrical power distribution system using a peer to peer component.

Peer to peer communications between IED's and between back end servers are supported by the peer to peer management component 257. In one embodiment, peer to peer communications are utilized to transport or compile data from multiple IED's. For example, as shown in FIG. 8, an IED 800 is connected to a network 810. Multiple loads 806 808 draw power from a power utility's 803 power distribution line 801 and each load is monitored by an IED 804 806. An IED 800 polls load and billing data from all other IED's on the network on the customer site 802 804. Upon request, the IED 800 then transmits the load and billing data to the customer's billing server 814. In one embodiment, the IED 800 communicates the load and billing data in a format which allows software programs inside the customer billing server 814 to receive the data directly without translation or reformatting.

Transmission of data in XML format allows a user to receive the data in a readable self-describing format for the application intended. For example, traditional data file formats include comma-separated value files (CSV), which contain values in tables as a series of ASCII text strings organized so each column value is separated by a comma from the next column's value. The problem with sending CSV file formats is the recipient may not be aware of each column's desired meaning. For example, a CSV file may contain the following information sent from a revenue billing application:

45.54,1.25,1234 Elm Street, 8500 where 45.54 is the kWh used this month, 1.25 is the kWh used today, 1234 Elm Street is the location of the device and 8500 is the type of device. However, if the recipient of the CSV file was not aware of the data format, the data could be misinterpreted. A file transported in XML is transmitted in HTML tag type format and includes information that allows a user or computer to understand the data contained within the tags. XML allows for an unlimited number of tags to be defined, hence allowing the information to be self-describing instead of having to conform to existing tags. The same information is transmitted in XML format as:

```
<billing_information>
<kWh_month>45.54</kWh_month>
<kWh_day>1.25</kWh_day>
<location>1234 Elm Street</location>
<device_type>8500</device_type>
</billing_information>
```

Figure 9:
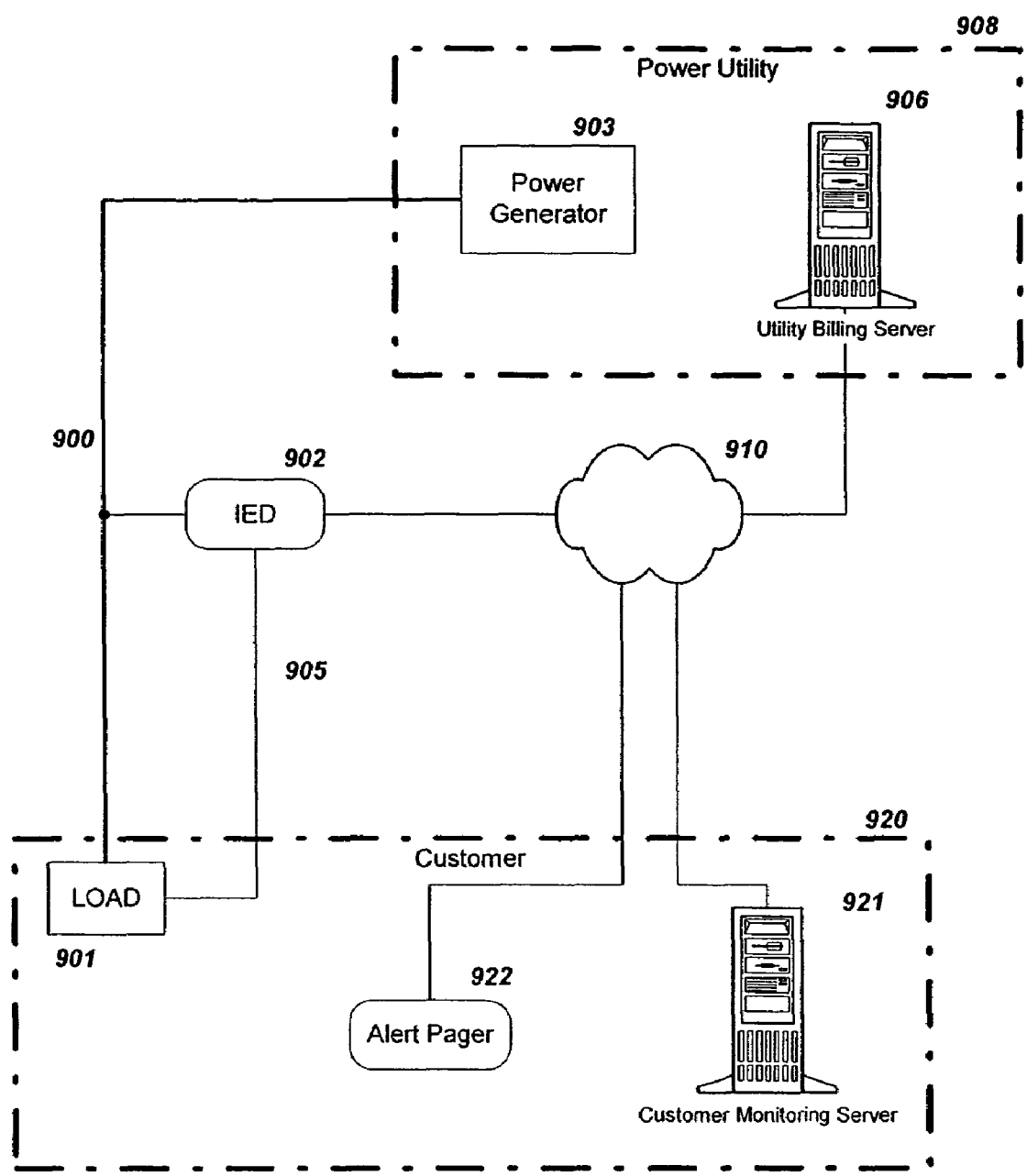
FIG. 9 shows a block diagram illustrating an IED, for use with the architecture of FIG. 1, which transmits data to multiple recipients.

Transmission in XML/SOAP format allows the recipient to receive XML-tagged data from a sender and not require knowledge of how the sender's system operates or data formats are organized. In one embodiment, communications between IED's connected to the network are transmitted in XML format. An IED utilizes XML based client application components included within the power management applications and transmits the data in XML format so little or no post-processing is required. FIG. 9 illustrates an example of one embodiment. An IED 902 is connected to a power distribution line 900 and associated load 901 owned by a customer 920. Power is supplied by a power utility's 908 power generator 903. The power utility also has a utility billing server 906 which compiles billing data from consumers drawing power from their power generators. The IED 902 is connected to the utility billing server via a network connection 910 and the IED 902 measures usage and consumption of the load, and other values associated with billing. The utility billing server 906 contains billing software, such as a MV90, which requires data in a specified format. Either upon request, or a pre-scheduled times, the IED 902 transmits the usage, consumption and billing data associated with the load 901 to the utility billing server 906 in XML format. The customer also has a monitoring server 921 which is dedicated to receiving billing data from the IED 902 and reporting usage and consumption to the appropriate parties, the monitoring server 921 also reads data in a specified format for its associated monitoring software. The IED 902 transmits the same usage, consumption and billing data to the monitoring server 921 in XML format. By utilizing XML data formats the data transmitted by the IED 902 can be read by multiple servers or IED's 902 that do not require knowledge beforehand of the order or type of data that is being sent. In an alternate embodiment an IED 902 may also receive inputs from peripheral devices which may be translated and combined in the XML transmission. For example, the load 901 is a motor which contains a temperature probe. The temperature probe is connected to the IED 902 and allows the IED 902 to monitor the motor temperature in addition to power data on the power distribution line 900. The IED 902 is programmed to act on the temperature input by shutting down the motor if the temperature exceeds a pre-defined critical level by tripping a relay or other protection device (not shown). The IED 902 is further programmed to alert the customer monitoring server 921 and an alert pager 922 and if such an action takes place. This alert transmission is sent in XML format so both the server 921 and the pager 922, which may be configured to read incoming transmissions differently, receive the alert transmission in the form in which it was intended. It will be appreciated that the IED 902 can receive data in XML format from multiple sources without complete knowledge of their file transfer notations.

Figure 10:
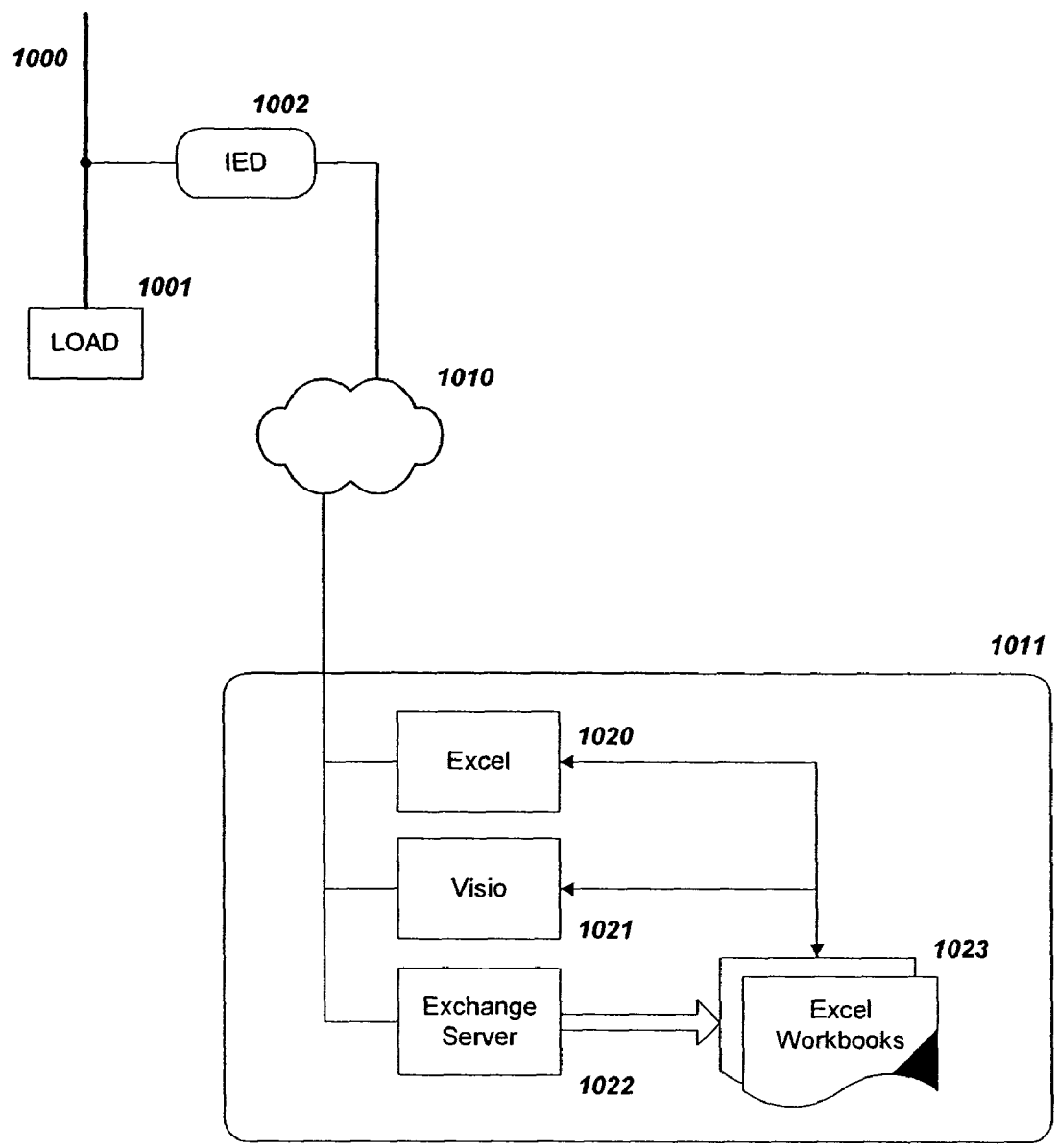
FIG. 10 shows a block diagram illustrating a monitoring server, for use with the architecture of FIG. 1, which receives data from an IED.

In an alternate embodiment, the back end servers include software that is generally included on a majority of existing computer systems, such as Microsoft Office™ software, manufactured by Microsoft Corporation, located in Redmond, Wash. which includes the software applications Microsoft Word™ and Microsoft Excel™. The software receives data in a self describing format, such as XML, and the software includes off the shelf applications and processes such as a Microsoft Exchange Server, Microsoft Excel and associated Excel Workbooks, Microsoft Outlook and associated Outlook rules, Microsoft Visio and associated Visio Stencils, Template files, and macros which allow the user to view and manipulate data directly from the IED. In one embodiment the IED transmission format makes use of existing standard software packages and does not require additional low level components, such as a communications server communicating with a serial port, which are normally required to interface to the IED communication ports. Further, the embodiment does not require a separate database, as the data is stored in the software programs. This allows a user to view data from the IED using standard computer software. For example, referring now to FIG. 10, an IED 1002 monitors a load 1001 and passes the monitored data to a monitoring server 1011. The data can be transmitted using a variety of protocols, such as FTP, TCP/IP or HTTP, as described above. In one embodiment, data is transmitted in an HTTP based form or an SMTP form where the HTTP form is a self-describing format such as XML and the SMTP format is an email message. The monitoring server 1011 includes Microsoft Exchange Server 1022, Visio 1021, Microsoft Excel 1020 and Excel Workbooks 1023. The Excel software 1020 is capable of receiving data directly from the IED in a self-describing format, thus allowing the user to view real time load profiles or graphs and other monitored data directly from the IED in real time. The Visio software 1021 is also capable of receiving data directly from the IED in a self-describing format, thus allowing the user to process and view real time data in Visio format. Alternately, the IED transmits power quality, load, billing data or other measured or monitored values to the Excel Workbooks 1023 via the Exchange Server 1022. The Excel or Visio software is then capable of retrieving historical data directly from the workbooks.

Figure 11:
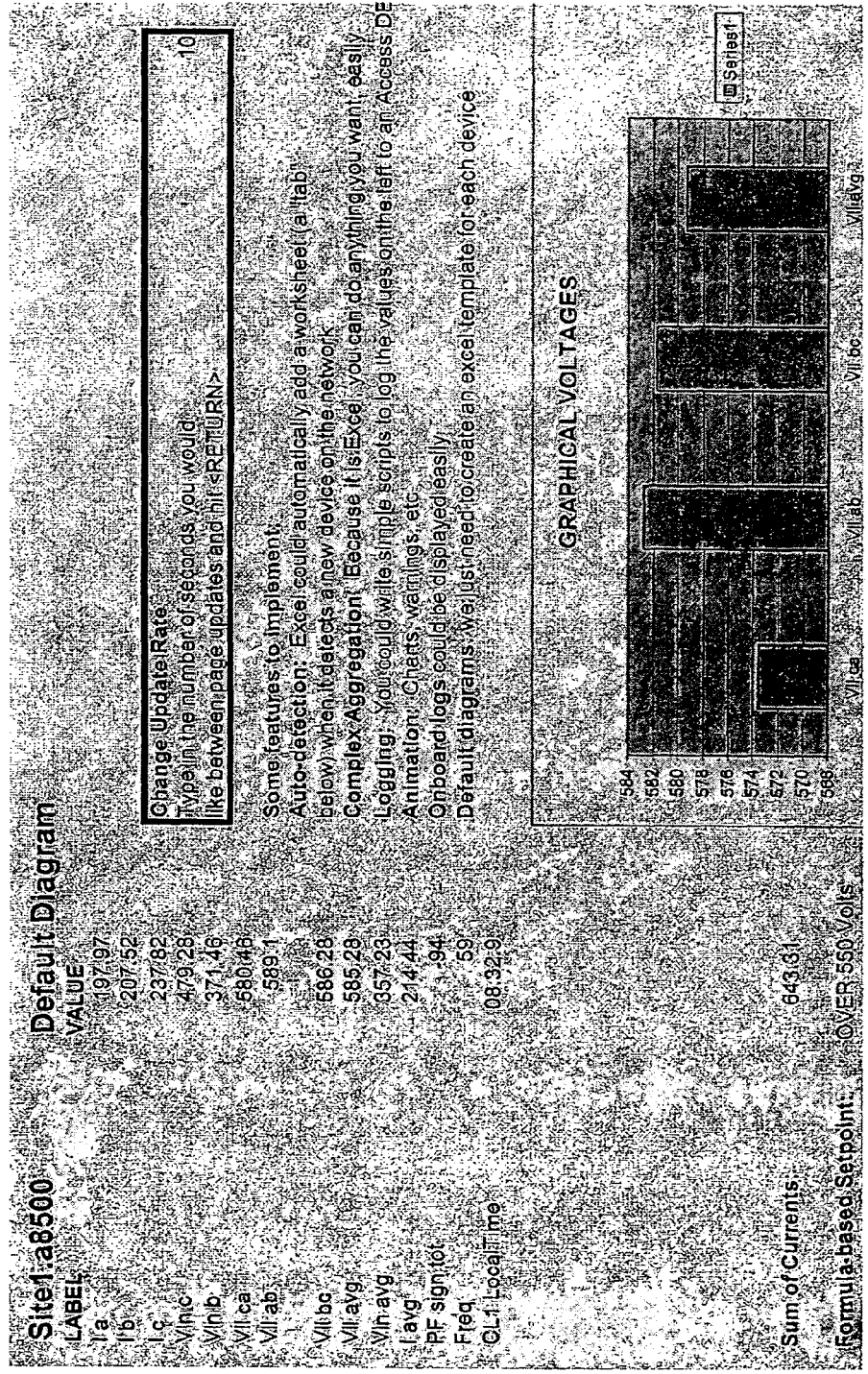
FIG. 11 depicts an exemplary display generated by the embodiment of FIG. 10.

Referring to FIG. 11, there is shown an exemplary screen display of a Microsoft Excel worksheet which is coupled with the IED 1002 as described above. In this example, the IED 1002 is a model 8500 meter, manufactured by Power Measurement Limited, in Victoria, British Columbia, Canada. The IED 1002 is coupled via a TCP/IP based network with a personal computer having at least 64 MB memory and 6 GB hard disk with a Pentium™ III or equivalent processor or better, executing the Microsoft Windows 98™ operating system and Microsoft Excel 2000. The computer further includes Microsoft Internet Explorer™ 5.0 which includes an XML parser that receives and parses the XML data fro the meter and delivers it to the Excel worksheet. The worksheet displays real time data received directly from the IED 1002 in an XML format. As the IED 1002 detects and measures fluctuations in the delivered electrical power, it transmits updated information, via XML, to the worksheet which, in turn, updates the displayed data in real time. Note that all of the features of the Microsoft Excel program are available to manipulate and analyze the received real time data, including the ability to specify mathematical formulas and complex equations which act on the data. Further, display templates and charting/graphing functions can be implemented to provide meaningful visual analysis of the data as it is received. Further, the real time data can be logged for historical analysis. In one embodiment, the activation of a new IED 1002 on the network is detected by the worksheet which cause automatic generation of a new worksheet to receive and display data from the new device.

In still another alternative embodiment, the ability to communicate through a firewall or other private network security/protection implementations, as described above, also known as "punch through", is provided. As was described, in order to implement the various power management applications on the disclosed power management architecture, the IED's, back-end servers and their constituent application components must be able to intercommunicate with and among one another to share data and command and control information. Further, as was noted, the IED's, back-end servers and their constituent application components may be located anywhere, including within private internal networks, relying on the fabric of the public network infrastructure to link them together and facilitate their "machine to machine" communications. However, concerns over enterprise network security often result in the restriction of such communications between private/internal networks and public external networks such as the Internet. Unfettered communications over unknown or unregulated protocols or between unknown or unregulated clients, servers or hosts represent an inherent network security risk to an enterprise. Therefore, as it is usually impractical to disconnect these private/internal networks from the public network infrastructure, these private/internal networks often utilize a "firewall," described in more detail below, to provide network security and regulate the flow of communications between the networks. As will be discussed below, it is therefore advantageous to encapsulate/facilitate these computer readable communications using protocols intended for human readable communications, such as electronic mail, hypertext/web or instant messaging protocols, which are more benign and more easily regulated and monitored, i.e. trusted, and therefore more likely to be allowed to pass through any firewall present.

A firewall is a software program, or combination of software and hardware, typically located on a private network and coupled between the private network and the public network infrastructure. The firewall protects the resources of the private network, such as an intranet, from users of other external networks, such as the Internet, coupled with that private network. The firewall allows internal users to access to the private network/intranet but prevents outsiders from accessing the private data, and/or it controls which resources both the internal or external users have access to. Alternately, or in conjunction, the firewall restricts outgoing connections to external network entities from the internal user by restricting certain types of protocol connections or data transfers. A firewall mediates/facilitates bi-directional communication between two networks, typically external and internal networks, but in certain situations data or standard communications protocols are only allowed outbound to the external network and not inbound from the external network. Alternately, select standard protocols are enabled for both inbound and outbound communication. Standard communication protocols include FTP, NNTP or instant messaging protocols, such as AOL™, Yahoo!™ or MSN™ instant messaging protocols. It may also include SMTP (port 25) type protocols known in the art or other HTTP (port 80) type protocols. It will be appreciated that firewalls are well known in the art.

A firewall examines each network packet entering or leaving the private network to determine whether to forward it towards its destination. A firewall may also include or work with a proxy server that makes external network requests on behalf on internal users. The proxy server allows an enterprise, which has several users, to act as an intermediary between the users and the external network/internet so the Enterprise, such as a company's Information Services department, can ensure security, administrative control and/or offer caching services.

The firewall also acts as a screen. For example, a firewall may screen requests to ensure they come from acceptable domain names or Internet protocol addresses. Further, the firewall may also allow remote access into the private or internal network by the use of secure login procedures and authentication certificates. The term firewall typically implies not only that firewall network hardware and software is installed but also that a security policy is in place. The security policy refers to the configuration of the firewall as to which internal and external entities are permitted to communicate. Typically this includes defining which communications protocols will be allowed to pass through and which computer systems or hosts, internal and external, will be allowed to communicate via those protocols. Such security policies are typically implemented by the Information Technology/Services (IT or IS) departments of the enterprise.

Typical enterprises implement internal or local area networks for at least the purpose of allowing employees to communicate via electronic mail. Further, these mail servers are typically configured, along with the firewall, to permit the exchange of electronic mail with entities outside the enterprise. Mail servers may also act as a similar screening method to restrict messages or access only to acceptable services or from acceptable users. For example, a mail server may screen incoming messages to ensure that they come from acceptable or valid domain names, Internet protocol addresses or even specific user addresses. In one embodiment a mail server may be instructed to only receive messages from a single user address, such as "ied_data@company.com," or a valid domain, e.g. "@company.com." Further, the mail server typically must also be configured for each user or email client program that wishes to communicate using the server. For example, an email account must be set up for each user within the enterprise who is to be allowed to communicate via email.

In one embodiment disclosed herein, the IED is configured as an email client with the email server and appears to the email server as any other user of email within the enterprise, creating, sending and receiving emails via the server. These emails contain the computer readable power management data and commands to other application components within the power management application which are capable of receiving the email and parsing out the power management data or commands. The IED may be configured to define or set any outgoing message criteria/parameters or to conform its communications to the user or enterprise domain address to ensure the mail server will accept any messages the IED sends from the valid domain. In this way, the IED can take advantage of the email server's capability to communicate via the firewall to get messages out to the external network.

As described above, the ability of an IED to push or send data or commands using the public Internet infrastructure allows IED's to be easily scalable when implemented in a network type architecture. By using the existing resources of the enterprise in which the IED is installed, including the internal/local area network and its connection with the external network/Internet, the need for dedicated communications media, such a telephone line, is eliminated. However, this ability to communicate requires that the data be able to get out of the internal/private network and to the external public network or Internet. As discussed above, with the advent of network security, this requires that the IED be able to send and receive its communications through the firewall. Sending data or commands, such as power management commands described earlier, using a protocol such as SMTP enabled email clients, allows a user or IED to communicate through a firewall while meeting the demands for security by the enterprise. However, due to various security policies, discussed above, the enterprise's internal network must be configured, in most cases, to allow such communication.

One method, as discussed above, is to configure the IED as an email client on the enterprise's internal electronic mail server, where that server is capable of communicating electronic mail via the firewall. In this case, the IED appears as any other user of the email server and is able to send and receive email via the firewall. The IED need only be configured to correctly interact with the mail server. In another embodiment, the IED is configured to interact with a communications server, such as an electronic mail server or XML server, which is external to the enterprise's internal network. In this case, the security policy of the enterprise may need to be reconfigured to allow the firewall to pass the communications of the IED to an external communications server such as an external mail server or external XML server. As will be discussed, in still another embodiment, the IED is configured to utilize a standard protocol typically already permitted by the enterprise's security policy for communications via the firewall, such as the HTTP protocol. In this case, no reconfiguration of the enterprise's internal network is required for the IED to communicate via the firewall.

In order to interact via electronic mail, whether with an internal or external mail server, the IED includes an electronic mail client application, as described above. It will be appreciated, that depending on the protocol and method of communications, the IED is equipped with an appropriately enabled client application, as described above. An exemplary SMTP enabled email client for IED's is the MeterM@il™ email client manufactured by Power Measurement, Ltd, located in Saanichton, B.C. Canada. Other protocols, such as Multi-Purpose Internet Mail Extensions ("MIME") may also be used to transport data or commands.

As described earlier in FIG. 3c, a security sub-layer 321a is present on the application layer 321 where encryption before email protocol packaging takes place. In an alternate embodiment a secure sockets layer ("SSL") is utilized to ensure security between the IED and the server or client which it ultimately connects to. SSL is a commonly-used protocol for managing the security of a message transmission. In one embodiment, the SSL is included on the application layer 321, which includes all of the application software component and/or power management components. SSL uses public-and-private key encryption, which also includes the use of digital certificates. Digital certificates allow the recipient to verify that the certificate is real, and hence the message is real and from an authorized user. As described earlier, encryption can also be done utilizing Pretty Good Privacy (PGP). PGP uses a variation of the public key system, where each user has a publicly known encryption key and a private key known only to that user. The public key system and infrastructure enables users of unsecured networks, such as the Internet, to securely and privately exchange data through the use of public and private cryptographic key pairs. A security module, or security application, includes the aforementioned encryption, authentication and encryption applications.

In an alternate embodiment a Network Time Protocol ("NTP") or other form of time-syncing is utilized on the IED to ensure the transferred message has the correct time and to ensure that the contents of the message is derived using accurate time (i.e., interval energy data). NTP is a protocol that is used to synchronize computer or IED clock times in a network, either external or internal. Accurate time across the network is important. Distributed procedures depend on coordinated times to ensure proper sequences are followed or security mechanisms depend on coordinated times across the network. For example, a supplier may initiate a startup of two generators, each connected to an IED. In order to achieve proper startup, the first and second generator must be started in the correct order within a specified period of time. The supplier sends a command to start the first generator at 12:00 AM and the second generator at 12:01 AM. In order to ensure the proper startup sequence is done, both the IED's must be timesynced together. As one can see, if one of the IED's has the incorrect internal time, the procedure may not occur in the correct order. Further, correct time stamping of messages is important for real time or revenue related messages. NTP typically applies to both the protocol and the client/server programs that may run on the IED. In one embodiment, the IED NTP initiates a request to the network time server, internal or external. Alternately, the IED may receive the correct time to timesync the IED from the time server via a push mechanism.

Figure 12:
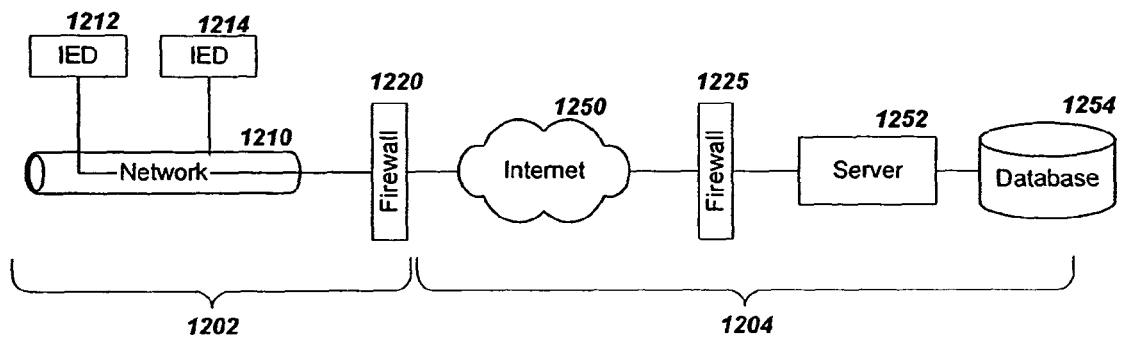
FIG. 12 shows a block diagram illustrating a first embodiment of a networked communications architecture having firewalls.

FIG. 12 shows an example of a networked architecture with firewalls. A firewall 1220 defines the internal network 1202, which comprises an intranet 1210 with IED's 1212 1214 coupled with the intranet 1210. The IED's 1212 1214 may be in turn connected to loads or generators or other devices requiring power management or other power measurement data. It will be appreciated that loads or generators, such as fuel cells, turbines or flywheels, may be coupled with other types of power systems beyond electricity systems, such as power and gas. As described earlier power management data includes any data or information utilized or created by an IED, such as a status information, load information or electricity information used by an energy enterprise that may used in reporting or commanding or communicating to, with or from an IED. A database 1254 is connected to a server 1252, which may include a mail server such as Microsoft Exchange™, which is in turn connected to the Internet 1250. The network connections shown allow the server 1252 to connect to the IED 1212. In an alternate embodiment, the external network 1204 contains another firewall 1225 thereby defining another internal network which houses the server 1252 and the database 1254. The use of a firewall allows security to be present so the IED's 1212 1214 located in the internal network 1202 are protected from unauthorized access, and may restrict communications to other unauthorized sites or locations. For example the IED 1212 may contain billing or other revenue certified data which is required to be sent to the database 1254, which is located outside the secure firewall. The security contained in the firewall prohibits unauthorized users from collecting or viewing the billing data. The IED 1212 pushes or sends billing data on a scheduled or event driven basis by packaging the billing data in an email message, which utilizes an SMTP protocol. The email message is sent through the firewall 1220 to the server 1252, which processes the data and forwards it onto the database 1254. It will be appreciated that increased security, such as email encryption and authentication as described earlier may be utilized to further prevent unauthorized access to the billing data while in transport across the Internet 1250.

Figure 13:
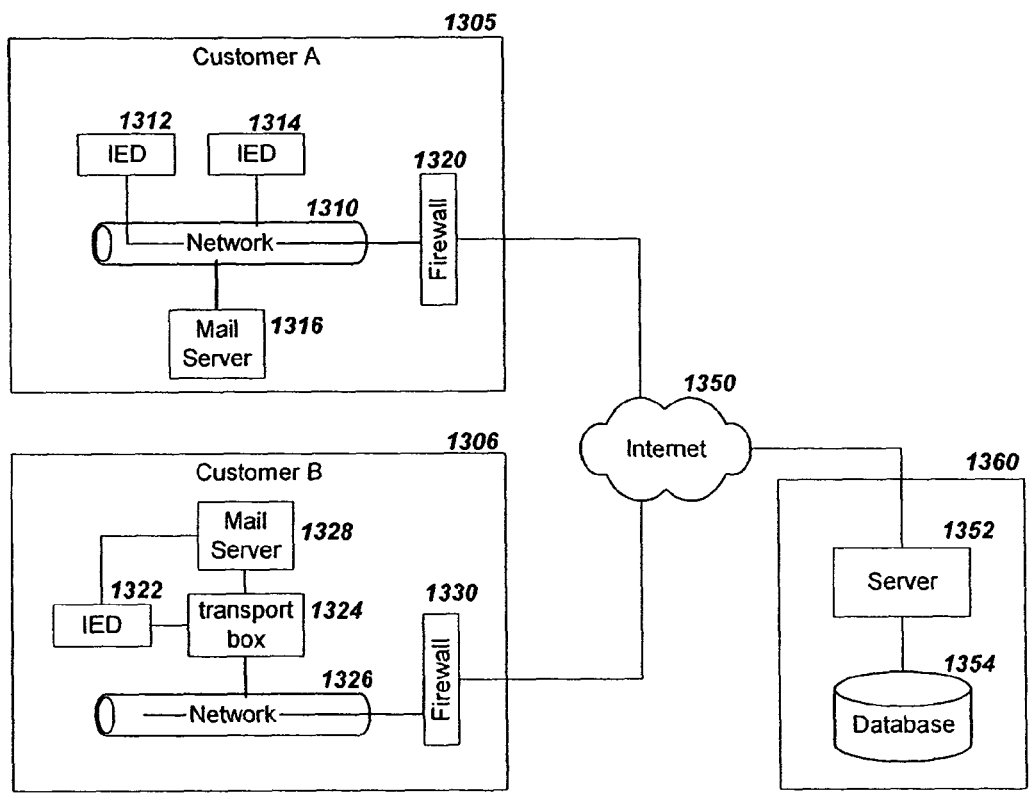
FIG. 13 shows a block diagram illustrating a second embodiment of a networked communications architecture having firewalls.

As shown in FIG. 13, Customer A 1305 contains an internal network 1310 with various IED's 1312 1314 connected to the network 1310. A firewall 1320 protects the internal network 1310 from users which may attempt to access the IED's 1312 1314 or other network resources through the Internet 1350, or via some other type of external network connection. Customer B 1306 also contains an internal network 1326 with an IED 1322 connected to a transport box 1324, described in more detail below, which is connected to the network 1326. The internal network 1326 also contains a firewall 1330 which protects the internal network from unauthorized users or access. An Enterprise 1360 has a server 1352 and a database 1354 which are utilized to receive data from both Customer A 1305 and Customer B 1306. This data, such as revenue billing data, or other power management data, is packaged by the respective IED 1314 on the respective internal network and sent using a SMTP protocol through the firewall 1320 to the server 1352. The server 1352 contains a mail server, such as Microsoft Exchange™ which receives and processes the data sent. The Enterprise 1360 has a database 1354 which compiles the data sent by the respective Customers 1305 1306. Further, it will be appreciated that the Server 1352 can also send a command or data packet to the IED 1312 using the same protocol.

In one embodiment the transport box 1324 allows an IED 1322, which does not have the ability to either directly connect to the network 1326 or the ability to use an email transport protocol, to connect to the Enterprise 1360. The IED, such as an electro-mechanical watt-hour meter, gives an output pulse, or other form of output data, to the transport box 1324, which is equal to a pre-defined measurement such as a kWh. In turn the transport box 1324 contains the ability to compile and translate the pulses or other output data from the IED 1322 into data, such as billing data, and package and push or send the data on either a pre-defined schedule, or an event driven schedule, to the Enterprise 1360. For example the IED 1322 emits a pulse to the transport box for every kWh measured. The transport box 1324 is programmed to push revenue billing data, as measured by the IED 1322, on a weekly or other scheduled basis to the Enterprise 1360. The transport box compiles the pulses, as sent by the IED 1322, into an email message containing the data, encrypts the data, and sends the message through the firewall 1330 to the Enterprise 1360. The Server 1352 receives the message from the transport box 1324 and decrypts and authenticates the message before sending the data to the database 1354. The database is then utilized to provide billing to Customer B 1306 on a monthly basis. The use of a firewall 1330 ensures that an unauthorized user, such as Customer A, may not access or alter the billing data contained in the transport box 1324. In an alternate embodiment the transport box contains a data converter engine, such as an extensible markup language ("XML") Engine, to convert the billing data into a pre-defined or readable data format, such as XML or Comma Separated Values ("CSV").

Further, in an alternate embodiment, the Enterprise 1360, may contact the Customer to enable a power management command, such as shed a load, on a load or device connected to an IED 1314. In operation a power management command is created or sent to the Server 1352 and the corresponding "shed load" command is packaged in an email protocol, such as SMTP, and sent to the IED 1314. A power management command may be included or reside in power management data. The use of an email message allows the Enterprise 1360 to transmit information through the firewall 1320. It can be appreciated that other transport protocols to transmit unsolicited information through the firewall can be utilized, such as HTTP, HTTP Tunneling, SOAP™ or instant messaging, if permitted by the firewall.

In an alternate embodiment the transport box is utilized to allow bi-directional communication through the firewall between the IED 1322 and the Enterprise 1360. The Server 1352 sends an email message through the Internet 1350, the firewall 1330 to the transport box 1324, addressed to the IED 1322. The transport box 1324, which contains a mail server, such as Microsoft Exchange™, receives and temporarily stores the email message for pickup from the IED 1322. Alternatively, the Mail Server 1328 may be external from the transport box 1324. Upon pickup, the IED 1322 can extract, process, permanently store the message and take any necessary action the message may have included. This "store and forward" capability of the mail server 1328 allows the IED 1322 to connect to the Mail Server 1328 or Transport Box 1324 while the corresponding message is held for retrieval. It will be appreciated that although the IED 1322 has the ability to connect to the network itself, for reasons such as security the transport box may be the only power management related device on the network allowed to connect other network infrastructure devices. The IED 1322 utilizes the transport box 1324 or mail server 1328 in order to connect to the network and send messages either in one direction or bi-directional as described.

Figure 14:
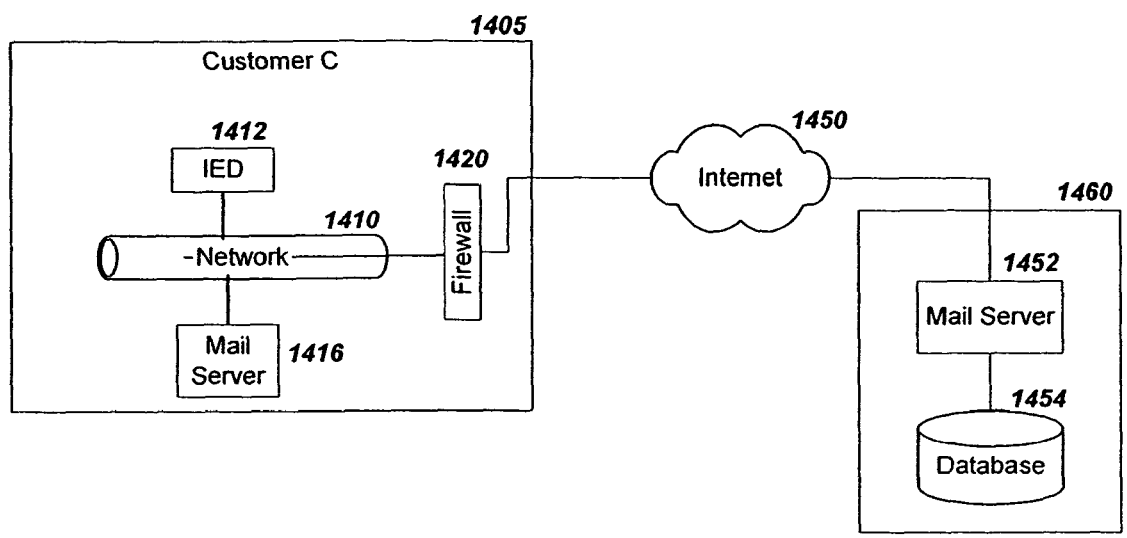
FIG. 14 shows a block diagram illustrating a third embodiment of a networked communications architecture having firewalls.

FIG. 14 illustrates an alternate embodiment where the Mail Server 1452 is located on the external network. Customer C 1405 comprises an internal network 1410 with at least one IED 1412 and an internal mail server 1416 connected to the network 1410. A firewall 1420 protects the internal network 1410 from users which may attempt to access the IED 1412 via the Internet 1450, or some other type of external network connection. An Enterprise 1460 has an enterprise mail server 1452 and a database 1454 which are utilized to send or receive data or commands to or from Customer C 1405. In one embodiment a message is sent to the IED 1412. In operation, the message from the Enterprise 1460 is received and stored in the internal mail server 1416, and the IED 1412 contacts the internal mail server 1416 periodically to check for messages. If a message is found on the internal mail server 1416 for the IED 1412 in question, the IED 1412 retrieves the message and acts or responds accordingly. In a second embodiment the message is received and stored in the external mail server 1452. This mail server 1452, which is located outside the firewall 1420, also stores the message for the IED 1412 until the IED 1412 retrieves the message and acts or responds accordingly. It can be appreciated that the IED connects to the internal mail server 1416 or the external mail server 1452, which ever is utilized by the Customer 1405, using protocols known in the art such as POP3 or Internet Message Access Protocol 4 ("IMAP").

In another embodiment authentication and encryption of the email message is performed to ensure that the email is not erroneously received by another IED 1312 and the command is conducted on the correct load or application. In another embodiment a proxy server is located on the internal network, either contained within the IED or as a separate device, which can also act as a filter to protect the IED from contacting or connecting to unauthorized sites. Further, it will be appreciated that the IED may have the ability to communicate to the internet 1250 via a proxy server. In another embodiment the IED itself may contain a firewall to secure access as described above.

With the inherent insecurity of publicly accessible external networks such as the Internet, private enterprises implementing internal local area networks, such as Intranets, must take precautions. While the safest alternative to prevent hacking, information theft, corporate espionage and other security breaches is to completely disconnect the internal network from external network, this solution also shuts out the tremendous benefits of having access to such external networks, some which have been explained above. Therefore, network security devices and policies, such as firewalls, must be implemented to safeguard the internal network while maintaining communication with the outside world. Automated power management applications operating on the disclosed power management architecture, as described above, must deal with this reality and respect the enterprise's need for network security while employing the intra-application component communications which span the internal and external networks to implement the power management application.

The disclosed embodiments described below meet these needs by providing a system and method for communicating through a firewall that takes advantage of the existing network infrastructure of the enterprise without jeopardizing the security of that infrastructure. The disclosed embodiments do not require a dedicated communications medium such as a telephone line. Each IED is capable of connecting directly to the existing network infrastructure, taking advantage of cabling, routers, switches, hubs, etc. that are already in place. Further, the disclosed embodiments do not require additional layers of data collection. Each IED is a standalone device capable of communicating with the back end servers or other data collection system within the power management architecture. Additional dedicated intermediary devices are not necessary to collect the power management data for the purpose of communicating it over the internal network. Further, each IED is capable of initiating communications, either according to a schedule, or as power management events are detected on the monitored power distribution system, i.e. event driven. This eliminates the need for in-bound "polling request" communications to the IED to cause it to send its data. By restricting communications to outbound traffic only, the enterprise's network security policies can be respected, and less burden is placed on the enterprise's network security staff in monitoring in bound network traffic from unknown sources.

As described above, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As described earlier, instant messaging ("IM") protocols can be utilized to transport commands or data over a network from one IED to another. The use of instant message applications offer several advantages over email or other types of communication applications due to the real time and guaranteed end-user delivery of the message. Although real time communication is possible with email, real time communication is not always guaranteed or realistic. Further, unlike email, IM applications typically do not "store and forward" messages. Email offers three phases or states of operation in a given message transfer: 1) the message has been delivered or, 2) message has not been delivered or, 3) the message is on it's way. The third state is an indeterminate state that leaves uncertainty in the success of the transmission as an email message may be delayed while en route through the network or, worse yet, diverted and lost. Instant messaging protocols eliminate this indeterminate third state by offering a binary state of either received or not received, thereby offering guaranteed success or failure of the message transmission. With today's dynamic market place, where power consumption and the associated fortunes of utilities, and other entities involved in the power distribution market, can be made or lost in seconds, a user must be able to respond immediately in real time with instantaneous knowledge and cannot afford to have indeterminate information.

While some instant messaging protocols do not require users or devices to be connected on a public Internet type connection, alternative IM protocols, such as Jabber operate on an open Internet connection utilizing an open source protocol developed by wwwjabber.org. Other IM applications, such as Microsoft's MSN™, manufactured by Microsoft Corporation located in Redmond, Wash. and Express Messaging Server manufactured by ACD Systems Inc. located in Saanichton, British Columbia, Canada, are closed source platforms. Open source refers to a program whose source code is made available for use or modification as users or developers see fit. Closed source refers to a program whose source code is typically proprietary and not available for use or modification to anyone but the original developers. IM can be utilized to have both person-to-person conversations and application-to-application conversations, such as web services, IP routing or data transfer. A person-to-application may also utilize instant messaging.

The instant message feature can be split into two types of service, centralized and distributed services. A centralized service uses an Instant Message Server to act as a central server application. Clients connect to the IM Server and the server logs and distributes the information provided by the clients. The IM Server automatically manages the presence information for the users (clients) and applications (also clients), distributing the information as needed or requested. Presence will be explained in detail below. In a centralized service, only the clients are connected to the server and the server is responsible for negotiating the delivery and receipt of the client's data with the other clients; all data transmitted over the instant message is transient in the server and stored at the client. Another type of IM service is a distributed service which has no Instant Message Server per se, but rather each client is responsible to connect to all the other clients to make their presence known and deliver their messages. Either type of service can be utilized to overcome firewall issues as instant messaging is typically added as an additional layer to the TCP/IP stack. Further, each type of service can be used either on an intranet (internal or private network) or over the public Internet infrastructure.

Typically, operation of a centralized IM application requires both the recipient (a client) and the sender (also a client) of the instant message to be online at the same time. Further, the intended recipient must be willing to accept instant messages, as it is possible to set the IM software to reject messages. The recipient can be an actual individual or a device, such as an IED, or a load or generator connected to an IED. An attempt to send an IM to a recipient who is not online, or is not available or unwilling to accept the IM will result in notification that the transmission cannot be completed. If the recipient is willing or able to accept the IM, the message, or data inside the message, is received by the recipient's device. Further, the recipient has the capability to accept or reject the incoming message.

To further enhance the instant messaging capabilities, "presence" is utilized. Presence is a way for a device to make it's connection or availability known or available to the network it is connected to. The connection can be logical, and not necessarily physical as a wireless device may be "present" on a network without any physical connection. Presence also allows a device to locate or identify a second device, wherever it may be on the network, as soon as the second device connects to the network; it is an autonomous, contemporaneous broadcast or transmission of the devices availability. There are several types of presence that can be used to signify the presence of a recipient or sender. Temporary Presence indicates where, on the network, the recipient was several minutes ago; Predicted Presence indicates where the sender thinks the recipient is now; Network Presence indicates the recipient client is logged in somewhere; Actual Presence indicates that the recipient is logged in somewhere; and Real Presence indicates that the recipient is logged in and communicating. In one embodiment there are several sub-sets of Real Presence which are utilized. "Available" indicates the recipient is available to receive messages; "Available but not on" indicates the recipient is available but the device is not on; "Available but on" indicates the recipient is available and the attached device is on; and "Available with restriction" indicates the recipient is available but with restriction to receive and execute commands. It can be appreciated by one skilled in the art that there are several variations, extensions and permutations of the above types of presence such as 'away', 'do not disturb', 'sleeping' etc. Presence can also go beyond the above binary states to offer insight into other necessary information. For instance presence may also indicate information such as location, geographic, logical or physical, or other application specific data such as general capacity, fuel, temperature, circuit capacity, % load, energy value or fault and trip information, or "available with restriction" may also contain a status note of "critical process online, will go offline at 13:03 PST". Status is an extension of the presence of a device. While a device offers the presence of "available", the status may offer further device information.

Presence is detected, broadcasted or polled on a scheduled basis. For example, the presence is either requested or received every 1 minute, or requested by a client. It is obvious to one skilled in the art that the 1 minute interval can be both increased or decreased to offer alternate time resolution. In the case of a first client requesting the presence of a second client, the IM Server will poll the second client and make the information available to the first client. Alternately, the IM server will provide the second client presence to the first client as the presence may by broadcasted or sent by the second client to the IM server thus allowing the IM server to receive and update the presence without the need for polling. The ability to both detect the presence, or receive a presence message from the device, offers the IM server the ability to track presence in substantially real time. Alternately, presence can be detected, updated or broadcasted on an event driven basis.

The presence indications, as outlined above, can be altered in several ways. For example, a device may be instructed to switch from "available" to "available with restriction" upon the simple binary state decision whether the device is either "inactive" and not in use and thus "available", or "active" but in use and thus "available with restriction". Furthermore the "active" presence may be defined to signify that the device is "active" if there is mouse or keyboard movement from the operator, or if the processor is at, and maintains, a certain level of activity. It can also be appreciated that the device could alter its presence to "available with restriction" if the processor is in the middle of a critical process and cannot receive another command without sacrificing the critical process.

Presence can also be detected using other types of transport protocols or commands such as email notification. For example a user may send an email to a device instructing it to reply immediately with the device presence or status. Upon receipt of the return message the user checks the timestamp to determine if the reply has been sent in the appropriate period of time to signify that the device is currently online, and the reply content of the email can be used to give the presence or status of the device. However, the possibility of an indeterminate response, i.e. no response is possible with email which may leave the requestor in a hanging state. Further, the use of email to determine presence, combined with the aforementioned security offers the ability to determine the presence of a device securely. This is important because a user may want to determine the presence or status of a device, but not want another user, such as the competition, to be able to determine the status of their devices. It can also be appreciated that the use of aforementioned security module can be coupled with an instant message or the instant message server itself.

In one embodiment the Instant Message Server contains two services, the Presence Service and the Instant Message Service. The Presence Service accepts presence information, stores and distributes it whereas the Instant Message Service serves to accept and deliver Instant Messages. It will be appreciated that these two services can be combined or implemented separately depending on the application. The advantages of having the presence service separate from the instant message service allows other applications to make use of the services independently. For example, a client may wish to use the presence service in conjunction with an email service or other type of communication protocols thus allowing the client to detect and reveal the availability of another client on the network before sending a message. In another example a client utilizes instant messaging without the use of presence, but the client is instructed to use an email service as a backup if the instant message is rejected due to the intended recipients unavailability. In this example presence is not required as the instant message is rejected if a connection cannot be made. It will be appreciated that the success or failure of an instant message is, itself, an indication of presence.

Figure 15A:
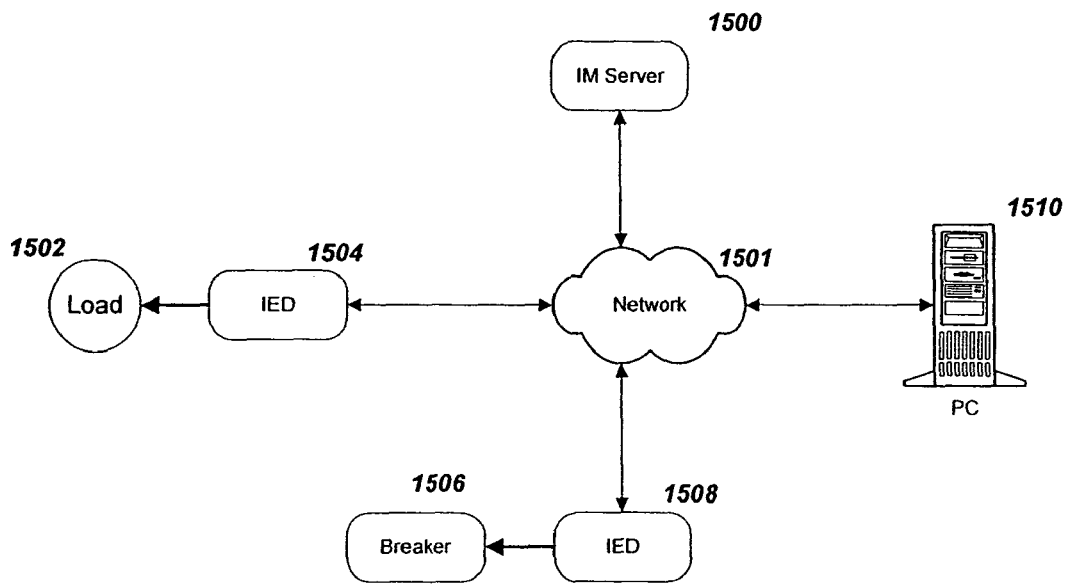
FIG. 15a shows a block diagram illustrating a networked communications architecture having an instant message server residing on the network.

FIG. 15a illustrates a network with an instant message server residing on the network. Clients, such as computers 1510 and IED's 1504 1508 connected to their associated loads 1502 and breakers 1506, are coupled with the network 1501. In this embodiment the IM server 1500 is connected with the network 1501. It will be appreciated that the IM server may be connected with the network 110 shown in FIG. 1 as well (not shown).

Figure 15B:
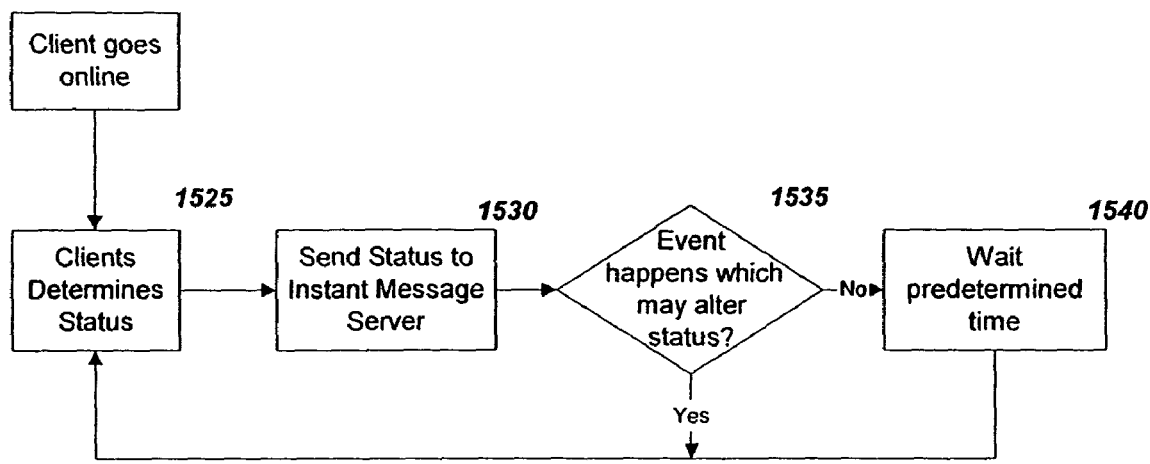
FIG. 15b shows a block diagram illustrating a networked communications architecture that allows a client to show its status or presence to an instant message server.

FIG. 15b illustrates an architecture that allows a client to show its status and/or presence to an IM server. When a client, or user, goes online 1520, the client presence is determined 1525 and sent to the Instant Message Server 1530, or other server which acts as the presence server. Two types of events can then trigger a presence change: 1) If the client or user detects or has an event which may alter its status or presence then the presence or status is re-determined 1525 and 2) if a pre-determined time has elapsed 1540 without any event then the presence or status is determined again 1525. It is appreciated that the predetermined time can be set by either the client or requested by the server and, in either case, be defined to give substantially real time presence as required by the client, user or server. In the case of a distributed system, block 1530 would provide for broadcasting the presence to all available devices on the presence or instant message network. It will be appreciated that the instant message network can be a private intranet where a collection of clients and instant message servers are connected on a common network, such as an Ethernet network, or the instant message network may embody a subset of the larger public Internet infrastructure with the instant message server attached to a specific internet protocol address.

Figure 15C:
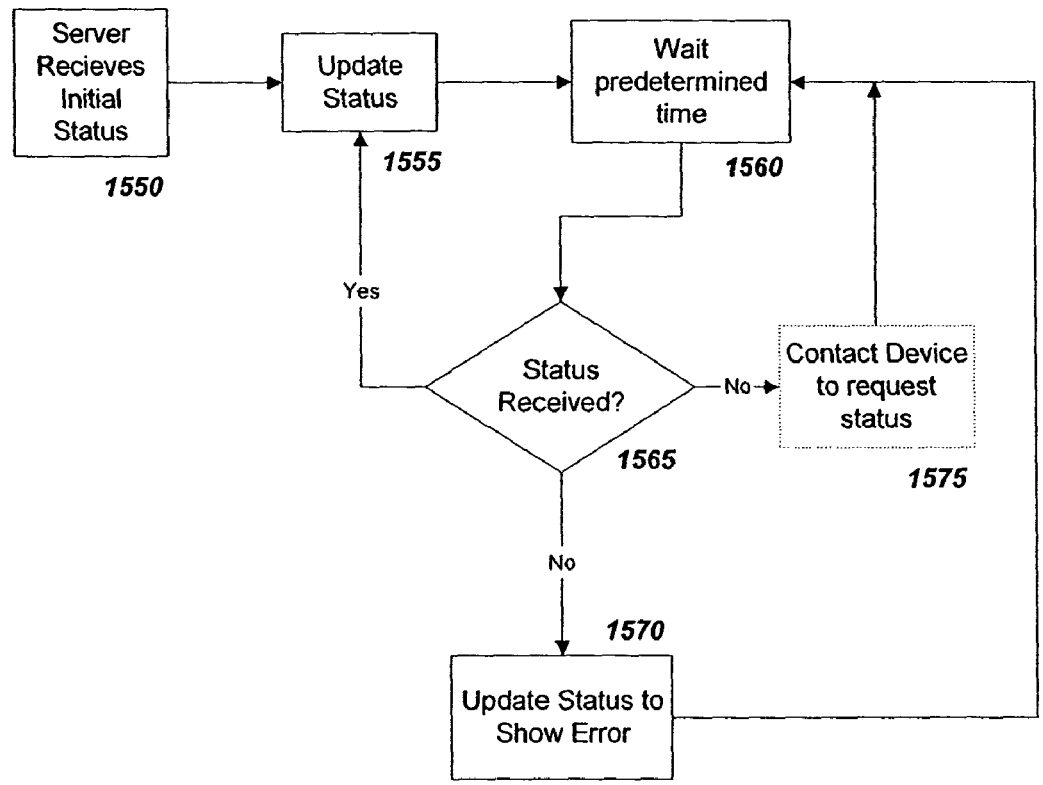
FIG. 15c shows a block diagram illustrating a networked communications architecture which permits a server to receive and update the presence of clients in a centralized instant message application.

FIG. 15c illustrates the architecture involved for the server to receive and update the presence of clients in a centralized IM application. When the server receives the initial presence 1550 of the client, the presence is updated 1555 on the server and made available for all other appropriate clients to view. In one embodiment, the presence may be encrypted or hidden from unauthorized users. At block 1560, the server waits for a predetermined time to elapse before the server checks to see if the presence is received again 1565. This feature ensures that if a client goes offline, but is unable to send an error, the server will automatically update the client presence to show a presence error 1570. Alternately, the server may be configured to contact the device directly using a predetermined communication means to request a presence update 1575, such as an email command or instant message requesting a particular reply. It will be appreciated by one skilled in the art that the same architecture applies to a distributed system except the functions of the server are located on/distributed to each device.

Figure 16:
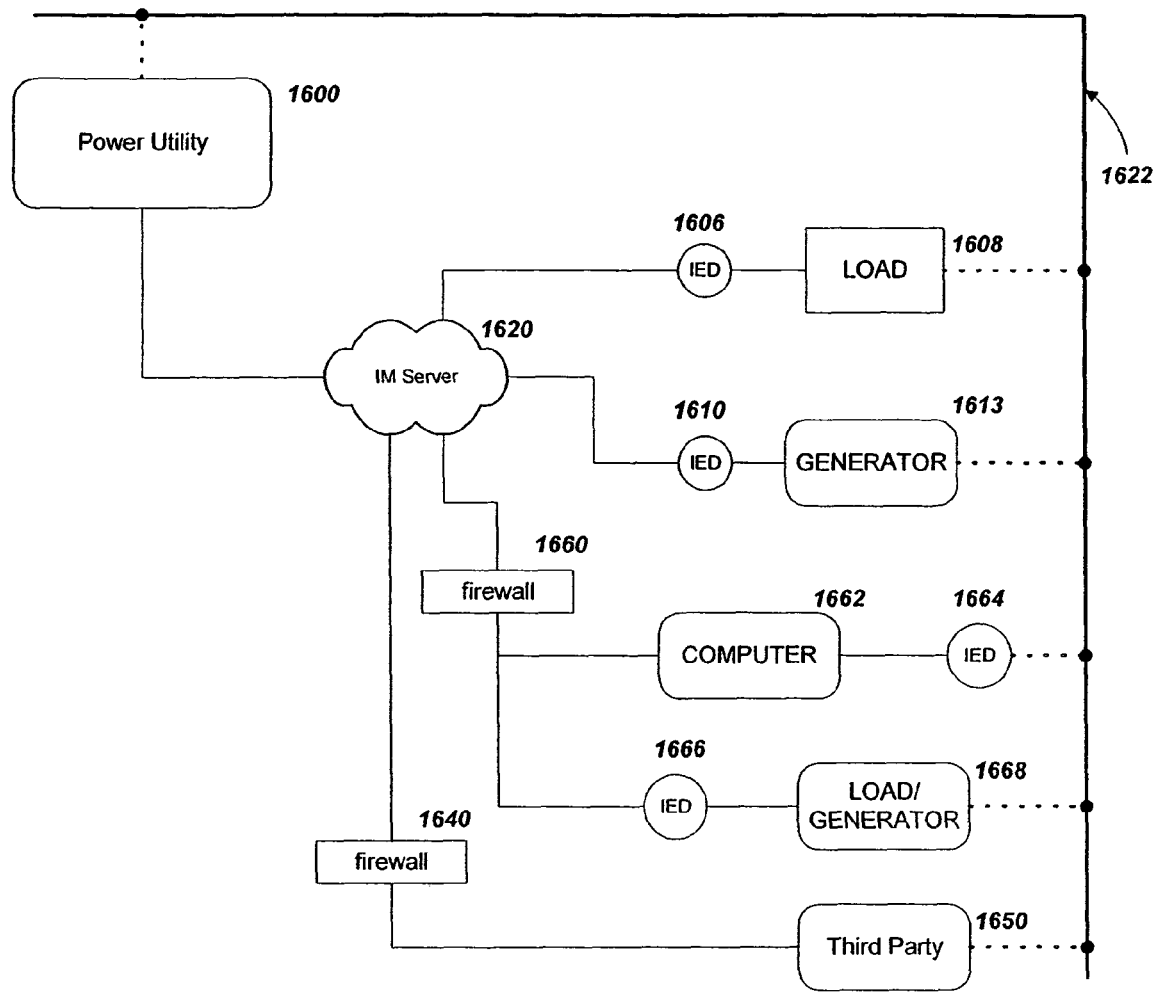
FIG. 16 shows a block diagram illustrating an exemplary networked communications architecture including devices utilizing an instant message server.

FIG. 16 illustrates an exemplary communications architecture including multiple IED's and associated loads and generators connected to a utility, utilizing an Instant Messaging Server in a centralized system. In this example, the Presence Server is incorporated into the functionality of the IM Server 1620 but it can be appreciated that the Presence Server can be a separate, independent server. A first IED 1606 is connected to a load 1608 and a second IED 1610 to a generator 1613, both of which are available to be shut down or turned on upon request from the utility during high power demand times. An Instant Message Server 1620 connects the Power Utility 1600 to the IED's 1606 1610. In one exemplary operation, the utility 1600 may need to reduce the load on the power grid 1622 by either reducing the load 1608, or starting the generator 1613. In one embodiment, the utility 1600, using presence, detects the load 1608 is 'available and on', and the generator 1613 is 'available but not on'. A power management command, which includes a shed load command, is sent to the IED 1606 and the load 1608 as an instant message using the IM server 1620. The IED 1606 accepts the command, executes the appropriate function and replies to the utility 1600 using a second instant message, via the IM server 1620, indicating that the appropriate load has been shed. The presence of the load 1608 now indicates 'available but not on'. Alternately, the IED 1606 may determine that the load 1608 is a critical load, or is in the middle of a critical process and cannot be shut down. In this case the IED 1606 then rejects the message from the utility 1600 or, further yet, alters the load's 1608 presence to show 'available with restriction'. In this embodiment the utility 1600 determines that in order to reduce the load on the power grid 1622 it must start the generator 1613. As the IM presence detects that the generator is available for startup, the utility 1600 sends a command to the IED 1610 requesting startup using an instant message protocol. The IED 1610 accepts the message and initiates startup of the generator 1613. The IED also replies to the utility 1600, sending a startup confirmation in an instant message through the IM server 1600. During the generator 1613 startup phase the generator presence is altered from 'available but not on, to 'available but with restriction'. This is important because a device, while in startup mode, may be damaged if another command is sent to shut it down before it is fully started up and can initiate a shut-down procedure. Once the generator is in full operation the presence is changed to 'available and on'. Alternately, presence is used to determine if there is an error with the load 1608 such as if the utility 1600 determines that the load 1608 is not present, or unavailable, without reason. In this case 'unavailable' is signified and the utility 1600 knows an error has occurred that needs to be addressed.

It will be appreciated that the utility 1600 can send instant messages to the load 1608 and generator 1613, or their associated IED's 1606 1610, without the use of presence, and utilize the IED's 1606 1610, and IM responses therefore, to determine if the associated loads, generators or connections to devices thereto are available to process or execute the command contained within the instant message. It will also be appreciated that the same type of distributed system is contemplated but without the Instant message Server 1620. In this situation each client is responsible to both indicate they are online and poll the other online clients for their presence information.

Instant messaging also offers the ability to receive co-dependent or multiple separate messages, and allows a recipient to either reply to multiple messages concurrently or independently. This ability allows a power utility 1600 to send a shared message to multiple IED's 1606 1610 with identical instructions.

In an alternate embodiment the use of instant messages offers the ability to send software, firmware or other computer upgrades to devices using instant messages with presence. A power utility 1600, or a third party manufacturer 1650 may require that the IED's 1606 1610 be upgraded with new firmware. In operation the utility 1600, utilizing presence, determines if the devices 1606 1610 are available to be upgraded and, if the devices 1606 1610 are shown as available to be upgraded, the upgrade is sent via an instant message. It can be appreciated that this upgrade can come in the form of an actual file upgrade, or a command for the device to connect to another device or server to download and implement the upgrade as disclosed in U.S. patent application Ser. No. 09/792,701, entitled "SYSTEM FOR IN THE FIELD CONFIGURATION OF INTELLIGENT ELECTRONIC DEVICES", filed on Feb. 23, 2001 which is herein incorporated by reference.

In another embodiment, instant messaging also includes security protocols such as encryption, decryption and authentication, similar to the security described earlier in relation to, among other things, the security module. These security applications, such as digital certificates, tracking ID's or other algorithms, are utilized on the open source systems. It will be appreciated by one skilled in the art that similar private security applications are utilized on the closed protocols, such as on Microsoft's MSN instant messaging. Further, the security applications described can also be utilized to scan or stop a virus or other type of malicious or damaging program, command or event, such as a denial-of-service attack, from being sent via the transmission, either intentionally or unintentionally. A virus scanner or similar detection software known in the art is placed on either the senders or recipients device to automatically check if a virus is attached to the incoming our outgoing message. Alternately the security policies are embedded in the firewall to offer self protection from malicious attacks or viruses.

As mentioned earlier, a firewall is an application that typically protects entry from a publicly accessible network that is coupled to a private network. In an alternate embodiment a third party 1650, such as a Billing Company, resides behind a firewall 1640. Communication between the Billing Company, the Power Utility 1600 and IED's 1606 1610 is made possible with the use of the IM Server 1620 as instant messages are able to pass through a firewall 1640 using technology known in the art, such as HTTP tunneling. In operation the Billing Company 1650 uses presence to determine if the utility is present and available to receive a message. If so the Billing Company 1650 transmits a tariff structure message through the firewall 1640 to the Power Utility 1600 via the IM Server 1620. From there the Power Utility 1600 can take appropriate action, such as reduce the loads on the power grid 1622, as described earlier. Alternately the Billing Company 1650 can transmit other types of messages, such as real time pricing.

In another alternate embodiment, where security is necessary on the secure side of a firewall 1660, a computer 1662 is connected to an IED 1664, and the IED 1664 to the power grid 1622. In operation the IED 1664 is used to determine the power parameters directly from the power grid 1622 and the computer 1662 initiates connection through the firewall 1660 to the IM server 1620, pushing the presence of the IED 1664. At this point there is now a connection between the IM server 1620 and the secure side of the firewall 1660 where the IED 1664 resides.

In yet another embodiment, a first client attempting to detect a second client that they wish to contact that is not "present" or "available", may instruct the instant message application to show an alert when the second client becomes available, or send a pre-stored message to the second client upon their availability. This allows a client or user to mix the "store and forward" technology with an instant message protocol technology. For example, a client may wish to upgrade five devices on a network by sending an upgrade patch attached to the instant message. All of the intended recipient devices are available except one, who's presence shows as "on but unavailable to receive commands". The client sends a co-dependent message with the attached upgrade file and associated upgrade commands. The client then receives four positive notification from all devices that the message was received and one negative notification stating that the device is unavailable to upgrade at this time. The client then initiates a routine which continually checks the fifth device until the presence is changed to "available" and then the upgrade message is sent. This routine may have a pre-defined time-out period, the elapse of which indicates an error that needs to handled. As described earlier the co-dependent message allows the client to send one message to the entire group of users in place of single multiple messages.

As mentioned earlier presence can be utilized to show the status of a device beyond just the "active" status or application specific data or status parameters, such as load capacity or breaker status. Where presence is limited and detailed status information cannot be reported, instant messaging can be utilized to retrieve the required data. Furthermore, programmed instant messaging alarming can be utilized to offer status updates at pre-configured status levels of a device or upon command from a user. For example a generator may be generating at x % capacity with y % available; the same can be said about a load on a circuit main or breach circuit. At 80% loading a "high loading status" is reached, at 95% loading a "trip point eminent status" is reached and at 0% loading a "breaker tripped status" is shown. In operation instant messages are used to transmit these pre-determined status points to the operator when they are reached. Additionally the use of presence to detect that the status update message has been received offers the ability of a device to ensure a user is available that can respond to the status report. For example, a circuit breaker reaches 80% loading and thus is programmed to send a status update using an instant message to the associated plant operators. When the circuit breaker reaches 95% loading, and thus is showing a "trip point eminent status", the circuit breaker is programmed to, using presence again, check to see if a plant operator is online and available to receive the status update as a loading of this level needs immediate attention. If the operator shows "unavailable" the circuit breaker is then programmed to check other plant operators availability. This ensures that a plant operator will receive the status update and hopefully act appropriately. It can be appreciated that many other alarms, such as "generating but with low fuel", "service required" or "generator temperature exceeded" on both generator devices or associated loads, can be programmed into any devices that have instant messaging and/or presence capability.

Figure 17:
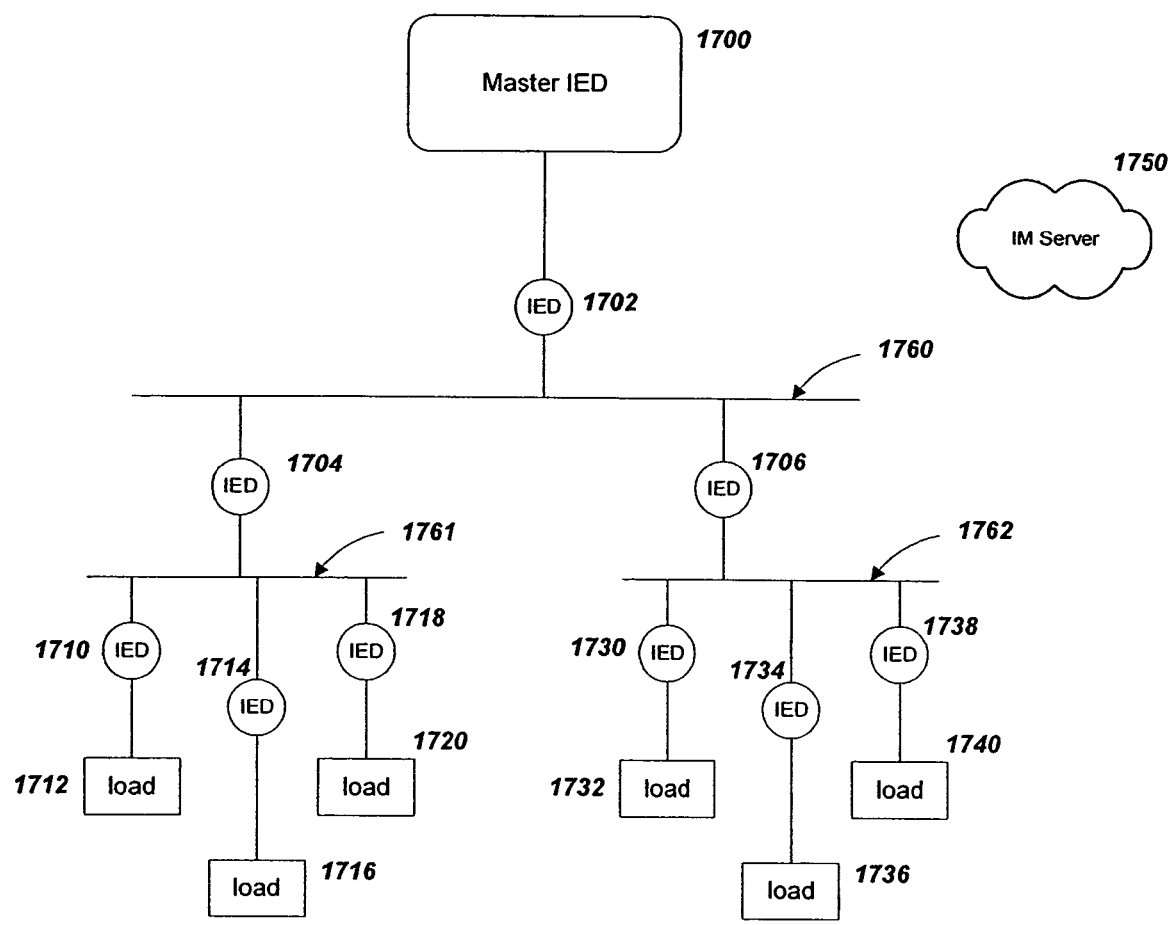
FIG. 17 shows a block diagram illustrating an instant message server in use with a branch circuit of an electrical power distribution system.

FIG. 17 illustrates an Instant Message Server connected to a Branch Circuit System. A master IED 1700 has multiple IED's 1702 1704 1706 downstream of the master IED 1700, each second tier branch 1761 1762 having loads 1712 1716 1720 1732 1736 1740d IED's associated with each load. The use of instant messaging between the IED's allows the system, or a segment of the system, to compile and describe the state of the system and thus make informed decisions such as changing loads to avoid an entire system outage. In operation each IED is coupled with the Instant Messaging Server 1750 (connection not shown). In a distributed system it will be appreciated that a master IED 1700, or other IED, may contain the instant message or appropriate presence server. The upstream IED's 1700 1702 1704 1706 use instant messaging and presence to sum the information about each branch 1760 1761 1762, and allow the upstream IED's to make informed decisions about the branch. For example the master IED 1700 detects a changing load on a branch 1762 and must make a decision based on availability of altering loads to different circuits, rerouting power or bringing additional generators online.

As described earlier, IM protocols can be used to transport commands or data over a network from device to another. One limitation of the IM protocols is the requirement to have an active connection to communicate between the devices. If a device only periodically connects to the network then any commands sent will fail due to the device not being online or no presence detected. While a store and forward mechanism would solve this problem, not all IM messaging systems have such a mechanism. Another limitation is that most IM systems do not use open source or common standard protocols to communicate, making them often subject to being blocked by firewalls. In order for IM protocols to work correctly through firewalls, changes must be made in the configuration of the intervening firewalls. In some situations the department responsible will be unable to make changes to the firewalls configuration for security or policy reasons. Frequently instant messaging is specifically blocked as much as possible. Many instant messaging protocols are designed to find any outgoing holes in the firewalls. Because of this many companies spend a fair amount of time disabling as many of the instant messaging protocols as possible to prevent leaking possibly unauthorized information into unsecured networks. A further problem is that if both IM devices are behind different firewalls then direct communication is not possible unless one or both firewalls are specially modified to allow tunneling from external devices to the internal, protected network. The IM system must provide external servers that will proxy the IM messages in this case or communication will not be possible.

As will be described in more detail below, a Hyper Text Transfer Protocol ("HTTP") Polling mechanism is used to communicate to devices behind firewalls. HTTP Polling uses the standard HTTP protocol and may use the HTTP port (port 80) to communicate between nodes. In one embodiment, a different port other than port 80 is used for HTTP to keep browser requests separate from other requests. Since HTTP is a well-known and understood protocol most packet filtering firewalls typically, by default, allow port 80 as an outgoing port. Tunneling techniques may attempt to use port 80 to sneak a non-HTTP protocol to an unsecured network. Alternatively port 80 may also be used to tunnel data to the unsecured network using the HTTP protocol to encapsulate the application data. Such tunneling techniques are considered security violations, and HTTP-aware firewalls and proxy servers typically inspect the traffic to ensure only valid HTTP traffic is going through port 80.

A new class of application gateway is emerging that inspects Simple Object Access Protocol ("SOAP") messages coming in through various protocols, optionally performs some security checks, and then routes those SOAP messages to another SOAP endpoint for processing. Such gateways are typically referred to as Extensible Markup Language ("XML") Firewalls. XML Firewalls typically use Global XML Web Services Architecture ("GXA") Routing and XML Signatures to perform these filtering tasks, and eliminate all non-SOAP traffic. The original sender and final receiver of the SOAP message can ignore the routing and firewall behavior of XML Firewalls. For our discussions, an XML firewall can be placed between any two entities exchanging SOAP messages.

By using TCP/IP to carry HTTP which in turn carries a SOAP message, the content of messages sent can be inspected at the packet (port), the application layer (HTTP) and the SOAP layer, enabling deployment of the disclosed embodiments in a variety of firewall configurations and environments with minimal need for special configurations. The use of a SOAP message to transport the data allows for easy inspection of the data payload carried within the message. This easy inspection also allows the use of other transport protocols other than TCP/IP and HTTP to carry the SOAP message across firewalls without having to completely rewrite all the firewall rules detailing which SOAP messages are allowed or not.

In many cases, the default configuration of many firewalls will not allow unsolicited incoming requests, via any port, to be communicated to a device coupled with the secured network, including HTTP traffic requests through port 80. However, unsolicited outgoing communication, such as outbound requests, especially HTTP (port 80) requests, are typically allowed, as well as the incoming responses, i.e. the solicited responses, to those outbound requests. The embodiments discussed below take advantage of the ability for solicited responses, generated by an external device or server in response to a request generated by an internal device, to be allowed to pass through a firewall configured as described. When the internal device sends either a solicited or unsolicited communication to the external device, a "back channel" is opened through the firewall through which only a solicited communication, i.e. the communication made in response to the prior communication, is allowed through. This solicited communication can contain any command or data that the external device wishes to send to the internal device. If the internal device, protected by the firewall, periodically polls, i.e. initiates the communication to, a server outside the firewall, messages can be exchanged between the two devices, i.e., the external device can send a solicited response containing either solicited or unsolicited messages, such as commands or data. It will also be appreciated that non-periodic polling may be done. This "push" exchange can be used to effect general bi-directional communications between the two devices.

As the internal device controls when it polls the server, it can control the amount of work that it executes and the bandwidth it consumes. If the internal device cannot handle any more work, or it does not need information from the external device as rapidly, then the internal device slows or stops polling the external device until it is ready to process new work. The actual work the device receives may include requests to change the polling rate or other commands, thus allowing the external device to have some measure of control over the internal device. The device may also poll on an event basis rather than periodically. Any new work will be queued up on the external server until the internal device is ready and requests additional work. Alternatively, the external server can decide to abort the pending request to the internal device if the internal device fails to poll the server within a specified time period. If the internal device is unable to connect to the external server (network problems, device rebooted, intermittent or scheduled modem connection etc) then to the external server this looks just like the internal device is unable to process any new work at that moment.

Where the above described internally initiated bidirectional communications use HTTP requests, the HTTP protocol can also optionally encapsulate other protocols within the HTTP messages like SOAP. Using SOAP allows both device and server to present a functional interface known as XML Web Services. Although XML Web Services are usually transported over HTTP they may be transported over any protocol that can transport an XML document. XML Web Services are implemented by sending SOAP messages to invoke a service or to provide the result of execution of a service. Although the Request-Response Remote Procedure Call style web services are the most common, other patterns exist and are well known in the art. Universal Description, Discovery and Integration ("UDDI") is a technology that provides a mechanism to advertise and find web services. Web Services Description Language ("WSDL") is well known in the art as a technology used to define the properties of web services including message format, and to some degree, message content and locations messages are sent to.

The internal device, using the HTTP Polling mechanism described above, uses HTTP POST request messages to send data to the external server for further processing, storage or execution. The Uniform Resource Identifier ("URI") defines the resource that is being accessed. The HTTP POST message type is where the HTTP request contains data that is sent to a URI on the server for processing of some kind. As is well known in the art, this could include the triggering the execution of scripts or some other data processing application to parse the posted data. Alternatively, data could be encoded within the URI itself and either a POST or a GET be executed.

As is known in the art, there are two common web service models wherein HTTP is the underlying application protocol. In the representational state transfer ("REST") model, the service being invoked is the URI being accessed through the web. In the SOAP model, the content of the message is generally thought to describe the service being invoked, with the resource at the URI that the SOAP message is being sent to, as a routing mechanism. Examples of using SOAP messaging using the HTTP POST and HTTP GET commands are well known in the art.

The HTTP response from the server will contain an acknowledgement that the HTTP request from the internal device has been received and processed by the external server. Alternatively the HTTP response message will also contain a new request directly or a link to a URI that contains a new request for the internal device to retrieve and then execute. This returned request could be as simple as a request to read and return a data value. Alternatively, more complex examples include: setting the time, upgrade the firmware, change a configuration parameter, change the price for a commodity that the device measures, read a temperature, close a breaker contact or execute some other similar command. All of these commands could be executed by either the internal or external network device. It will be appreciated that other transfer protocols know in the art, such as SMTP, FTP, Telnet, SNMP, Gopher, POP3, IMAP, and NNTP, as well as other custom or proprietary communications protocols, whether or not TCP/IP based, are also capable of passing through the firewall from a secured network to an unsecured network and retrieve data and/or commands. Secured and unsecured networks will be described in more detail below.

Previously the retrieval of commands and responding with data was accomplished with multiple independent transactions—typically with one or more independent transactions for the request data and one or more independent transactions for the response data. Using the HTTP request to return the response data and then also retrieve the next request in that HTTP response message simplifies the transactions required and also decreases the amount of time between requests. This will decrease the number of transactions over a given period of time to transfer the same amount of data and thus reduce the CPU loading and bandwidth requirements between the devices.

Given a device on a secure network protected by a firewall and an unsecure PC that needs to send data to the secured device, the traditional approach for this application is that a physical connection is made between the device and the PC. Identification of the device is sent to the unsecure PC by including this in the initial connection information, then a request for a new work unit for the device to process is sent to the PC. The response contains the new unit of work and finally the connection is closed. Once the data has been processed by the device a new connection is opened again to the PC, the processed data is sent with identification of the originator device and the connection is again closed between the device and the PC. In this case is the unsecure PC is unable to initiate a connection to the secure device due to the protection provided by the firewall, as described above.

Figure 18A:
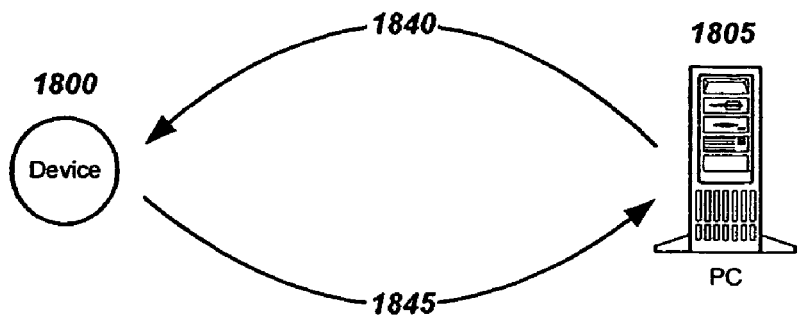
FIG. 18a shows a block diagram illustrating an HTTP Polling architecture using logical transactions.
Figure 18B:
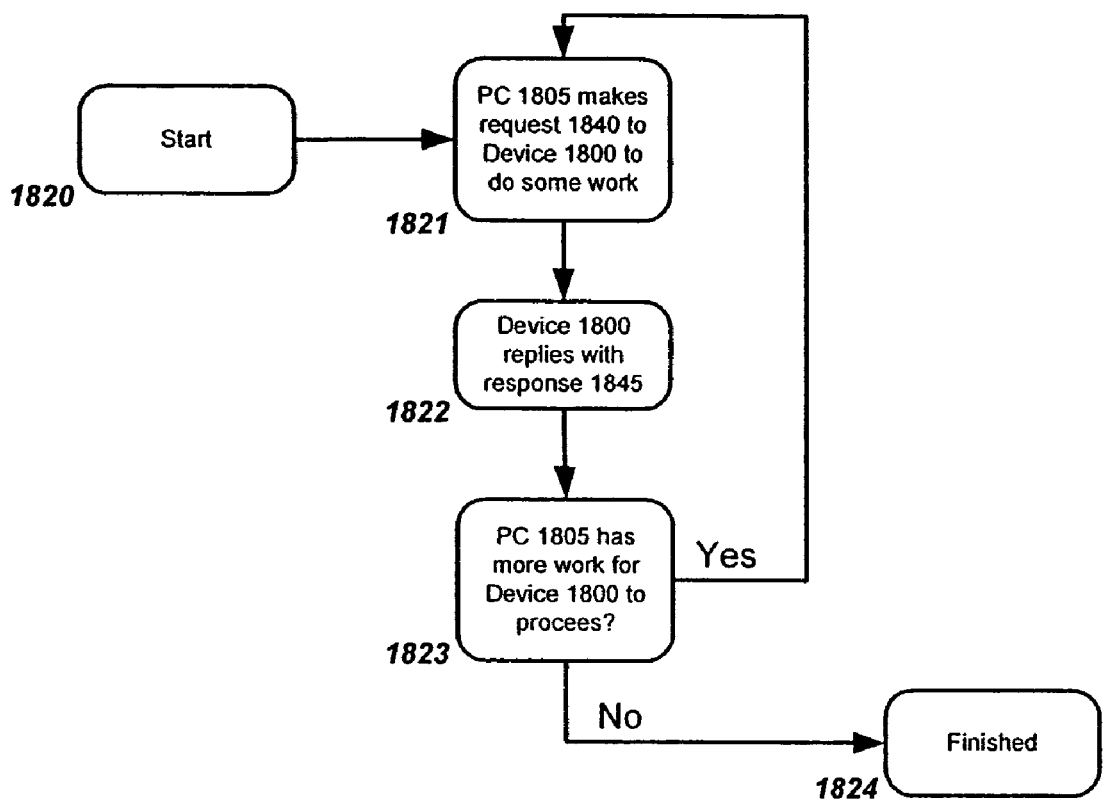

FIG. 18a shows the logical requests and responses between a Personal Computer ("PC") 1805 and device 1800. Logically, the PC 1805 makes a request 1840, i.e. initiates/solicits the communications, to the Device 1800, as shown in FIG. 18a and 18b. It will be appreciated that the device 1800 may be an IED or backend server as described above and the PC 1805 may be a backend server, IED or other device as described above. After the device 1800 has processed the request 1840 the device 1800 replies with response 1845 to the PC 1805. This process is then repeated while the PC 1805 has work for device 1800 to process. As described above, the work for the device 1800 to process includes transfer of data and the sending and receiving of power management commands. As described above, the data that can be transferred includes power management data which includes measured data, upgrade data, time sync data and power quality data in addition to the previous description. The format of the messages transferred between the PC 1805 and the device 1800 may include SOAP, XML, HTTP, TCP/IP, ION, Modbus and DNP V3.0 and other protocols well known in the art. The method itself does not restrict the format of the data that is contained within the various packets being transferred. It will also be appreciated that this technique is applicable to transmission of any data, not just power management data.

FIG. 18b illustrates a flow chart of FIG. 18a. In operation the PC 1805 makes a request 1840 to the device 1800 to do some work, block 1821. The device 1800 replies with a response 1845, block 1822, and the PC 1805 determines if it has more work for the device 1800 to process, block 1823. If the PC 1805 does not have more work to process, the communication is finished, block 1824. However, if the PC 1805 determines it has more work to process, the cycle is continued to block 1821 where the PC 1805 makes a request 1840 to the device 1800 to do work. This procedure continues repeating until there is no more work for the device 1800 waiting on the PC 1805 as determined in block 1823.

Figure 18C:
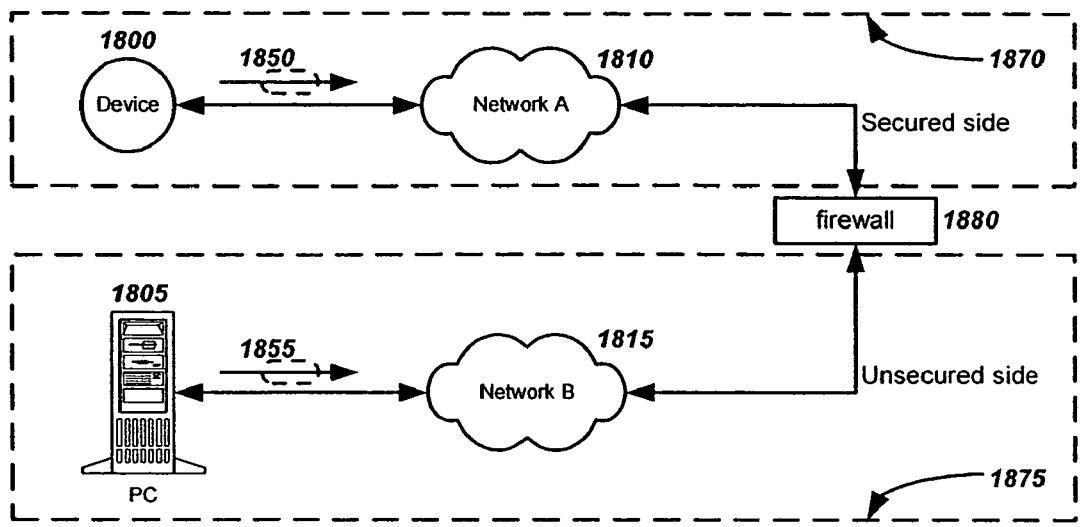
FIG. 18c shows a block diagram illustrating the physical network configuration and physical transactions of first exemplary networked communications architecture.

FIG. 18c shows the physical network configuration and physical transactions between PC 1805 and device 1800. The PC 1805 is virtually located on an unsecured side 1875 and device 1800 is virtually located on a secured side 1870 (secured by and relative to the firewall 1880), thereby prohibiting the PC 1805 from initiating any communication to the device 1800. The firewall 1880 is configured to block all unsolicited communication from the unsecured network 1820 to secured network 1810. Thus, for the device 1800 to communicate with the PC 1805, the device 1800 must initiate a physical connection to PC 1805, i.e. solicit communications from the PC 1805. Note that in the case where both the device 1800 and PC 1805 are located on the same network with no intervening firewalls, the physical communications between the two would be the same as the logical communications described above.

Figure 18D:
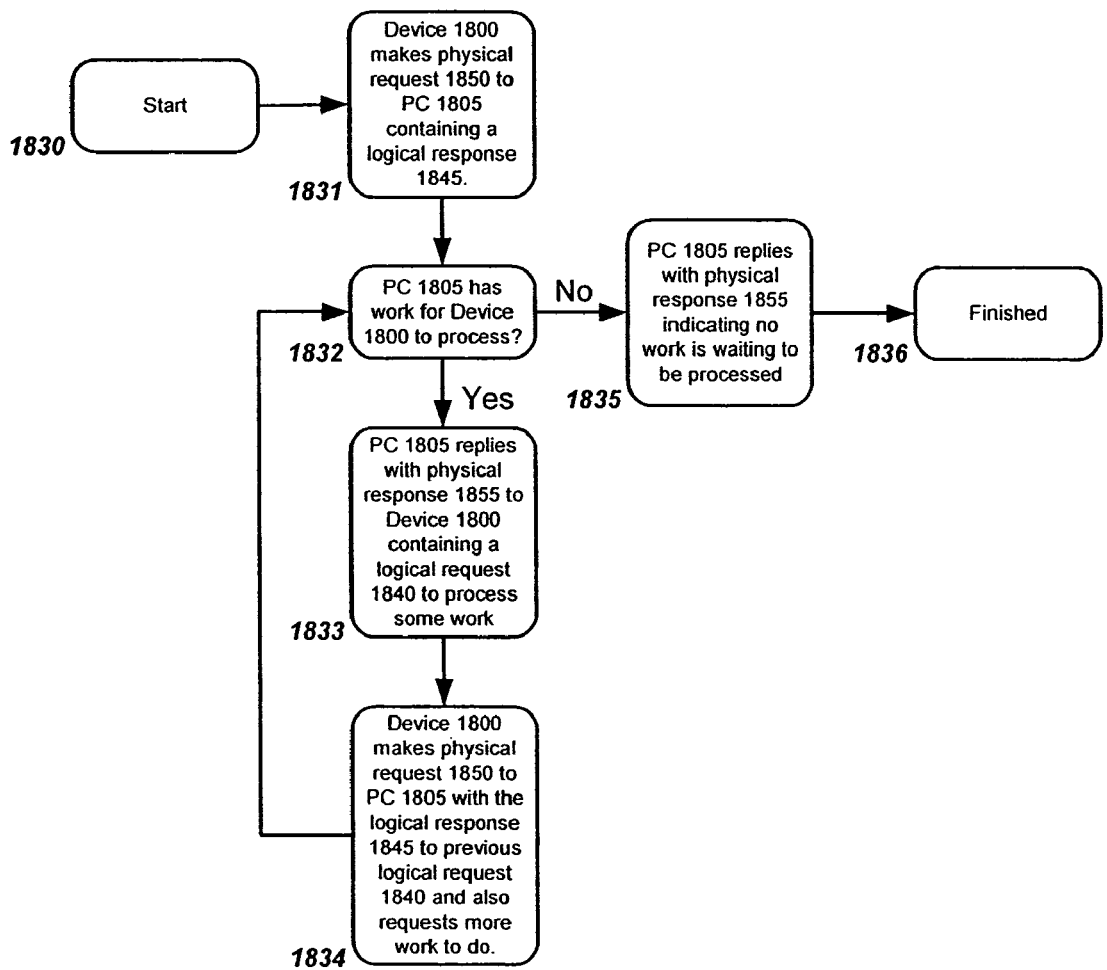
FIG. 18d shows a flow chart illustrating the processing of physical packets and logical messages in the system depicted in FIG. 18c.

FIG. 18d shows a flow chart of the steps described in FIG. 18c. In operation the device 1800 makes a physical request 1850 containing a logical response 1845 with the results of a previous request to do some work by the PC 1805 (if any) and includes a request for more work to process, block 1831. Where this is the first request, there may be no results contained within the request or the results may be related to a triggering or monitored event. Next the PC 1805 queries if there is any outstanding work for the device 1800 to process, block 1832. If the PC 1805 has work for the device 1800 to process the PC 1805 will reply with the physical response 1855 containing a logical request 1840 containing some new work for the device 1800 to process, block 1833. The device processes the logical request 1840 and makes a new physical request 1850 to PC 1805 containing a logical response 1845 and a request for more work to process, block 1834. This sequence continues until the PC 1805 decides that there is no more logical requests waiting for the device 1800, block 1832. In this case the PC 1805 sends a physical response 1855 indicating that no work is waiting to be processed, block 1835. Finally the sequence ends, block 1836. Any of the responses by the PC 1805 in this sequence of communications may contain commands to control the next interaction between the device 1800 and the PC 1805, such as a scheduling command instructing the device 1800 to initiate communications at a predetermined time/date to check for additional work.

The HTTP Polling mechanism allows for the device 1800 to send a physical request 1850 to a second device, such as the PC 1805, and receive response data 1855 in the same connection. The firewall 1880 connects a first network 1810 and a second network 1815 together. The firewall 1880, as described above, allows connections to be initiated by devices on a secure side 1870 to devices on an unsecure side 1875 but not from the secure side 1870 to the unsecure side 1875. In operation, the device 1800 is coupled with the first network 1810 and is allowed to make connections to other devices (not shown) on first network 1810 and the second network 1815. On the second network 1815, the PC 1805 is present and is prevented from contacting any device on the first network 1810 by the firewall 1880. As is well known in the art firewalls are configured with rules that detail exactly what types of transactions are able to cross from the secure side 1870 to the unsecure side 1875 and the unsecure side 1875 to the secure side 1870. The secure side 1870 and unsecure side 1875 are termed secure and unsecure respectively in relation to the firewall 1880 configuration. It will be appreciated that the firewall security can be inverted thus the first network 1810 would be deemed unsecure and the second network 1815 would be deemed secure in relation to the firewall 1880.

Periodically the device 1800 initiates a physical request 1850 to the PC 1805 with the physical request 1850 containing a logical response 1845 further containing power management data. This physical request 1850 passes through network 1810, firewall 1880, network 1815 and finally is received by the PC 1805. The request 1850 contains a request for the PC 1805 to reply with a logical request for the device 1800 to execute or process. Physical request 1850 can also, in addition, contain the logical response 1845 to a previous logical request 1840 that was made by the PC 1805 to the device 1800 in the past. After receiving the physical request 1850, the PC 1805 responds with a physical response 1855 to the device 1800 that passes through the second network 1815, firewall 1880, first network 1810 and finally to the device 1800 as part of the previously initiated transaction. Physical response 1855 contains the logical request 1840 or an indication that there is no work available for the device 1800 to process. The physical request 1850 initiates the punching through of the firewall 1880 and allows the physical response 1855 to pass through the firewall 1880 where normally response 1855 would be denied access.

In an alternate embodiment, HTTP Polling allows two protected devices to communicate with each other where each device is located behind its own firewall. In operation, it is impossible for each device to directly connect to the other due to the firewalls preventing any incoming connections. A person skilled in the art will appreciate that there are two traditional solutions to this problem. The first solution is to modify the firewall rules of allowed transactions on one or both of the firewalls to allow incoming connections to the device behind their respective firewall. However, this solution creates a security hole into the internal network and is normally disallowed for this reason. The second solution is to put devices on a DeMilitarized Zone ("DMZ") network separated from the main internal secure network. The DMZ network is a "partially" secure network in that some of the firewall rules can be relaxed to enable communication to the devices. This separate network ideally will have no communication with the secure internal network for security reasons. In a normal implementation, the separate network does have communication but it is limited to specific protocols that are monitored for possibly securities issues. One major problem with this scheme is since the devices are on a separate network they must be wired together without a network connection to the fully secured network. This implies that the devices ideally will be located physically close together to make this wiring cheaper and simpler. If the devices are dispersed throughout the internal secure network this can be difficult to manage and costly. Both schemes are not scalable with large numbers of internal devices as each device requires either a separate special modification made to the firewall rules or large numbers of external Internal Protocol ("IP") addresses or close physical proximity in order to communicate to the devices.

To overcome the aforementioned issues associated with the use of HTTP Polling, an HTTP Rendezvous mechanism is utilized. As will be described in detail below, HTTP Rendezvous consists of two or more devices each behind a firewall communicating to a central server in a common, unprotected network that is reachable by both protected networks. Alternatively this central server could be in a DMZ. In any case, the central server must be directly accessible by the devices on both of the internal/secure networks. This central server acts as a proxy between the two protected networks. By doing an HTTP Post to the central server, as was explained with HTTP Polling, the device can send a message to another internal network device when that device connects to the central server and sends a request for all messages that are waiting for it. This request can be encoded in a SOAP message to the central server to do some action (in this case forward the enclosed SOAP data payload to another device). Further, this data payload itself can be another SOAP message for a remote internal network device to execute or do some action. In order for this to work, the only requirements are that each firewall allow an outgoing connection to be made from the internal, protected network to some external server and allow the corresponding solicited response to pass back through, as described above. Since most, if not all, firewalls will automatically enable the HTTP protocol (port 80) this is not normally an issue.

Figure 19A:
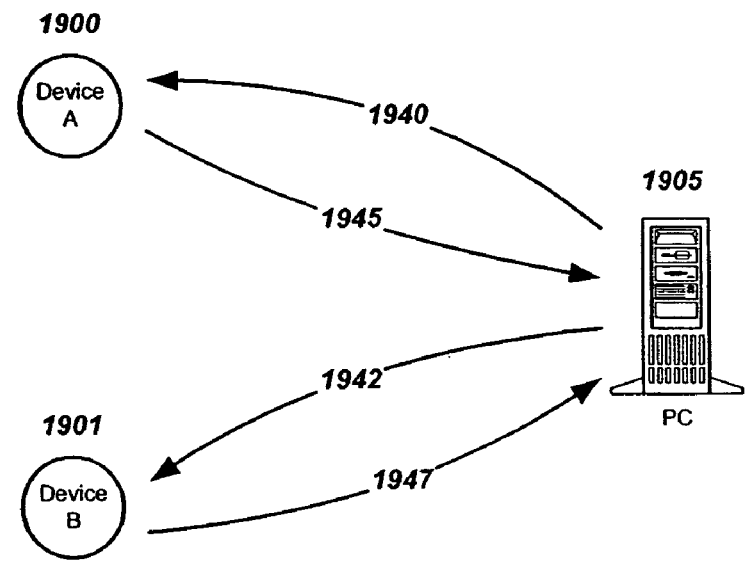
FIG. 19a shows a block diagram illustrating the HTTP Rendezvous architecture using logical transactions.

FIG. 19*a* shows the logical requests between the PC 1905 and the first device 1900 and the second device 1901. When the PC 1905 has a request for the first device 1900 then the PC 1905 sends the request 1940 to the first device 1900. The first device 1900 processes the request 1940 and generates the response 1945 which is sent back to the PC 1905. Likewise whenever the PC 1905 has a request for the second device 1901 then the PC 1905 sends the request 1942 to the second device 1901. The second device 1901 processes the request 1942 and generates the response 1947 which is sent to back to the PC 1905. In both cases the sequence is repeated while there are pending requests for the respective device to process.

These requests can send data to and retrieve data from the respective devices. The data to be sent will include data to be processed by the respective device and the responses contain the processed results. Alternatively, the responses will also contain requests for other devices in the system to process and eventually return the data back to the originating device. For example, the first device 1900 has data, such as power management data or power management commands, that needs to be processed by a second device 1901. In the case when the PC 1905 receives a request for the second device 1901 to process some work sent by the first device 1900 then PC 1905 will add the request to the appropriate device's queue of outgoing requests. The PC 1905 periodically checks the outgoing queue of requests for each device and sends the next request that is pending to the respective device starting the sequence as described earlier. The response packet is routed the original requestor using the same sequence. The combination of each device (first device 1900 and second device 1901) using the HTTP Polling mechanism allows the exchange of data between the devices each of which is behind a protective firewall. Normally, as was described, the first device 1900 and the second device 1901 can not directly contact each other due to the protective firewalls.

Figure 19B:
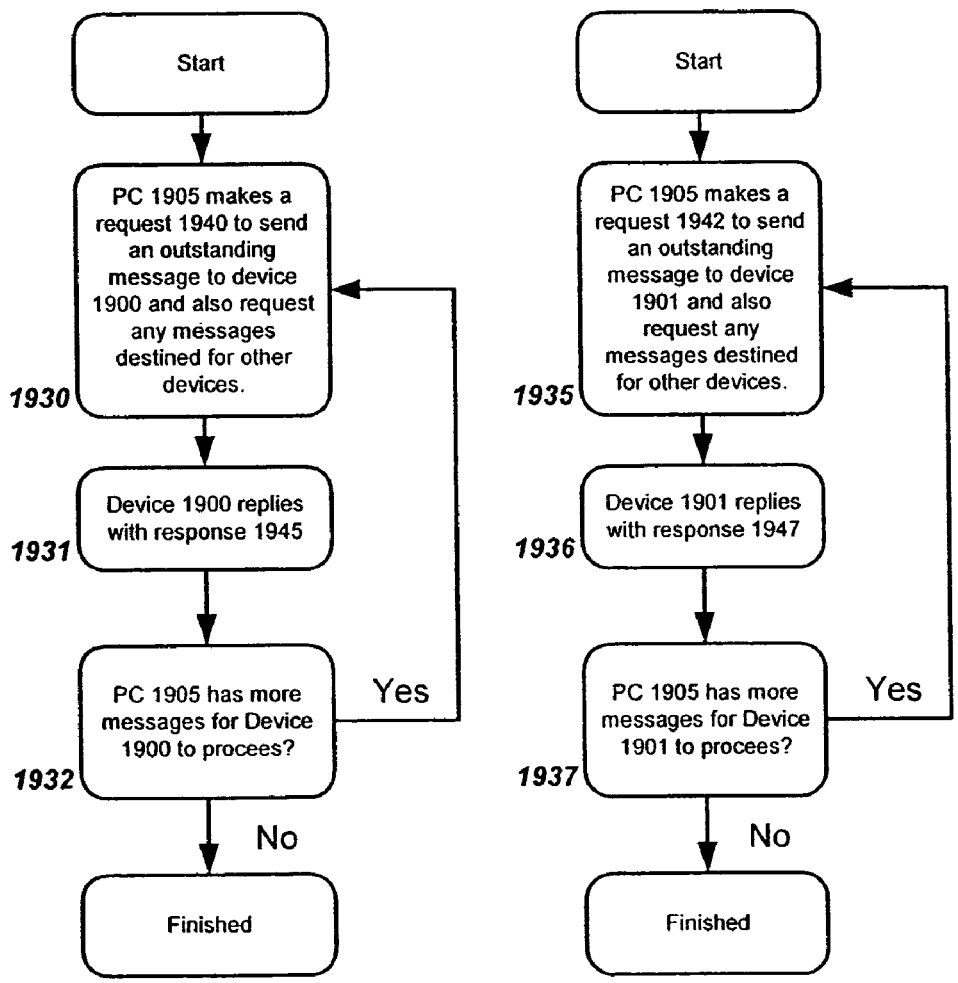

FIG. 19*b* illustrates a flow chart of FIG. 19*a*. In operation the PC 1905 makes a request 1940 to send an outstanding message to the first device 1900 and also request any request messages destined for other devices, block 1930. The first device 1900 will process and reply with response 1945 to the PC 1905, block 1931. Once the reply has been received, the PC 1905 will check if there are more messages to send to the first device 1900, block 1933. This sequence continues until there are no more messages to send to the first device 1900 by looping to block 1930. Likewise the PC 1905 will make a request 1942 with an outstanding message to the second 1901 device and also request any messages destined for other devices, block 1935. The second device 1901 will process and reply with response 1947 to the PC 1905, block 1936. Once the reply have been received the PC 1905 will check if there are more message to send to the second device 1901, block 1937. This sequence also continues until there are no more messages to send to the second device 1901 by looping to block 1935. These two sequences run at rates independent of each other depending on the how fast the devices can process the requests and the responsiveness of the intervening networks between the devices.

Figure 19C:
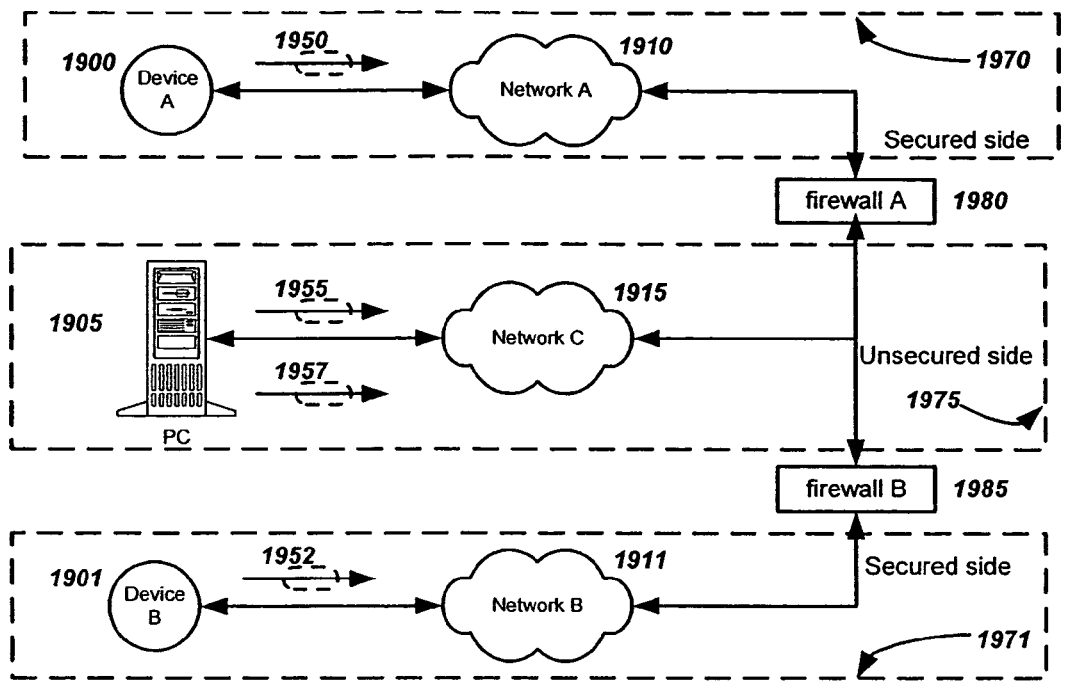
FIG. 19c shows a block diagram illustrating the physical network configuration and physical transactions of a second exemplary networked communications architecture.

FIG. 19*c* shows the physical network configuration and physical transactions between the PC 1905 and the devices 1900 1901. In the system, a first firewall 1980 connects a first network 1910 with a third network 1915. A second firewall 1985, connects the second network 1920 with a second network 1911. The first firewall 1980 allows connections from the first firewall's 1980 secure side 1970 to the first firewall's unsecure side 1975 but not from the first firewall's 1980 unsecure side 1975 to the first firewall's 1980 secure side 1970. Likewise the second firewall 1985 allows connections from the second firewall's 1985 secure side 1971 to the second firewall's 1985 unsecure side 1975 but not vice versa. On the first network 1910 at least one first device 1900 is present and allowed to make connections to other devices, including the PC 1905, on the third network 1915 but not to devices on the second network 1911, such as the second device 1901. Likewise on the second network 1911 the second device 1901 is present and allowed to make connections to the third network 1915 but not to the first network 1910 or any devices connected to the first network. With this configuration it is impossible for the first device 1900 to directly communicate with the second device 1901 but both devices 1900 1901 are able to communicate with devices connected to the third network 1915, such as the PC 1905.

If the first device 1900 wishes to communicate with the second device 1901 or vice versa then all requests must be passed through a PC 1905 which acts as a proxy or router of messages between the devices 1900 1901. Any messages destined for any other device will be examined by the PC 1905 and placed in the appropriate outgoing queue destined for the device. When the respective device initiates a request to the PC 1905 for new work to be processed then the PC 1905 will reply with the items currently pending on the respective device's outgoing queue. Likewise responses to messages are processed similar to requests by the PC 1905 and also placed on the original requester device's outgoing queue. Thus any request and response will eventually be routed to the correct final destination.

The first device 1900 initiates a physical request 1950 to the PC 1905. Contained within the physical request 1950 is logical response 1945 from a previous logical request 1940 that was processed by the first device 1900. The physical response 1955 sent by the PC 1905 will contain a new logical request 1940 for the first device 1900 to process. Alternatively the logical request 1945 will contain an indication that there is no work for the first device 1900 to process if none had previous been added to the first device's 1900 outgoing request queue on the PC 1905. The physical request 1950 initiates the punching through of the first firewall 1980 to the PC 1905 and allows the PC 1905 to respond with data to the first device 1900 where it would otherwise be prevented by the first firewall's 1980 rules. Likewise the second device 1901 initiates a physical request 1952 to the PC 1905. Contained within the physical request 1952 is the logical response 1947 from the previous logical request 1942 that was processed by the second device 1901. The physical response 1957 sent by the PC 1905 will contain a new logical request 1940 for the second device 1901 to process. Alternatively the logical request 1947 will contain an indication that there is no work for the second device 1901 to process if none had previous been added to the second device's 1901 outgoing request queue on the PC 1905. The physical request 1952 initiates the punching through of the second firewall 1985 to the PC 1905 and allows the PC 1905 to respond with data to the second device 1901 where it would otherwise be prevented by the second firewall's 1985 rules.

Figure 19D:
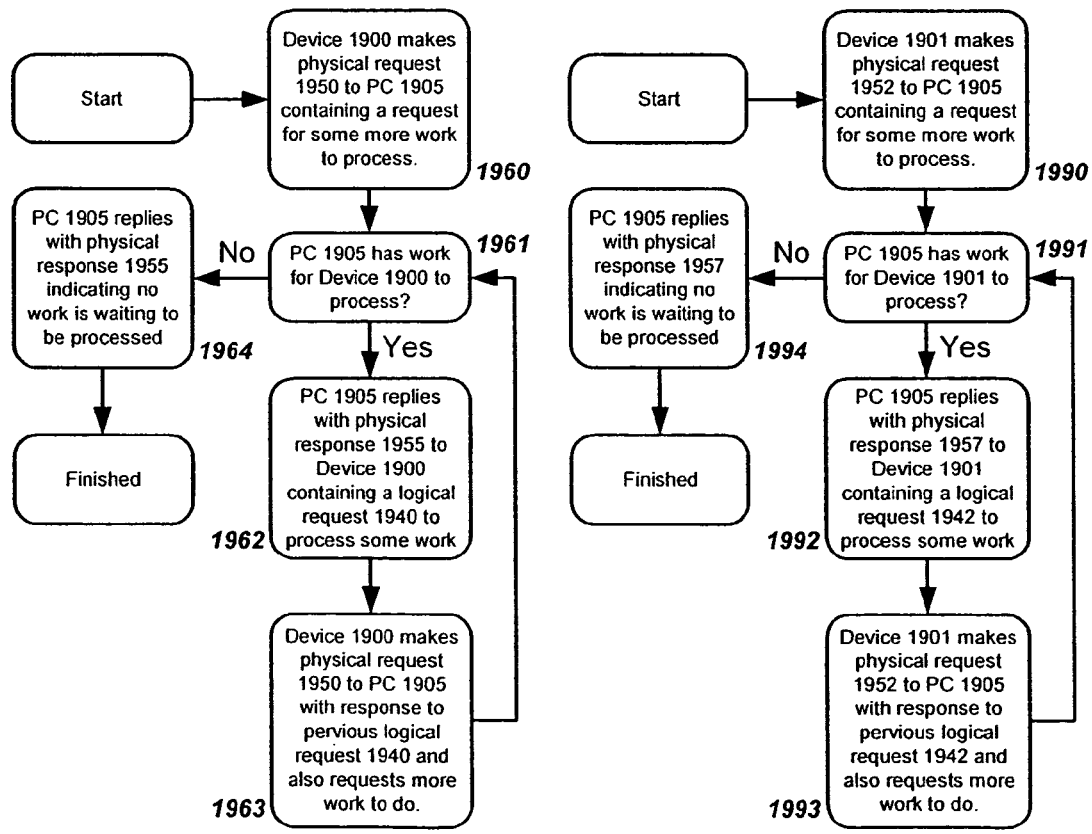
FIG. 19d shows a flow chart illustrating the processing of physical packets and logical messages in the system depicted in FIG. 19c.

FIG. 19*d* shows a flow chart of FIG. 19*c* of the physical packets and logical messages as they are processed in this system. In operation the first device 1900 makes a physical request 1950 to the PC 1905 containing a request for more work to process, block 1960. The PC 1905 checks to see if there are any outstanding requests waiting on the first device's 1900 outgoing queue, block 1961. The PC 1905 will reply with the pending requests in a physical response 1955 containing a logical request 1940 to the first device 1900 to process some work, block 1962. The first device 1900 receives and processes the logical request 1940. Once finished processing the request the first device 1900 makes a physical request 1950, containing the logical response 1945, to the PC 1905 with the results of the previous logical request 1940 and also requests any outstanding requests for the first device 1900, block 1963. The sequence continues looping to block 1961 until there are no pending requests for the first device 1900. In that case the PC 1905 sends a physical response 1955 indicating that there is no more work currently pending for the first device 1900 to process, block 1964. It is up to the first device 1900 to poll for new work sometime in the future at an interval that the first device 1900 chooses.

Likewise the second device 1901 makes a physical request 1952 to the PC 1905 containing a request for more work to process, block 1990. The PC 1905 checks to see if there are any outstanding requests waiting on the second device's 1901 outgoing queue, block 1991. The PC 1905 will reply with the pending requests in a physical response 1957 containing a logical request 1942 to the second device 1901 to process some work, block 1992. The second device 1901 receives and processes the logical request 1942. Once finished processing the request the second device 1901 makes a physical request 1952, containing the logical response 1947, to the PC 1905 with the results of the previous logical request 1942 and also requests any outstanding requests for the second device 1901, block 1993. The sequence continues looping to block 1991 until there are no pending requests for the second device 1901. In that case the PC 1905 sends a physical response 1957 indicating that there is no more work currently pending for the second device 1901 to process, block 1994. It is up to the second device 1901 to poll for new work sometime in the future at an interval that the second device 1901 chooses.

Each flow chart detailed in FIG. 19*d* are executed asynchronously to each other. The rate that each the first device 1900 and the second device 1901 consumes, processes and generates response data determines the overall polling rate for each respective device. The rate that the respective secure devices will poll the unsecure PC can be on a scheduled basis or in response to some event. An example of a scheduled connection can be if the secure devices connect to the unsecure PC every five minutes to check and retrieve any outstanding work for the device to process. It will be apparent to someone skilled in the art that this period can be changed. Some examples of events that could trigger the connection to the PC by the devices are a power quality event or going over or under some set limit of a parameter that the device measures or processes. In an alternative embodiment, the network connections to the central server are transitory. For example, dialup modem or wireless links where the connections are only made under specific situations are well known to those skilled in the art. In this case the secure device would make the request of the unsecure server for work to do in the future and also upload any work completed since that last time it connected not affecting the workflow described above.

In an alternative embodiment, the requests and responses are implemented using SOAP messages, usually serialized in XML tagged text, over any protocol supported by the underlying components. One advantage of using SOAP is the common availability of SOAP toolkits that handle the majority of the implementation and allows the developer to concentrate on the specific application. SOAP toolkits for use with the disclosed embodiments include Java™ Web Services Developer Pack manufactured by Sun Microsystems Inc. located in Santa Clara, Calif., IBM WebSphere Application Server manufactured by IBM, located in Armonk, N.Y., Microsoft® SOAP Toolkit 3.0 and Microsoft Net Framework both manufactured by Microsoft located in Redmond, Wash.

Figure 20:
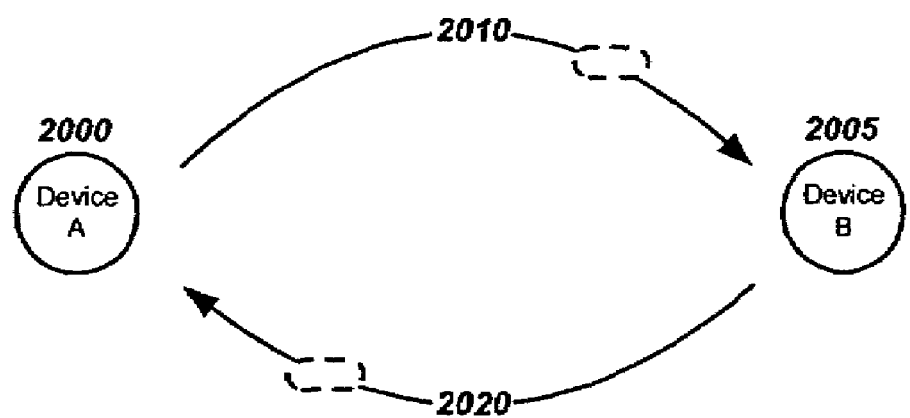
FIG. 20 shows a block diagram illustrating the messages exchanged between two devices.

FIG. 20 shows a first device 2000 that sends a request 2010 to a second device 2005. Sometime later the first device 2005 responds with response 2020. It is assumed that the first device 2000 is behind a firewall (not shown) and that the second device 2005 can not initiate any communication to the first device 2000. The request 2010, possibly containing some data, will be sent to a specific URI on the second device 2005 to invoke a function on the contained data. The URI chosen determines the function that will be invoked. This is the REST model as described previously. Alternatively the request 2010 would contain a SOAP message to be processed by the second device 2005. The response message 2020 to either of the previously described requests 2010 would be a new SOAP request from the second device 2005 for the first device 2000 to execute. Alternatively the second device 2005 would respond with a SOAP message 2020 indicating that there is no work for the first device 2000 to process.

An alternative is to use SOAP messages as a method to transport messages similar to Remote Procedure Call ("RPC") requests and responses between the devices 2000 2005. In this case the first device 2000 sends a SOAP request 2010 that requests the second device 2005 to return some work for the first device 2000 to process. The second device 2005 responds with a SOAP response 2020 that contains another SOAP request message 2040 (not shown) that the first device 2000 is to process. By tunneling soap through soap (containing a SOAP message within another SOAP message) as described, the order of message passing can be reversed. There advantages of this approach, simpler implementation and the ability to reverse the message flow over any protocol that carries SOAP messages, which arise from the fact that reversing the message flow can be implemented solely within the soap toolkit and without the complexity of dealing with the protocol transporting soap messages. If the soap toolkit natively supports HTTP then the HTTP Rendezvous and HTTP Polling described above becomes a special case of this.

The responses to the requests described above can also be handled in different ways. If the first device 2000 needs to report some results data to the second device 2005 then the first device 2000 sends a SOAP message 2010 to the second device 2005 containing another SOAP message 2050 (not shown) in the SOAP message 2010 payload. The SOAP message 2050 contains the actual SOAP response to original SOAP request 2040 to the first device 2000. The SOAP message 2010 is processed by the second device 2005 which results in the processing of message 2050. Alternatively the SOAP message 2010 to the second device 2005 is a SOAP response to SOAP message 2020 or 2040 (depending on the previous alternative chosen) would be processed by the second device 2005. The above descriptions work for either the HTTP Polling or the HTTP Rendezvous methods. As well known in the art, a device which exchanges SOAP messages either processes the message by routing the message to another device capable of exchanging SOAP messages or executes the semantics conveyed within the SOAP message. Using SOAP to convey messages between devices through a firewall is a further embodiment of a unsolicited message.

It will be appreciated that the PC 1805 1905 or the devices 1800 1900 1901 2000 2005 as described in FIGS. 18, 19 and 20 could be replaced with a wide variety of other devices such as a general purpose computer, server, revenue meter, electric (watt-hour) meter, protection relay, phasor transducer, or a pulse counter, or other IED.

Alternatively as is well known in the art the data that is transferred can be encrypted or authenticated using a variety of algorithms before transferring the data across the unsecure networks. Representative security functions that are well known in the art that could be used include SHTTP, HTTPS, SSL, TLS, Microsoft Passport, PKI, Kerberos, PGP and X509.

It will be appreciated that the embodiments described previously can not only be applied to measuring power system related parameters but also parameters related to water, air, steam and gas. Further these embodiments are also useful to transfer various types of data between multiple devices using the mechanisms described, not just power management related parameters.

It is therefore intended that the foregoing detailed description be regarded as illustrative rather than limiting, and that it be understood that it is the following claims, including all equivalents, that are intended to define the spirit and scope of this invention.

We claim:

1. An energy management device for use in an energy management architecture for managing the flow of energy in an energy distribution system, said energy management architecture comprising a network, said energy management device comprising:
   a sensor coupled with said energy distribution system and operative to measure an energy parameter from said energy distribution system;
   a processor coupled with said sensor and operative to generate power management data based on said measured energy parameter, wherein said processor further is operative to determine a geographical location of said energy management device; and
   a network interface coupled with said processor and said network and operative to facilitate communications of said power management data and said geographical location over said network,
   wherein said power management data may be authenticated based on said geographical location.

2. The energy management device of claim 1, wherein said energy distribution system comprises an electrical power distribution network.

3. The energy management device of claim 1, wherein said network interface further comprises at least one of an Ethernet interface, a wired modem, Bluetooth, or an AC power line data network interface.

4. The energy management device of claim 3, wherein said wired modem comprises at least one of a modem using the serial line interface protocol ("SLIP"), a modem using point to point protocol ("PPP"), an integrated services digital network ("ISDN") modem, or digital subscriber line ("DSL") modem.

5. The energy management device of claim 1, wherein a cellular modem is operative to determine said geographical location of the energy management device.

6. The energy management device of claim 5, wherein said geographical location is determined by RF triangulation.

7. The energy management device of claim 1, wherein said communications over said network interface are via Transmission Control Protocol/Internet Protocol ("TCP/IP").

8. The energy management device of claim 1, wherein said network interface is operative to facilitate communications of said power management data and said geographical location over said network without requiring a specific request for said power management data and said geographical location.

9. An energy management architecture for managing the flow of energy in an energy distribution system comprising:
   a network;
   at least one energy management device coupled with a portion of said energy distribution network, each of said at least one energy management device operative to at least one of generate power management data or respond to a power management command, each of said at least one energy management devices comprising:
      a processor operative to process at least one of said power management data or said power management command, and further operative to determine a geographical location of said energy management device; and a network interface operative to couple said processor and said network, further operative to at least one of facilitate transmission of said power management data and said geographical location over said network, or receive said power management command over said network, wherein said power management data may be authenticated based on said geographical location;

said architecture further comprising:

a power management application coupled with said network and operative to at least one of receive and process said power management data from said at least one energy management device, or generate said at least one power management command to said at least one energy management device.

10. The energy management architecture of claim 9, wherein said energy distribution system comprises an electrical power distribution network.

11. The energy management architecture of claim 9, wherein said network interface further comprises at least one of an Ethernet interface, a wired modem, Bluetooth, or an AC power line data network interface.

12. The energy management architecture of claim 11, wherein said wired modem comprises at least one of a modem using the serial line interface protocol ("SLIP"), a modem using point to point protocol ("PPP"), an integrated services digital network ("ISDN") modem, or digital subscriber line ("DSL") modem.

13. The energy management architecture of claim 9, wherein a cellular modem is operative to determine said geographical location of the energy management device.

14. The energy management architecture of claim 13, wherein said geographical location is determined by RF triangulation.

15. The energy management architecture of claim 9, wherein said communications over said network interface are via Transmission Control Protocol/Internet Protocol ("TCP/IP").

16. A method of managing an energy distribution system, said energy distribution system comprising a network, at least one energy management device coupled with said energy distribution system and further coupled to said network, said method comprising:

implementing a power management function with each of said at least one energy management device wherein said power management function comprises at least one of generating power management data, receiving power management data, generating a power management command, or receiving a power management command;

transmitting at least one of said power management data or said power management command, along with a geographical location of said energy management device, over said network; and authenticating at least one of said power management data or said power management command based on said geographical location.

17. The method of claim 16, wherein said energy distribution system comprises an electrical power distribution network.

18. The method of claim 16, wherein said network is further coupled to said energy management device by at least one of an Ethernet interface, a wired modem, Bluetooth, or an AC power line data network interface.

19. The method of claim 18, wherein said wired modem comprises at least one of a modem using the serial line interface protocol ("SLIP"), a modem using point to point protocol ("PPP"), an integrated services digital network ("ISDN") modem, or digital subscriber line ("DSL") modem.

20. The method of claim 16, wherein a cellular modem is operative to determine said geographical location of the energy management device.

21. The method of claim 20, wherein said geographical location is determined by RF triangulation.

22. An energy management device for use in an energy management architecture for managing the flow of energy in an energy distribution system, said energy management architecture comprising a network, said energy management device comprising:

a sensor coupled with said energy distribution system and operative to measure an energy parameter from said energy distribution system;

a processor coupled with said sensor and operative to generate power management data based on said measured energy parameter, wherein said processor further is operative to determine, a geographical location of said energy management device; and a network interface coupled with said processor and said network and operative to facilitate communications of said power management data and said geographical location over said network, wherein said power management data may be authenticated based on said geographical location.

23. The energy management device of claim 22, wherein said energy distribution system comprises an electrical power distribution network.

24. The energy management device of claim 22, wherein said network interface comprises at least one of an Ethernet interface, a cellular modem, a wired modem, Bluetooth, or an AC power line data network interface.

25. The energy management device of claim 24, wherein said wired modem comprises at least one of a modem using the serial line interface protocol ("SLIP"), a modem using point to point protocol ("PPP"), an integrated services digital network ("ISDN") modem, or digital subscriber line ("DSL") modem.

26. The energy management device of claim 24, wherein a cellular modem is operative to determine said geographical location of the energy management device.

27. The energy management device of claim 26, wherein said geographical location is determined by RF triangulation.

28. The energy management device of claim 22, wherein said communications over said network interface are via Transmission Control Protocol/Internet Protocol ("TCP/IP").

* * * * *